(12) United States Patent  (10) Patent No.: US 8,046,782 B2
Yamazaki et al.  (45) Date of Patent: Oct. 25, 2011

(54) TRAY CARRY-OUT METHOD FOR DISC CHANGER DEVICE

(75) Inventors: Takuto Yamazaki, Nara (JP); Yukio Morioka, Osaka (JP); Osamu Ataguchi, Osaka (JP)

(73) Assignee: Panasonic Corporation, Osaka (JP)

( * ) Notice: Subject to any disclaimer, the term of this patent is extended or adjusted under 35 U.S.C. 154(b) by 426 days.

(21) Appl. No.: 12/394,642

(22) Filed: Feb. 27, 2009

(65) Prior Publication Data

US 2009/0222847 A1 Sep. 3, 2009

(30) Foreign Application Priority Data

Feb. 28, 2008 (JP) .................................. 2008-047383

(51) Int. Cl.
*G11B 17/04* (2006.01)

(52) U.S. Cl. ...................... 720/614; 720/610; 369/30.64

(58) Field of Classification Search .................. 720/614, 720/610; 360/98.04; 369/30.92, 30.96
See application file for complete search history.

(56) References Cited

U.S. PATENT DOCUMENTS

| 5,844,880 | A | * | 12/1998 | Motoki et al. | ................ 720/614 |
| 5,970,036 | A | * | 10/1999 | Matsugase | .................... 720/614 |
| 7,100,177 | B2 | * | 8/2006 | Nagata et al. | ................ 720/614 |
| 7,159,225 | B2 | * | 1/2007 | Sakano et al. | ................ 720/614 |

FOREIGN PATENT DOCUMENTS

| JP | 7-43805 | 10/1995 |
| JP | 2000-011521 | 1/2000 |
| WO | 2007-046514 | 4/2007 |

* cited by examiner

*Primary Examiner* — Tan T. Nguyen
(74) *Attorney, Agent, or Firm* — Wenderoth, Lind & Ponack, L.L.P.

(57) ABSTRACT

The tray carry-out method for a disc changer device, comprising, while transporting the tray from a recording/reproducing position to a stand-by position by driving the first motor, starting to drive the second motor for bringing a tray driving gear unit into a tray simultaneously transportable state, and upon completion of the transport of the tray to the stand-by position, with the tray driving gear unit being set to the tray simultaneously transportable state, starting to drive the second motor to carry out the tray from the stand-by position to an exchange position.

12 Claims, 76 Drawing Sheets

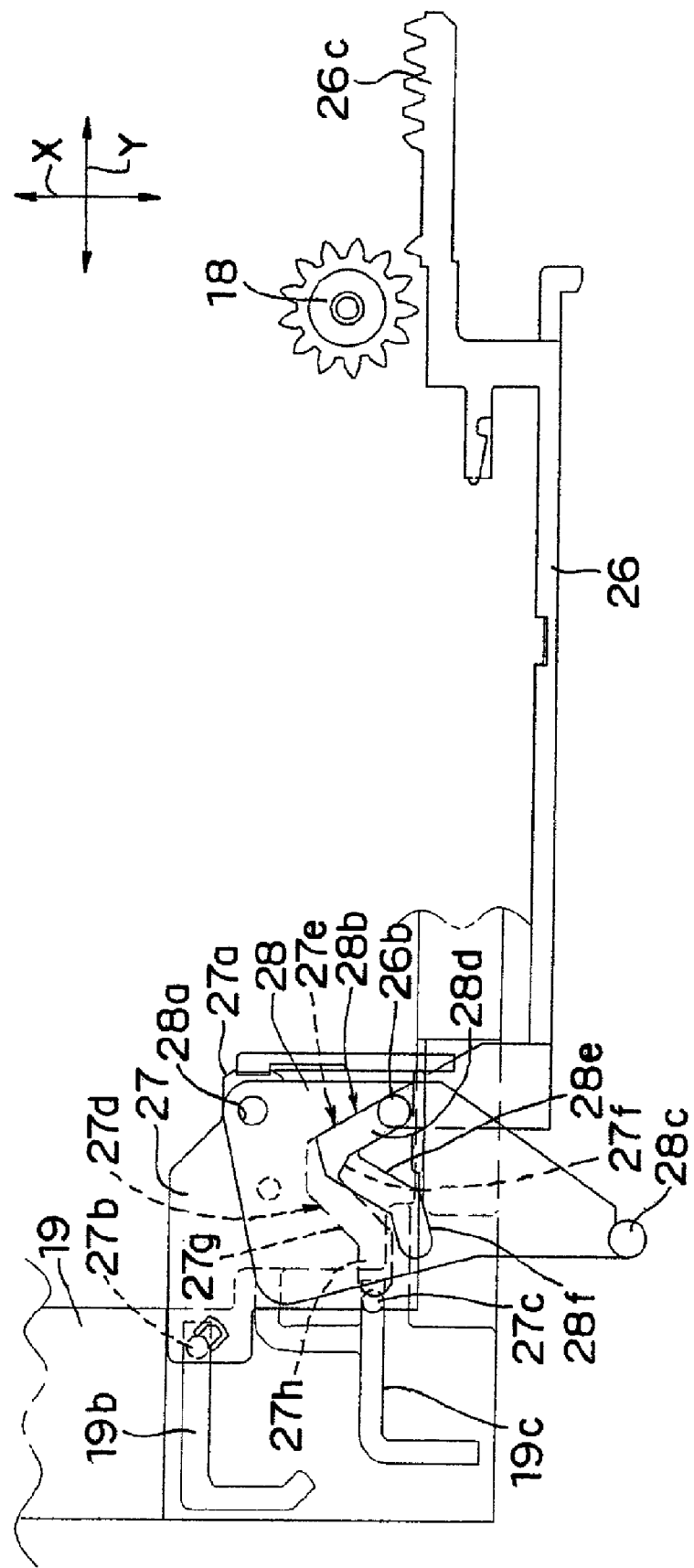

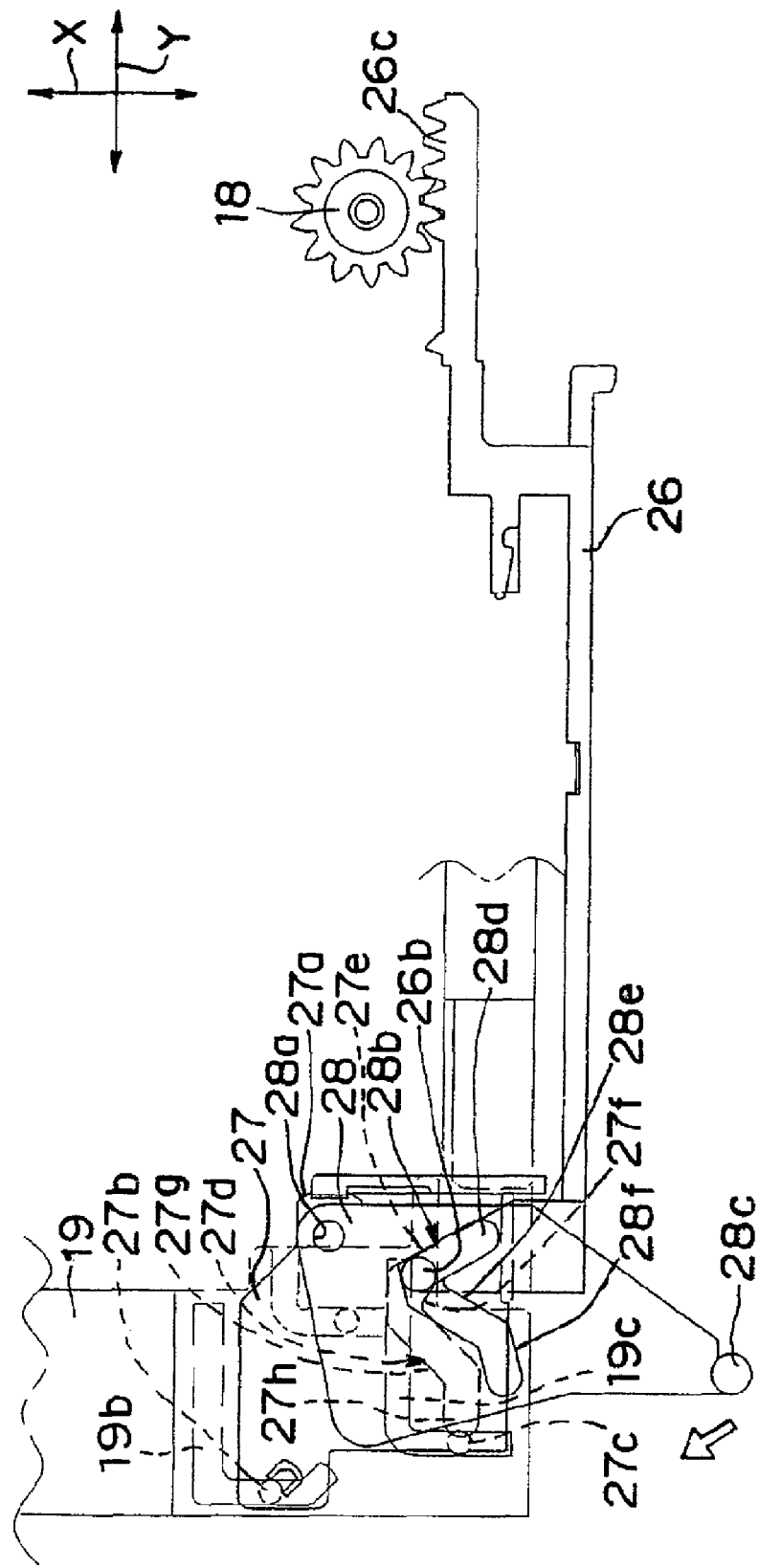

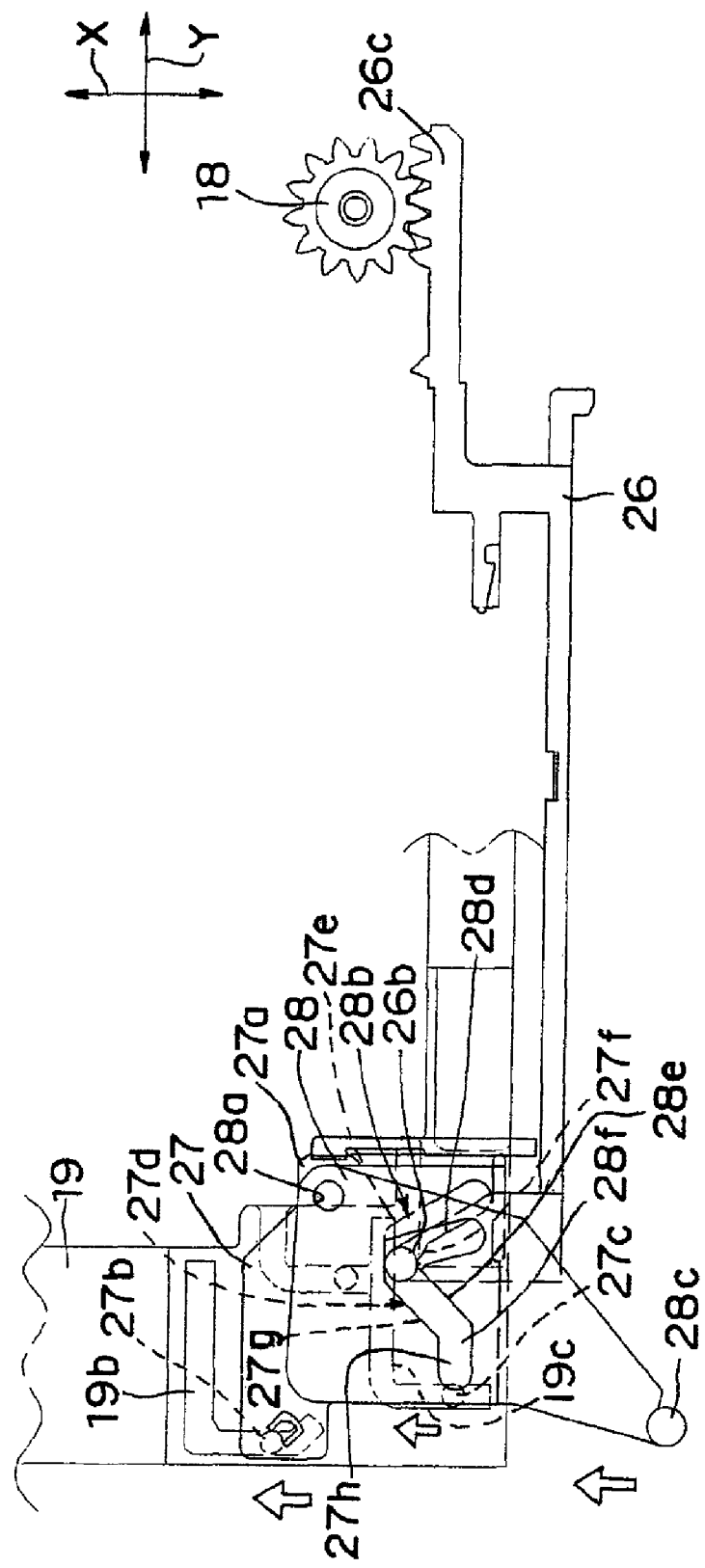

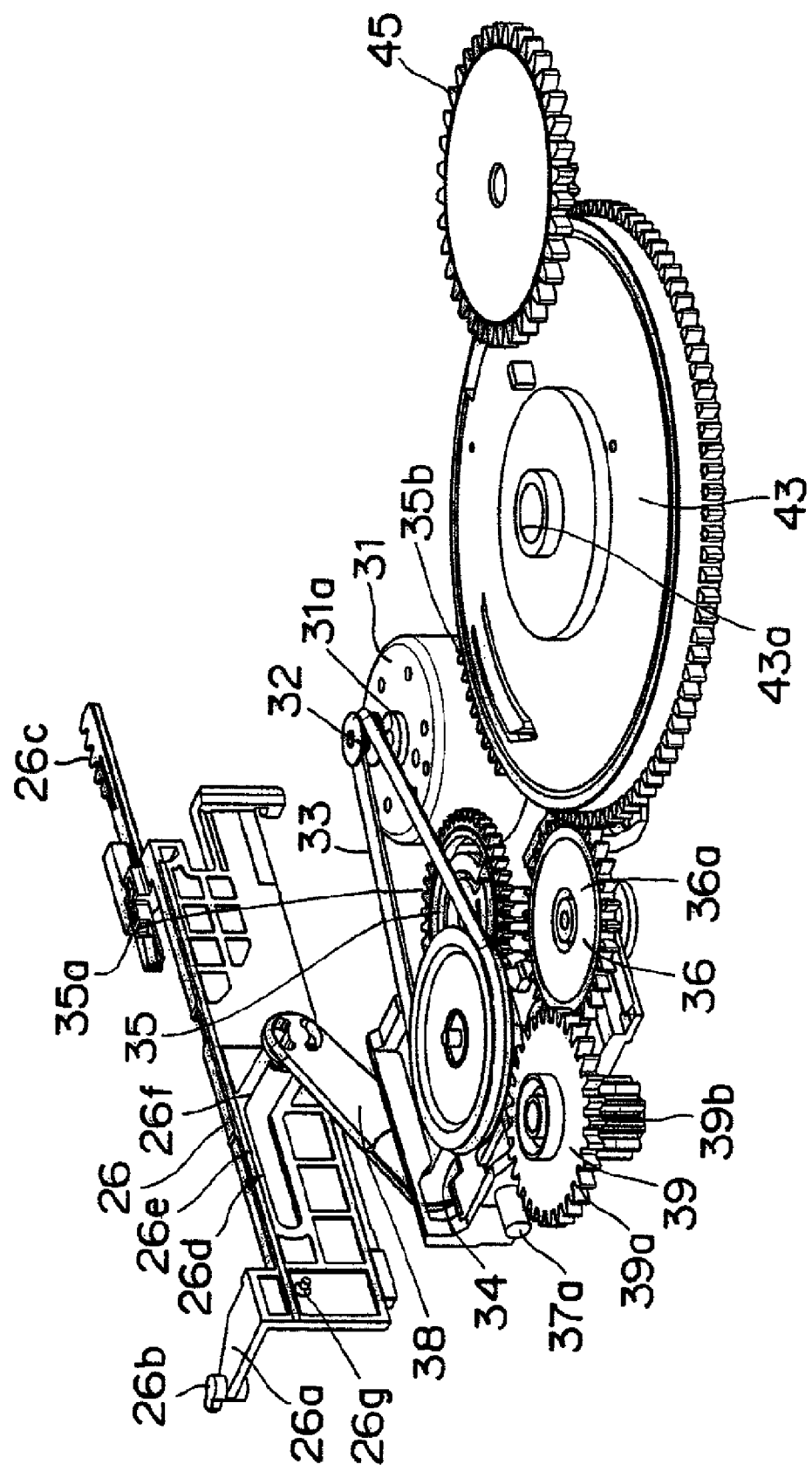

TRAY CARRY-OUT METHOD FOR DISC CHANGER DEVICE

BACKGROUND OF THE INVENTION

The present invention relates to a disc changer device that houses a plurality of optical discs (hereinafter, referred to as a "disc") serving as information recording media, such as CDs (compact discs) and DVDs (digital versatile discs), and transports a disc selected from the discs to carry out a recording and/or reproducing operation of information on the selected disc, and more particularly to a tray carry-out method for carrying out a tray to be transported with a disc mounted thereon from a disc recording/reproducing position to a disc exchange position via a stand-by position.

Conventionally, as this type of disc changer devices, those devices that house and transport discs in a chassis that forms an outer frame of the device by using a plurality of trays have been known. In this disc changer device, those trays are stacked in a device-thickness direction perpendicular to a main face of the disc, and arranged so as to be respectively moved in a device-depth direction that is in parallel with the main face of the disc. The disc changer device is designed so that each tray can be transported in the horizontal direction among a stand-by position at which a plurality of trays are housed in the chassis, a disc recording/reproducing position at which a recording or reproducing operation of information signals is carried out on a disc placed on the selected tray, and a disc exchange position at which the tray is allowed to protrude outside from the chassis so that a disc can be placed on the tray or taken out from the tray.

With respect to the disc changer device having the above-mentioned structure, for example, a device disclosed in International Publication No. WO/2007/046514 (Patent Document 1) has been known.

In the disc changer device of Patent Document 1, a discharging process of the respective trays from the disc recording/reproducing position to the disc exchange position is carried out by using two motors. That is, one motor is driven to transport a tray from the disc recording/reproducing position to the stand-by position, and after the transport to the stand-by position, the other motor is driven to transport the tray from the stand-by position to the disc exchange position.

SUMMARY OF THE INVENTION

In the above-mentioned conventional tray carry-out method, however, a issue arises in which a long waiting time is required from the time at which the user presses, for example, an eject button attached to the device until the tray has been carried out to the disc exchange position.

Therefore, an object of the present invention is to improve the above-mentioned issue, and consequently to provide a tray carry-out method for a disc changer device that can shorten a tray carry-out time required for carrying out a tray from the disc recording/reproducing position to the disc exchange position in comparison with that of the conventional device.

In order to achieve the above object, the present invention is designed as follows:

According to a first aspect of the present invention, there is provided a tray carry-out method for a disc changer device, wherein the disc changer device have a first motor and a second motor, the first motor generating a driving force for transporting a tray between a stand-by position where a plurality of trays are housed and a disc recording/reproducing position where a recording/reproducing operation is carried out on a disc on the tray selected from the plurality of trays, and the second motor generating a driving force for bringing a tray driving gear unit capable of individually transporting the respective trays into a tray simultaneously transportable state, as well as for transporting the tray between the stand-by position and a disc exchange position where a disc on the tray is exchanged, comprising:

while transporting the tray from the disc recording/reproducing position to the stand-by position by driving the first motor, starting to drive the second motor for bringing the tray driving gear unit into the tray simultaneously transportable state; and upon completion of the transport of the tray to the stand-by position, with the tray driving gear unit being set to the tray simultaneously transportable state, starting to drive the second motor to carry out the tray from the stand-by position to the disc exchange position.

According to a second aspect of the present invention, there is provided the tray carry-out method for a disc changer device as defined in the first aspect, wherein the second motor is started to be driven simultaneously with the first motor.

According to a third aspect of the present invention, there is provided the tray carry-out method for a disc changer device as defined in the first or second aspect, further comprising:

in the case where the tray driving gear unit is set to the tray simultaneously transportable state by the driving operation of the second motor, during a transporting process of the tray from the disc recording/reproducing position to the stand-by state by driving the first motor, stopping the driving operation of the second motor.

According to a fourth aspect of the present invention, there is provided the tray carry-out method for a disc changer device as defined in any one of the first to third aspect, comprising:

detecting whether or not the tray driving gear unit has been brought into the tray simultaneously transportable state based upon an amount of rotation of a gear, with the disc changer device having the gear for transmitting a driving force of the second motor to the tray driving gear unit.

According to a fifth aspect of the present invention, there is provided the tray carry-out method for a disc changer device as defined in the fourth aspect, comprising:

detecting the amount of rotation of the gear by detecting a slit formed on a rib, with the gear having a rib having a virtually cylinder shape that sticks out from a surface of a gear concentrically with the rotation center of the gear.

The tray carry-out method for a disc changer device of the present invention is designed so that, while transporting the tray from the disc recording/reproducing position to the stand-by position by driving the first motor, the second motor is started to operate. With this arrangement, since, while the tray is being transported to the stand-by position, the second motor is driven to bring the tray driving gear unit into a tray simultaneously transportable state, it becomes possible to shorten the tray carry-out time correspondingly.

BRIEF DESCRIPTION OF THE DRAWINGS

These and other aspects and features of the present invention will become retreated from the following description taken in conjunction with the preferred embodiments thereof with reference to the accompanying drawings, in which:

FIG. 16A is a plan view that shows a state of the tray transporting mechanism shown in FIG. 11 when the tray is located at the recording/reproducing position;

FIG. 16D is a plan view that shows a state following the state of FIG. 16C;

FIG. 16E is a plan view that shows a state following the state of FIG. 16D;

FIG. 18A is a perspective view that shows a state in which a switching gear to which a driving force from a second motor is transmitted is meshed with a cam gear;

DETAILED DESCRIPTION OF THE PREFERRED EMBODIMENTS

Figure 1:
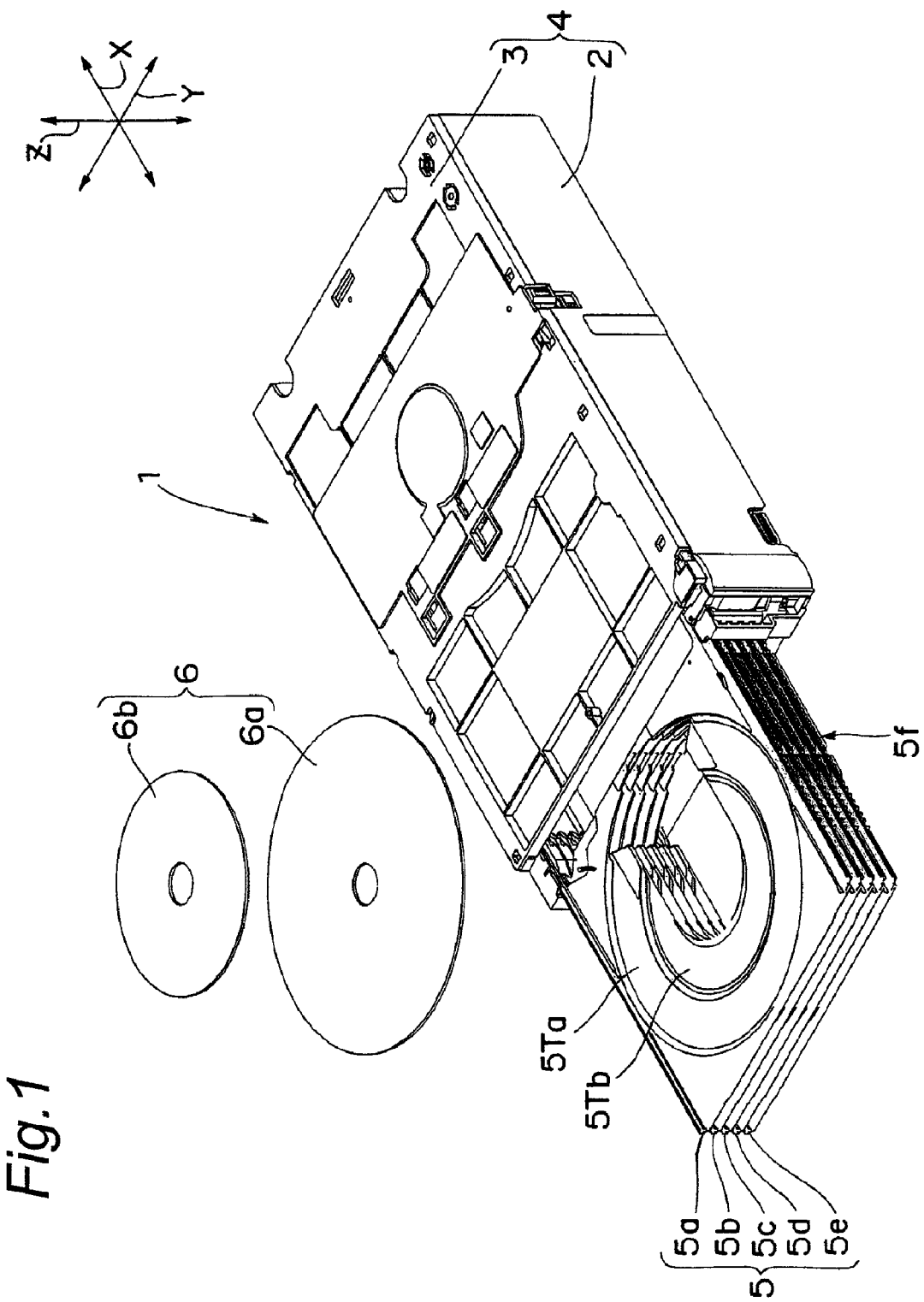
FIG. 1 is a perspective view that shows a disc changer device in accordance with an embodiment of the present invention.

Before the description of the present invention proceeds, it is to be noted that like parts are designated by like reference numerals throughout the accompanying drawings.

Hereinbelow, one embodiment of the present invention is described in detail with reference to the accompanying drawings.

Embodiments

Figure 2:
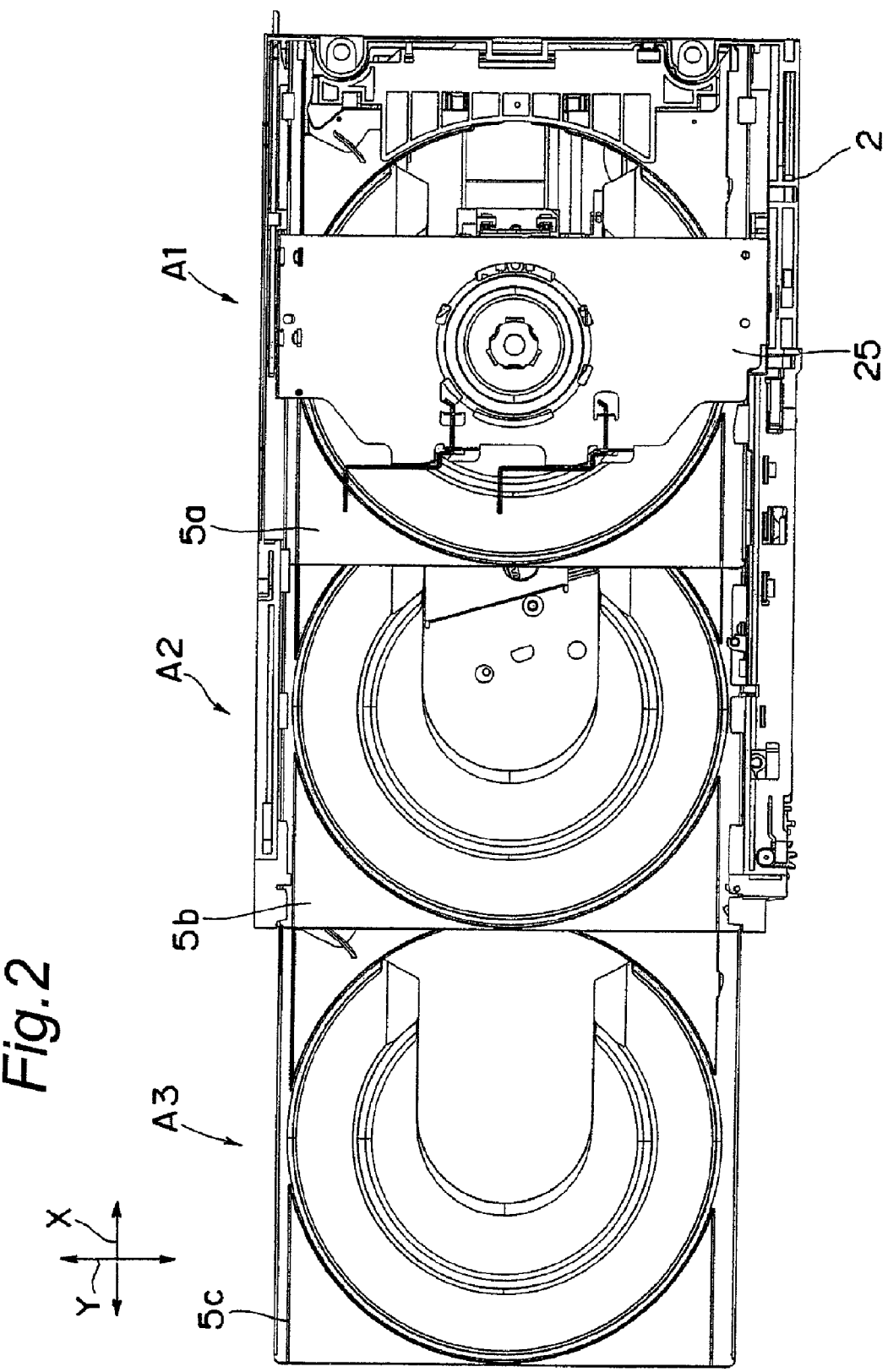
FIG. 2 is a plan view that shows each of states in which a tray is located at a disc recording/reproducing position, a stand-by position, and a disc exchange position in the disc changer device in accordance with the embodiment of the present invention.
Figure 3:
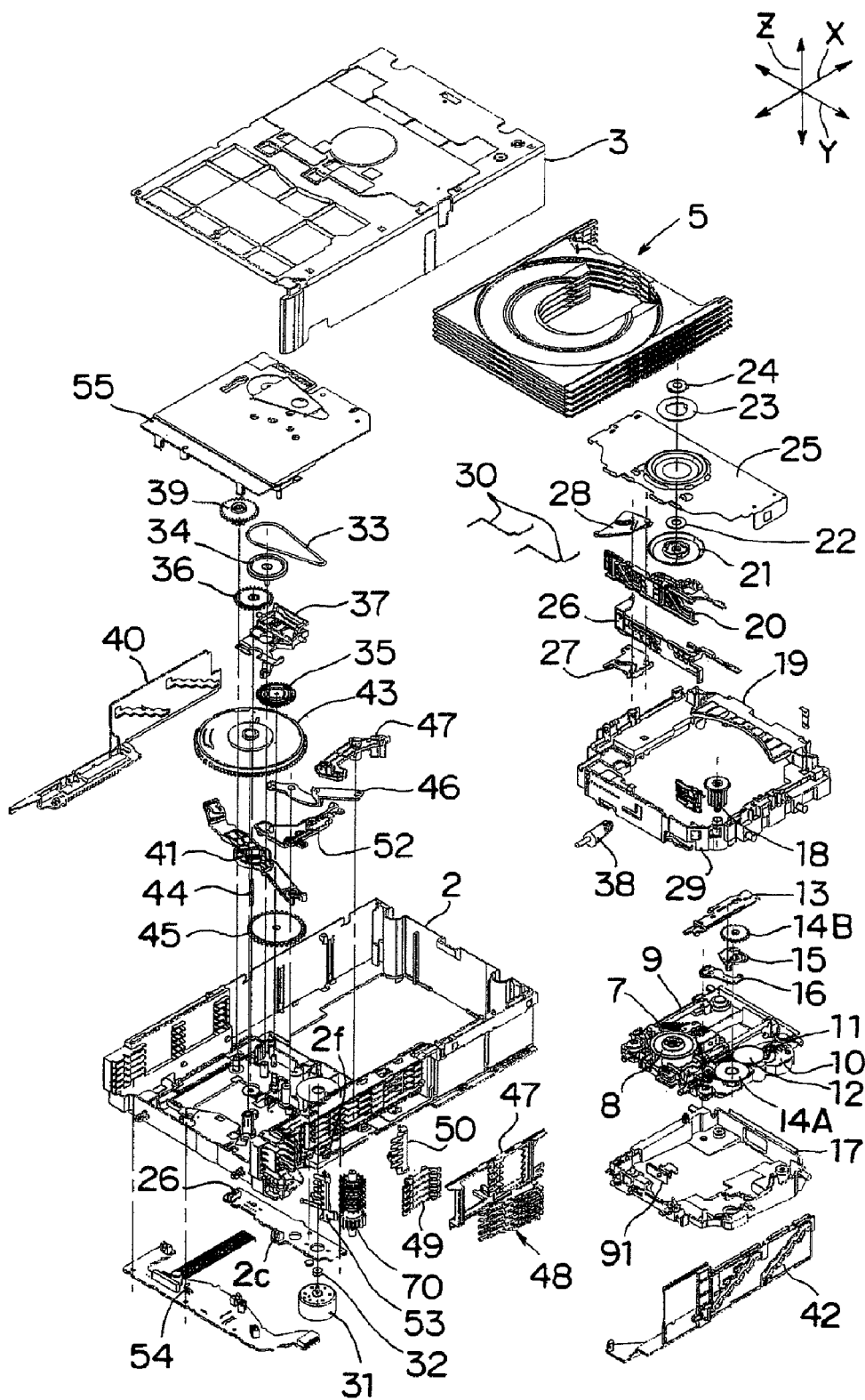
FIG. 3 is an exploded perspective view of the disc changer device in accordance with the embodiment of the present invention.
Figure 4:
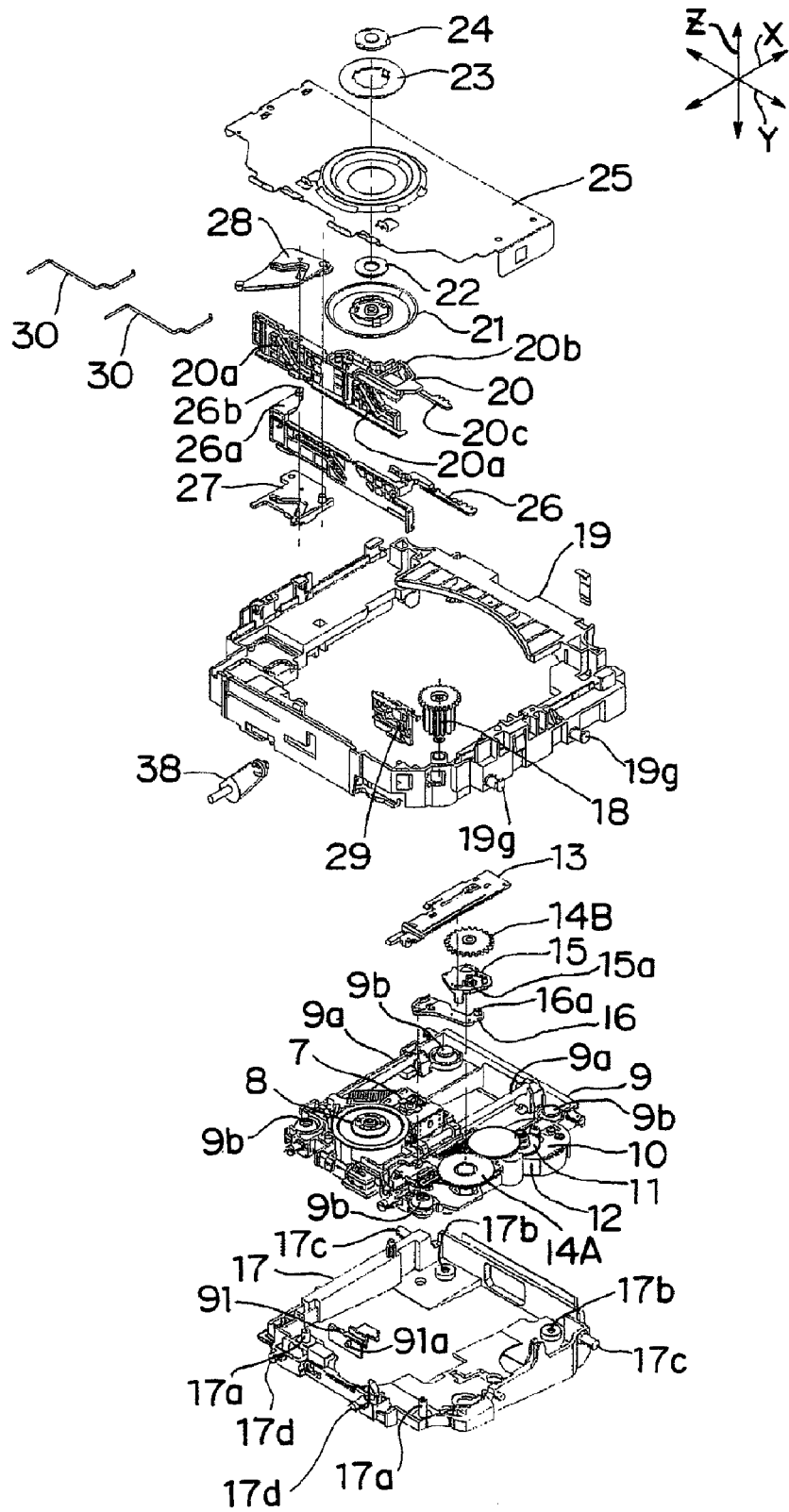
FIG. 4 is a partially enlarged perspective view of a recording/reproducing section of FIG. 3.
Figure 5:
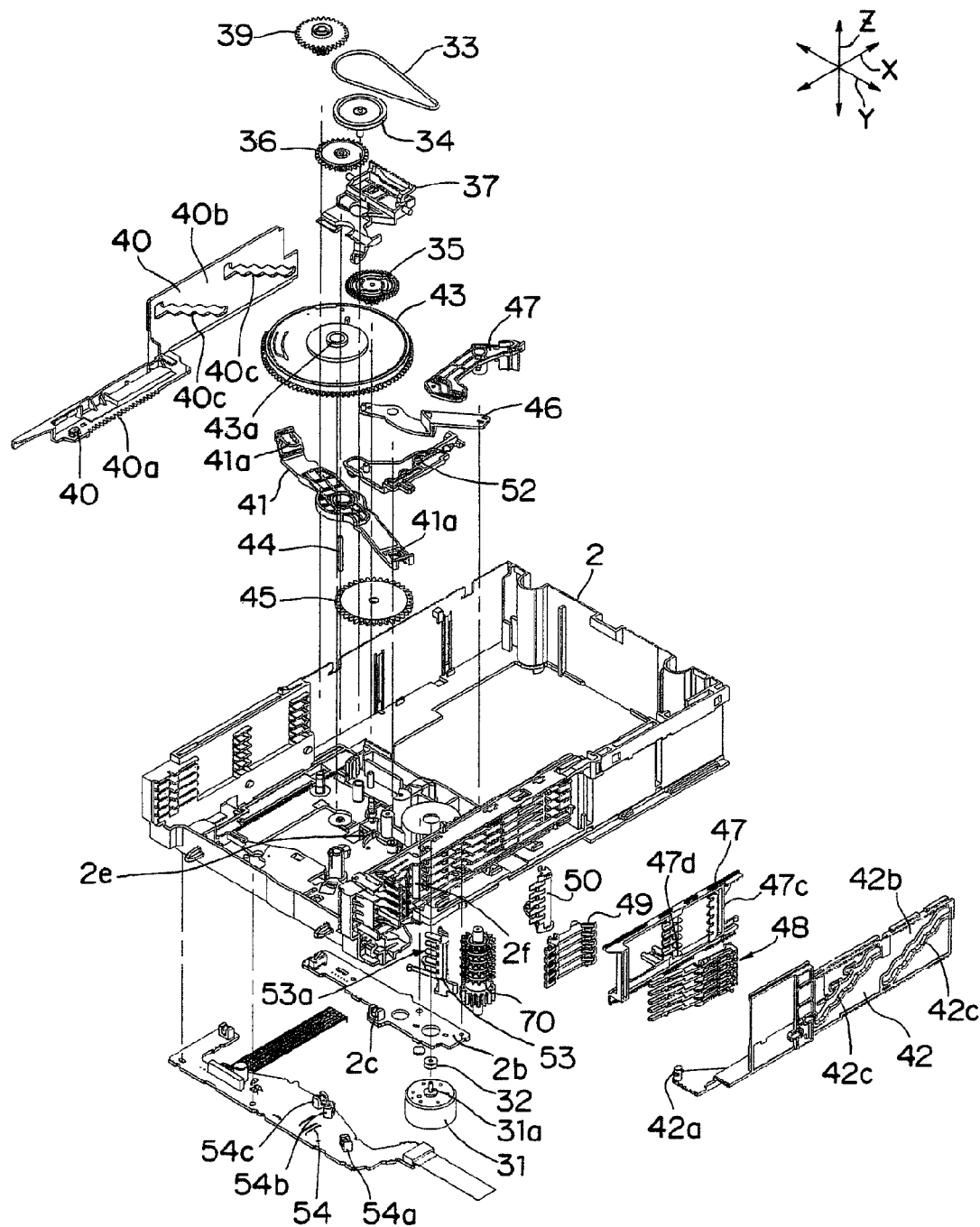
FIG. 5 is a partially enlarged perspective view of a stand-by section of FIG. 3.
Figure 6:
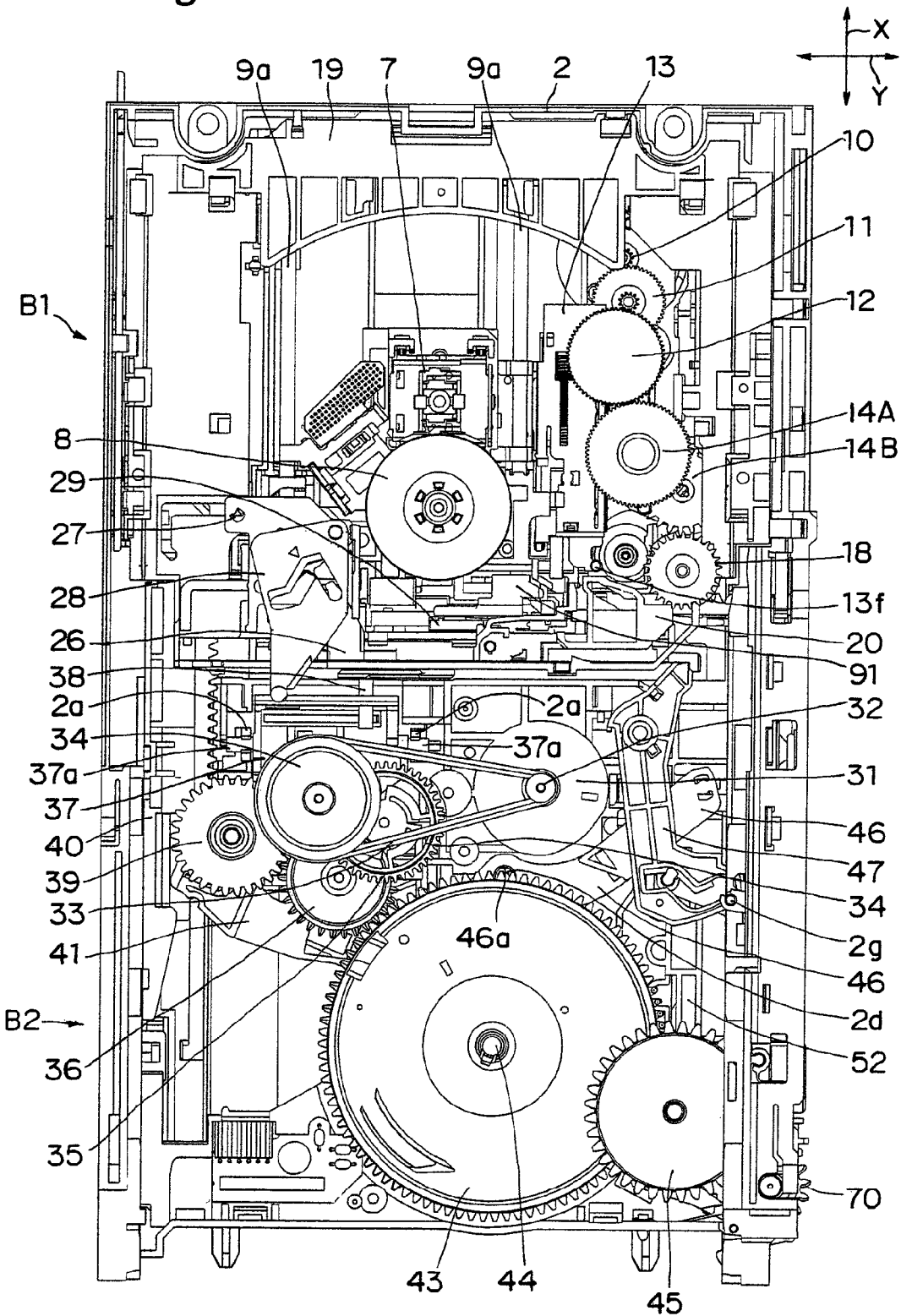
FIG. 6 is a plan view that shows a state in which an upper cover, a clamp plate and a tray have been removed from the disc changer device in accordance with the embodiment of the present invention.

The following description will discuss a disc changer device in accordance with one embodiment of the present invention. FIG. 1 is a perspective view that shows a disc changer device in accordance with the embodiment of the present invention. FIG. 2 is a plan view that shows each of states in which a tray is located at a disc recording/reproducing position, a stand-by position and a disc exchange position in the disc changer device in accordance with the embodiment of the present invention. FIG. 3 is an exploded perspective view of the disc changer device, FIG. 4 is a partially enlarged perspective view that shows a disc recording/reproducing section of FIG. 3, FIG. 5 is a partially enlarged perspective view that shows a stand-by section of FIG. 3, and FIG. 6 is a plan view that shows a state in which an upper cover and a tray have been removed from the disc changer device in accordance with the embodiment of the present invention. Here, for convenience of description, the description is given by regarding an upper side of FIG. 1 as an upper side of a disc changer device 1 of the present invention, as well as regarding a lower side of FIG. 1 as a lower side of the disc changer device 1; however, the present invention is not limited thereto. For example, the disc changer device 1 may be placed in a tilted manner by 90°.

In FIGS. 1 and 3, the disc changer device 1 is provided with a device main body (referred to also as a "mechanical base") 2 that supports respective parts and an upper cover 3 that covers the upper side of the device main body 2. The device main body 2 and the upper cover 3 form a chassis 4 identified as the outer frame of the device. Moreover, the disc changer device 1 is provided with a plurality of trays 5 (for example, five in this case) (5a to 5e) in which large-diameter discs 6a or small-diameter discs 6b are respectively placed on a large-diameter step portion 5Ta or a small-diameter step portion 5Tb. Hereinafter, the large-diameter and small-diameter discs 6a and 6b are collectively referred to as a disc 6.

The trays 5 are stacked in a device-thickness direction Z that is virtually perpendicular to a main face of the disc 6, and arranged so as to be respectively moved in a device-depth direction X (referred to also as a "tray transporting direction") in parallel with the main face of the disc 6. As shown in FIG. 2, the disc changer device 1 is designed so that the tray 5 can be transported in the device-depth direction X among a stand-by position A2 where a plurality of trays 5 are housed inside the chassis 4, a disc recording/reproducing position (hereinafter, referred to as a "recording/reproducing position") A1 where a recording/reproducing operation of information signals is carried out on the disc 6 mounted on one of the trays 5 selected from the trays 5, and a disc exchange position (hereinafter, referred to as an "exchange position") A3 where the disc 6 is allowed to stick out from the chassis 4 so as to be placed on the tray 5 or so as to be taken out from the tray 5.

An inner structure of the disc changer device 1 is mainly classified into two sections, that is, a disc recording/reproducing section (hereinafter, referred to as a "recording/reproducing section") B1 and a stand-by section B2.

First, referring to FIGS. 4 and 6, the following description will discuss respective components disposed in the recording/reproducing section B1, and the respective operations thereof.

As shown in FIG. 4, in the recording/reproducing section B1, a traverse base 9 is disposed, which is one example of a traverse unit on which an optical pickup 7 that carries out a recording and/or reproducing process of information signals on the disc 6 and a turn table 8 that rotates the disc 6 are mounted. The optical pickup 7 is arranged so that, by fitting a pair of guide shafts 9a, 9a that are attached to the traverse base 9, and are in parallel with the device-depth direction X, with being mutually kept in parallel with each other, into bearing holes 7a, 7a and a bearing groove 7b (see FIG. 7A) formed therein, so as to slide therein; thus, it is allowed to move along the guide shafts 9a, 9a. In this manner, the optical pickup 7 is designed to shift in a disc radial direction of the disc placed on the turn table 8.

Figure 7A:
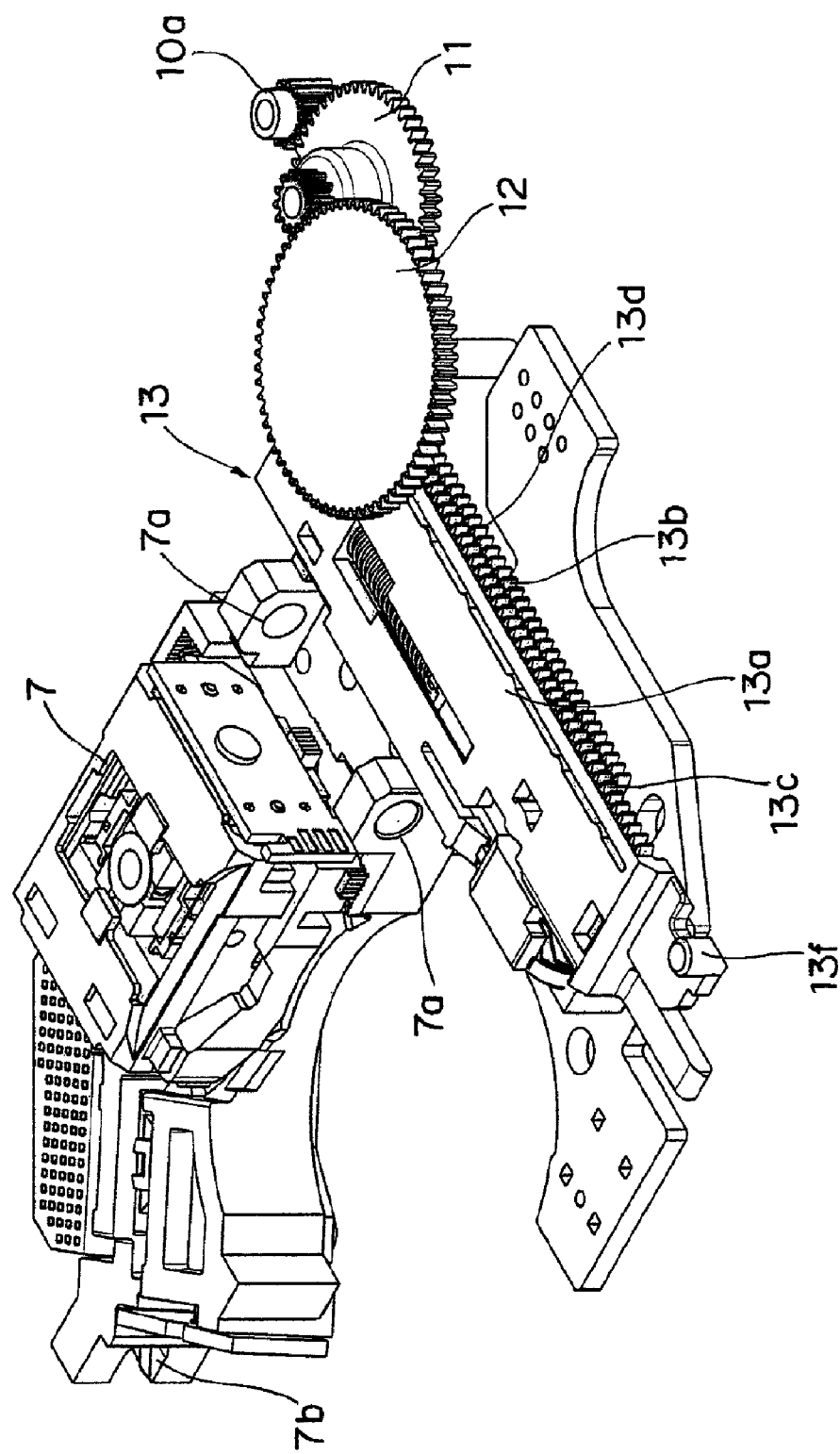
FIG. 7A is a perspective view that shows a structure of a moving mechanism of an optical pickup.
Figure 7B:
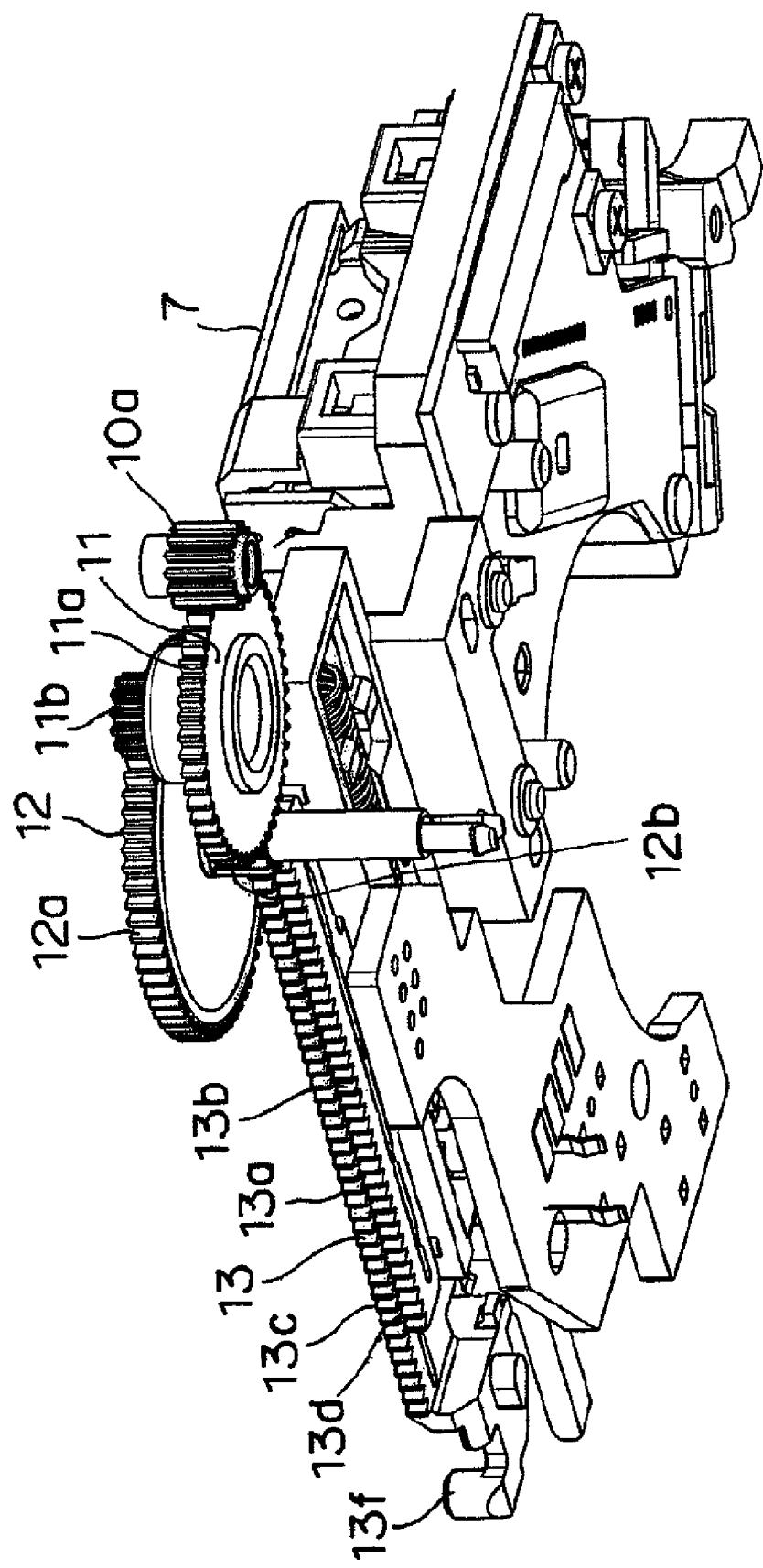
FIG. 7B is a perspective view that shows the moving mechanism of FIG. 7A viewed from another angle.

On the traverse base 9, a first motor 10 that generates a driving force, a first traverse gear 11 in which an input gear 11a is meshed with a driving shaft 10a of the first motor 10 so as to transmit the driving force of the first motor 10, and a second traverse gear 12 in which an input gear 12a is meshed with an output gear 11b of the first traverse gear 11 are installed. As shown in FIGS. 7A and 7B, an output gear 12b of the second traverse gear 12 is placed so as to be mashed with upper rack teeth 13c and lower rack teeth 13d of a feeding rack 13. The feeding rack 13, which is formed by superposing two virtually plate-shaped members 13a and 13b that have different lengths, with upper rack teeth 13c being formed on a side face of the upper plate-shaped member 13a and the lower rack teeth 13d being formed on a side face of the lower plate-shaped member 13b. The lower plate-shaped member 13b is integrally attached to the optical pickup 7. For this reason, when the first motor 10 is forwardly/reversely driven, with the output gear 11b of the second traverse gear 11 and the lower rack teeth 13d being meshed with each other, the optical pickup 7 is moved in the disc radial direction together with the feeding rack 13. Moreover, when the meshed state between the output gear 11b of the second traverse gear 11 and the lower-side rack teeth 13d is released, the movements of the lower-side plate-shaped member 13b and the optical pickup 7 are stopped. In contrast, the upper-side plate-shaped member 13a is engaged with the lower-side plate member 13b so as to slide along the lower-side plate-shaped member 13b. Since the upper-side rack teeth 13c are longer than the lower-side rack teeth 13d, the output gear 11b of the second traverse gear 11 and the upper-side rack teeth 13c are kept in the meshed state even when the movements of the lower-side plate-shaped member 13b and the optical pickup 7 are stopped as described above. In the case where the first motor 10 is further driven from the state, the upper-side plate-shaped member 13a is allowed to slide on the lower-side plate-shaped member 13b, and further moved in the disc radial direction (diagonally downward to left side in FIG. 7A).

In the present embodiment, the first and second traverse gears 11 and 12 and the feeding rack 13 are allowed to form a pickup moving unit that can move the optical pickup 7 in a disc-radial direction.

Figure 8A:
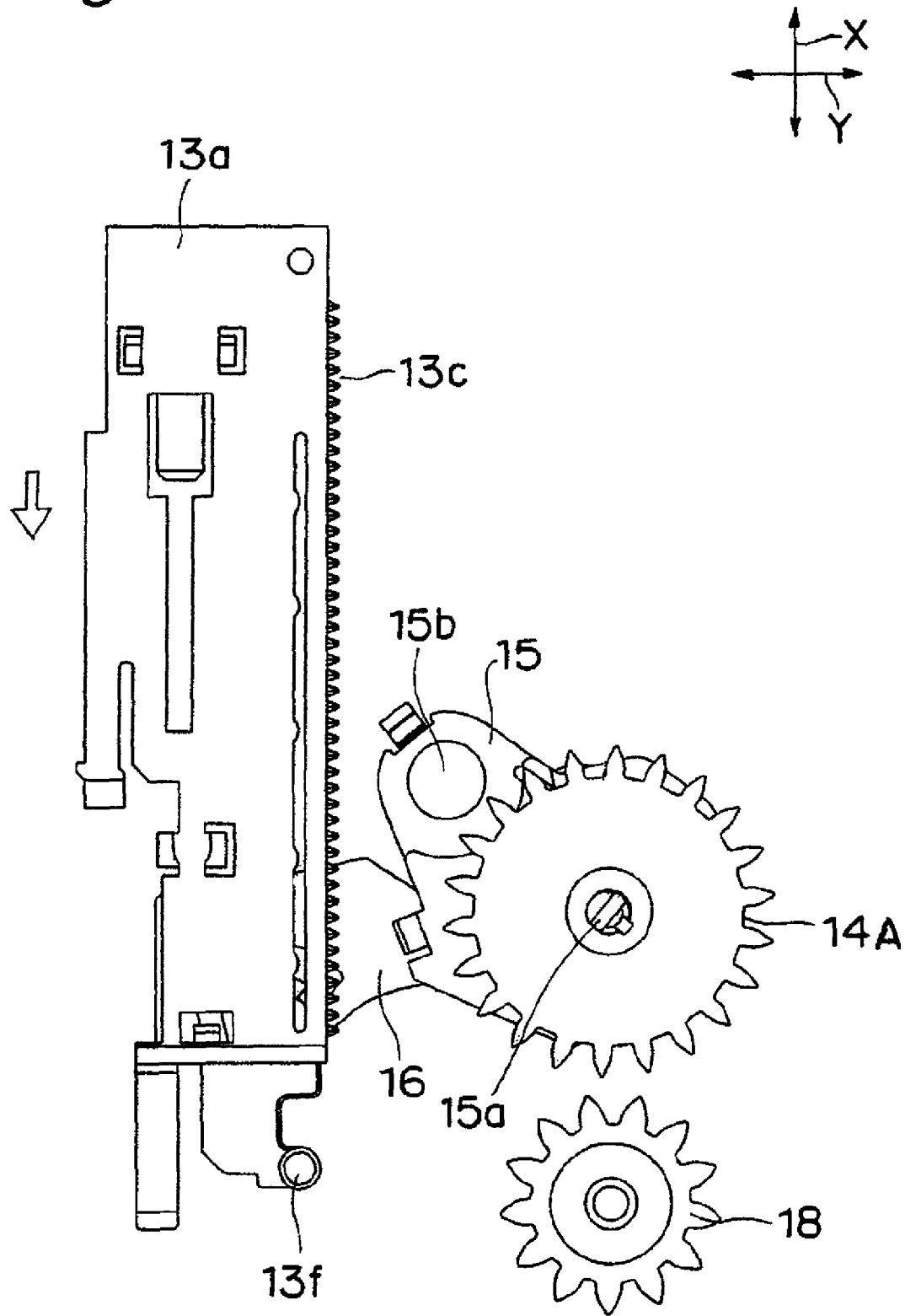
FIG. 8A is a plan view that shows a positional relationship among an upper plate-shaped member, a swing arm and a swing lock of a feeding rack.
Figure 8B:
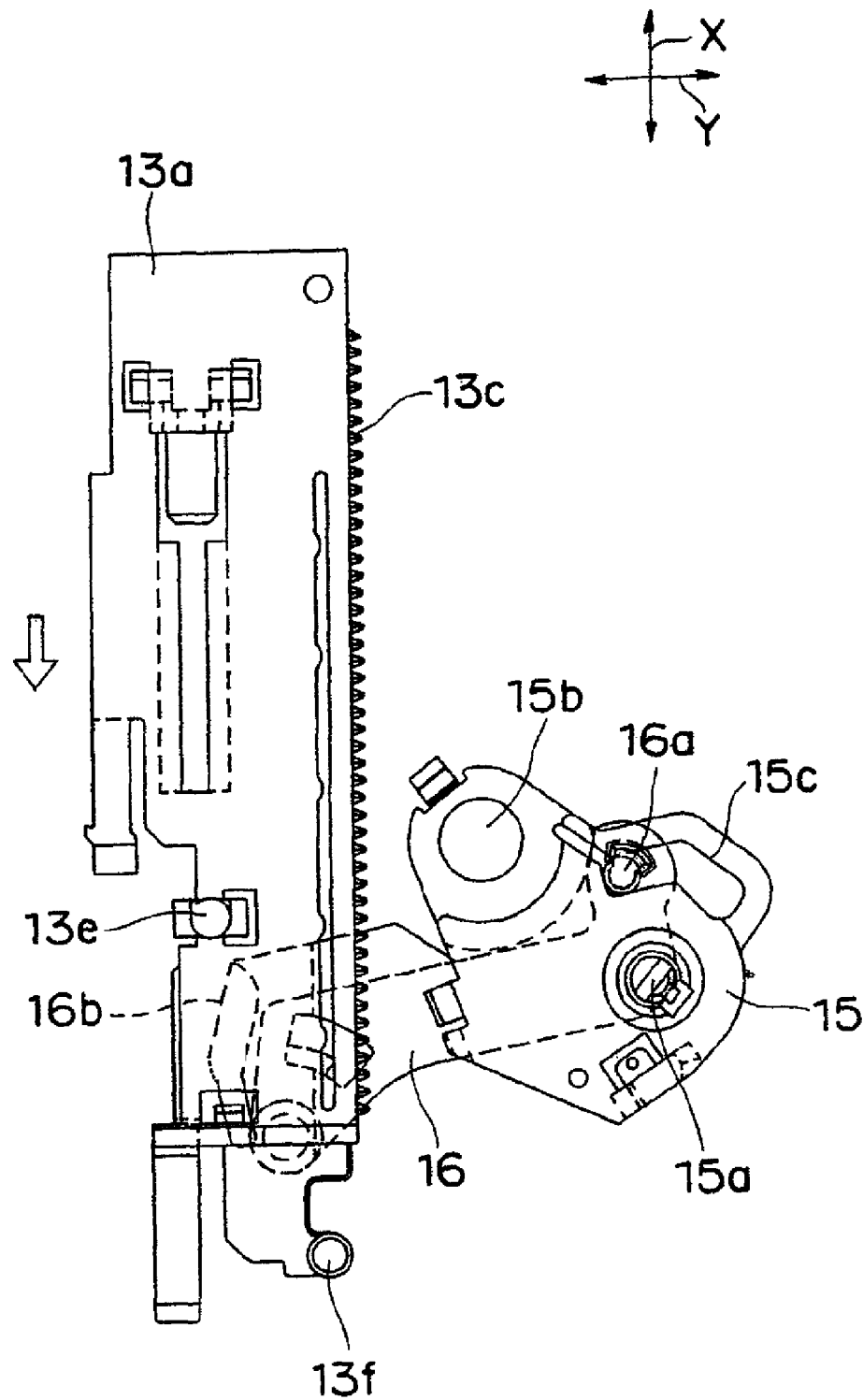
FIG. 8B is a view that shows one portion of FIG. 8A in a perspective manner through parts.

Moreover, a loading gear 14A is disposed on the traverse base 9 so that an input gear 14a is meshed with the input gear 12a of the second traverse gear 12. An output gear 14b of the loading gear 14A is meshed with a relay gear 14B. A hole is formed in the center of relay gear 14B. As shown in FIG. 8B, a pin 15a attached to one of ends of a swing arm 15 is fitted to the center hole of the relay gear 14B. The swing arm 15 is attached to the traverse base 9 so as to pivot centered on a shaft 15b. Moreover, the swing arm 15 is urged in a rotating direction anti-clockwise in FIGS. 8A and 8B (a departing direction from the upper-side plate-shaped member 13a) centered on the shaft 15b by a torsion spring (not shown). As shown in FIG. 8A, a guide hole 15c that is bent into an L-letter shape is formed on the swing arm 15, with an engaging pin 16a formed on a swing lock 16 being engaged with the guide hole 15c. A tilt face 16b that tilts relative to the moving direction (disc radial direction) of the feeding rack 13 is formed on the other end of the swing lock 16.

Figure 9A:
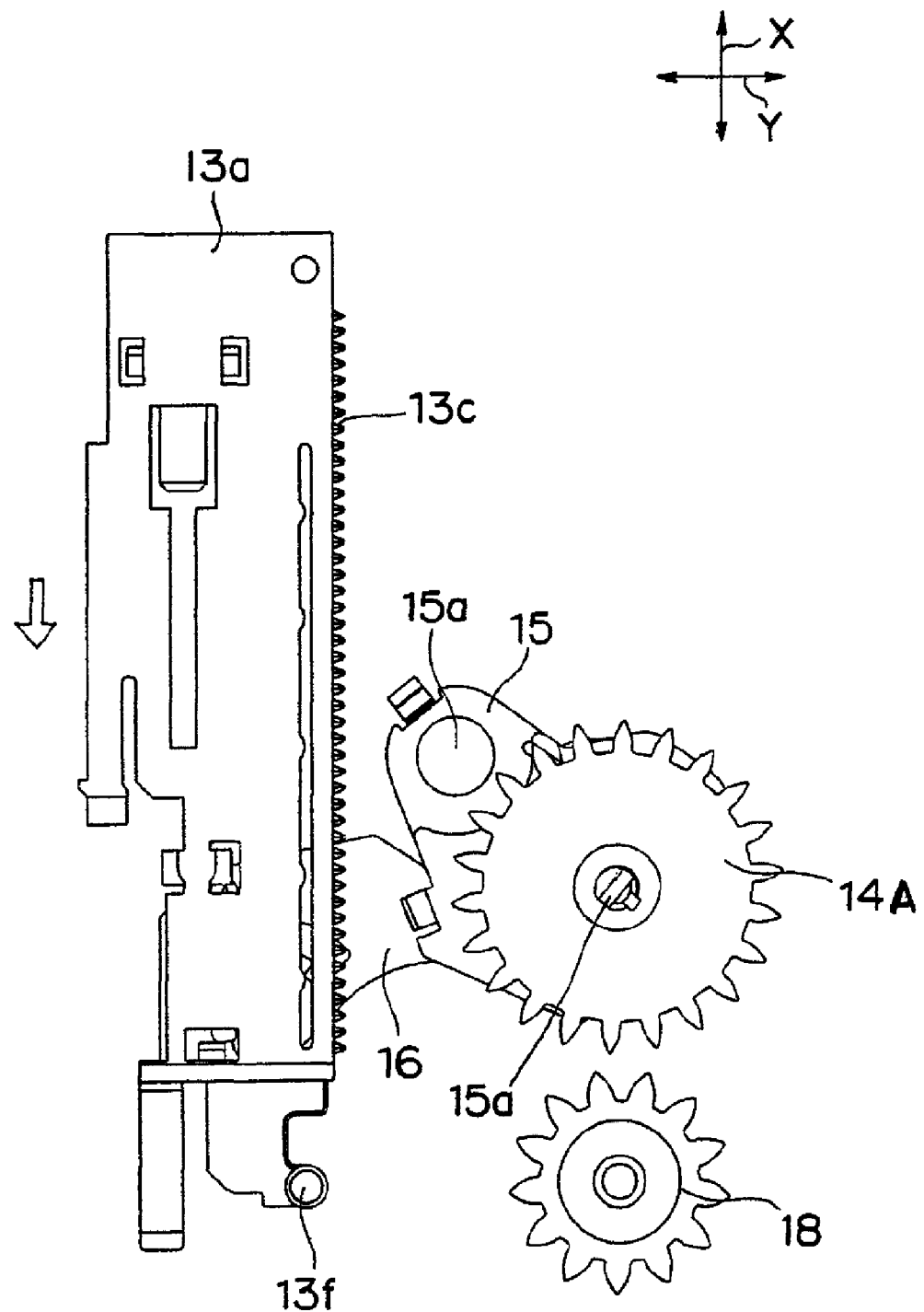
FIG. 9A is a plan view that shows a state in which the upper plate-shaped member of the feeding rack has been moved from the state of FIG. 8A.
Figure 9B:
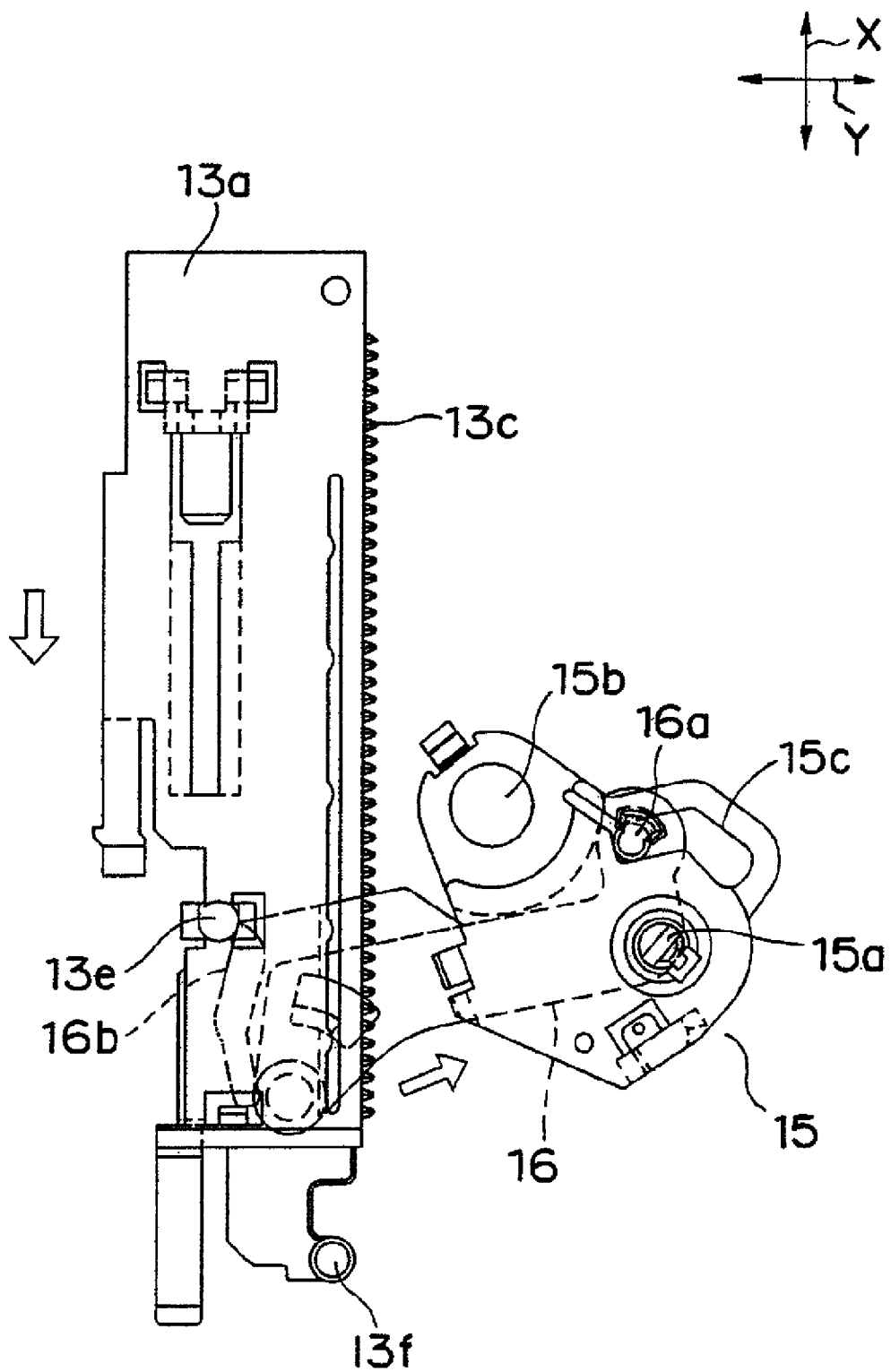
FIG. 9B is a view that shows one portion of FIG. 9A in a perspective manner through parts.
Figure 10A:
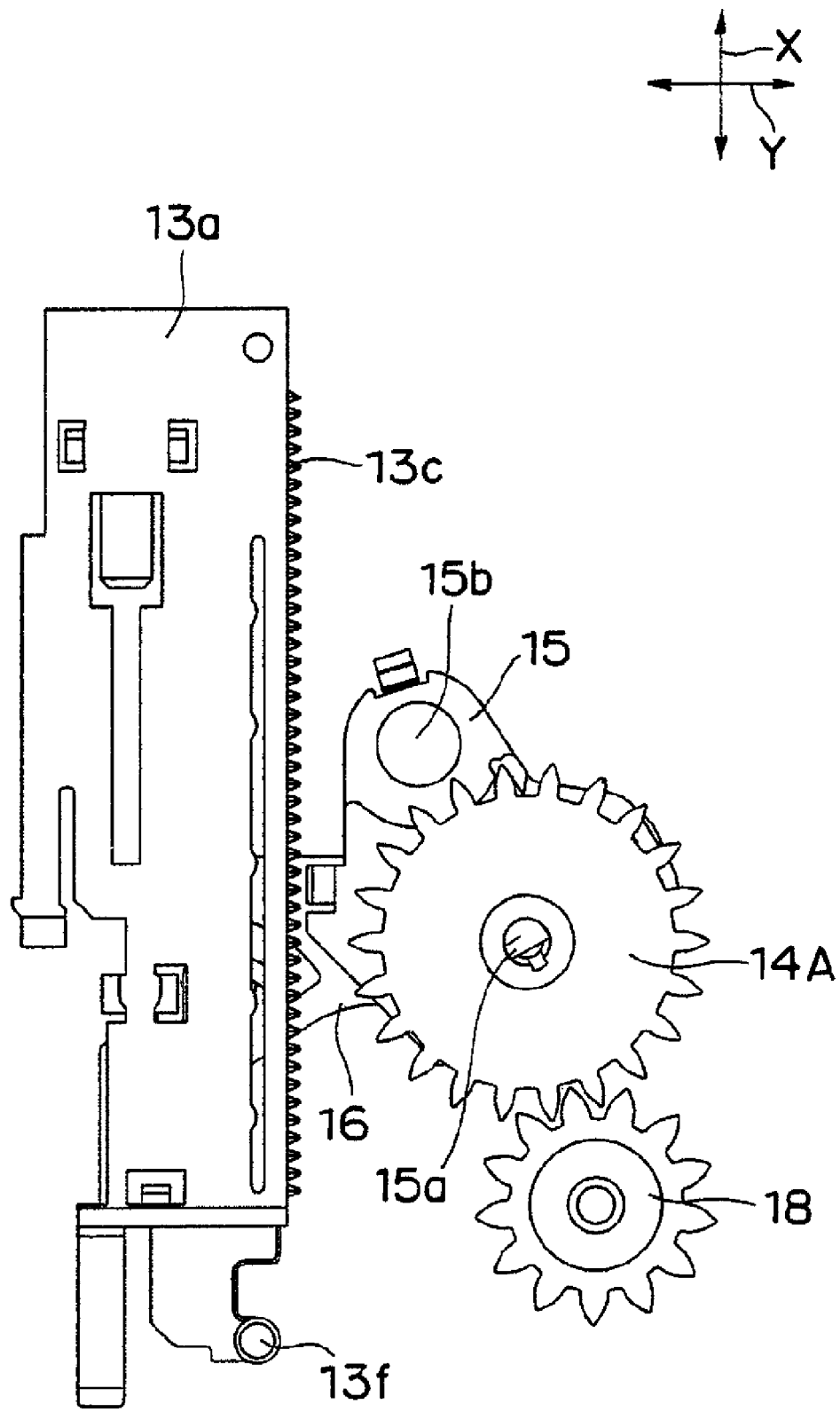
FIG. 10A is a plan view that shows a state in which the upper plate-shaped member of the feeding rack has been further moved from the state of FIG. 9A.
Figure 10B:
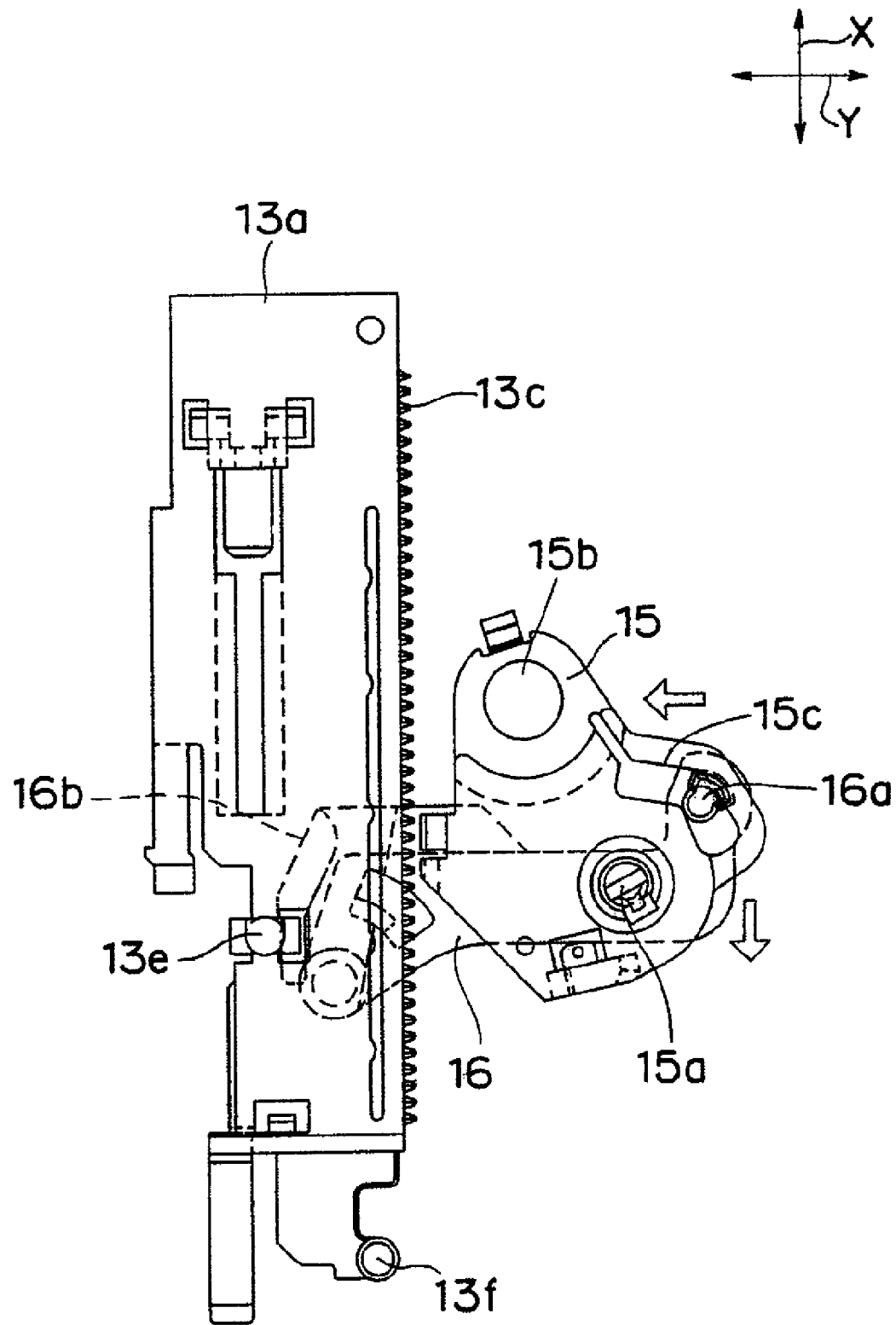
FIG. 10B is a view that shows one portion of FIG. 10A in a perspective manner through parts.

In the case where the upper-side plate-shaped member 13a is further moved in a disc radial direction (downward in FIGS. 8A and 8B) as described above, the tilt face 16b of the swing lock 16 is made in contact with a contact pin 13e attached to the upper-side plate-shaped member 13a, as shown in FIGS. 9A and 9B. At this time, since the upper-side plate-shaped member 13a is guided so as to move in one direction (the disc radial direction), the swing lock 16 is pushed by the contact pin 13e to be moved. At this time, the moving direction of the swing lock 16 is directed along the shape of the guide hole 15c because the engaging pin 16a is engaged with the guide hole 15c. Thus, as shown in FIGS. 10A and 10B, the swing lock 16 is moved, and the swing arm 15, pushed by the swing lock 16, approaches the upper-side plate-shaped member 13a against the urging force of the torsion spring, and also moves in the same direction as the moving direction of the upper-side plate-shaped member 13a (downward in FIGS. 10A and 10B). By this movement, the relay gear 14B is moved in the same manner as in the swing arm 15 so that the relay gear 14B and a play pinion 18 are meshed with each other, with the result that the driving force of the first motor 10 is transmitted to the play pinion 18 through the first and second traverse gears 11 and 12, the loading gear 13 and the relay gear 14B. The play pinion 18 is shaft-supported on one of corner portions of an elevation base 19 having a virtually rectangular shape, which will be described later, so as to rotate thereon.

Holes (not shown) used for attaching vibration removal rubber members 9b are formed on four corners of the traverse base 9, and vibration removal rubber members 9b, each having a through hole in its center, are attached through these holes. Among these vibration removal rubber members 9b, . . . , 9b, the center holes of the two vibration rubber removal members 9b, 9b closer to the turn table 8 side are fitted to mount faces 17a, 17a with shafts of a traverse holding case 17 so that the other two vibration removal rubber members 9b, 9b are placed on the mount faces 17b, 17b with holes, and positioned by fixing pins.

In the same manner as in the traverse base 9, two bosses 17c, 17c that protrude in respectively departing directions are formed on the respective ends of a pair of side faces that face with each other of the traverse holding case 17. Moreover, two bosses 17d, 17d are formed in parallel with each other on the side face closer to the turn table 8 of the traverse holding case 17. By inserting the two bosses 17c, 17c into holding holes (not shown) formed on the elevation base 19, the traverse holding case 17 is held on the elevation base 19 so as to rotate centered on a straight line connecting the bosses 17c, 17c serving as a shaft. Here, the bosses 17d, 17d of the traverse holding case 17 are respectively engaged with two cam grooves 20a, 20a formed on a traverse slide plate 20 so as to slide thereon.

The traverse slide plate 20 is attached to the stand-by section B2 side of the elevation base 19 in a device-width direction Y orthogonal to the device-depth direction X as well as to the device-thickness direction Z so as to slide and move thereon. Each of the two cam grooves 20a, 20a of the traverse slide plate 20 has a tilt portion that tilts downward in the device-thickness direction Z as it approaches the play pinion 18 in the device-width direction Y. When the traverse slide plate 20 is slide-moved so as to depart from the play pinion 18 in the device-width direction Y, the bosses 17d, 17d of the traverse holding case 17 are allowed to slide from the upper side to the lower side in the device-thickness direction Z along the cam grooves 20a, 20a. Consequently, the entire traverse holding case 17 is rotated downward around a straight light connecting the bosses 17c, 17c serving as a shaft. In contrast, when the traverse slide plate 20 is slide-moved so as to approach the play pinion 18 in the device-width direction Y, the bosses 17d, 17d of the traverse holding case 17 are allowed to slide from the lower side to the upper side in the device-thickness direction Z along the cam grooves 20a, 20a. Consequently, the entire traverse holding case 17 is rotated upward around the straight light connecting the bosses 17c, 17c serving as a shaft. By this upward rotation of the traverse holding case 17, the turn table 8 is raised so that the disc 6 is sandwiched between a clamper 21 made of resin, placed above the turn table 8, and the raised turn table 8.

In the present embodiment, the position that is raised so as to allow the turn table 8 to sandwich the disc 6 between it and the damper 21 is referred to as a "clamp position". Moreover, the position that is lowered so as to make the turn table 8 depart from the clamper 21 is referred to as a "retreat position".

The clamper 21 is attached to a clamp plate 25 made of metal, having a virtually rectangular shape, by using a fixing plate 23 made of resin and a back yoke 24 made of metal, with a slight shift being allowed in the device-thickness direction Z. Moreover, a magnet 22 is placed between the damper 21 and the clamp plate 25 so that the damper 21 is urged toward the clamp plate 25 by a magnetic force of the magnet 22. That is, when an external force is applied downward to the back yoke 24 against the magnetic force of the magnet 22, the damper 21 is slightly shifted downward relative to the clamp plate 25. When no external force is applied, the damper 21 is placed so as to approach the clamp plate 25. By attaching the clamper 21 in this manner, it is possible to suppress disc 6 from being damaged. The clamp plate 25 is bent at its two end portions, and secured to the elevation base 19 by its bent portions. Therefore, the clamp plate 25 is designed so as to move upward and downward integrally with the elevation base 19.

Two tray stoppers 30, 30 such as linear springs are attached to side portions on the stand-by section B2 side of the clamp plate 25. Each of the two tray stoppers 30, 30 has its one end attached to the clamp plate 25, with the other end being engaged with an engaging hole (not shown) formed on the upper cover 3 so as to slide therein. When the clamp plate 25 is separated from the upper cover 3, each of the tray stoppers 30, 30 is allowed to slide in the engaging hole of the upper cover 3, and rises so as to increase the tilt angle relative to the upper face of the clamp plate 25. In contrast, when the clamp plate 25 approaches the upper cover 3, each of the tray stoppers 30, 30 is allowed to slide in the engaging hole of the upper cover 3, and falls so as to reduce the tilt angle relative to the upper face of the clamp plate 25. By attaching the tray stoppers 30, 30 in this manner, trays, located on the upper steps than the selected tray located at the recording/reproducing position A1, are regulated so as not to move to the recording/reproducing position A1. More specifically, for example, supposing that the selected tray is the tray 5c on the third step, the tray stoppers 30, 30 are made in contact with the side face of the tray 5a on the first step, with the clamp plate 25 being made in contact with the side face of the tray 5b on the second step, so that the trays 5a and 5b on the first and second steps are regulated so as not to move to the recording/reproducing position A1. In this case, the tray 5d on the fourth step and the tray 5e on the fifth step are regulated by the side wall of the elevation base 19 so as not to move to the recording/reproducing position A1.

Figure 11:
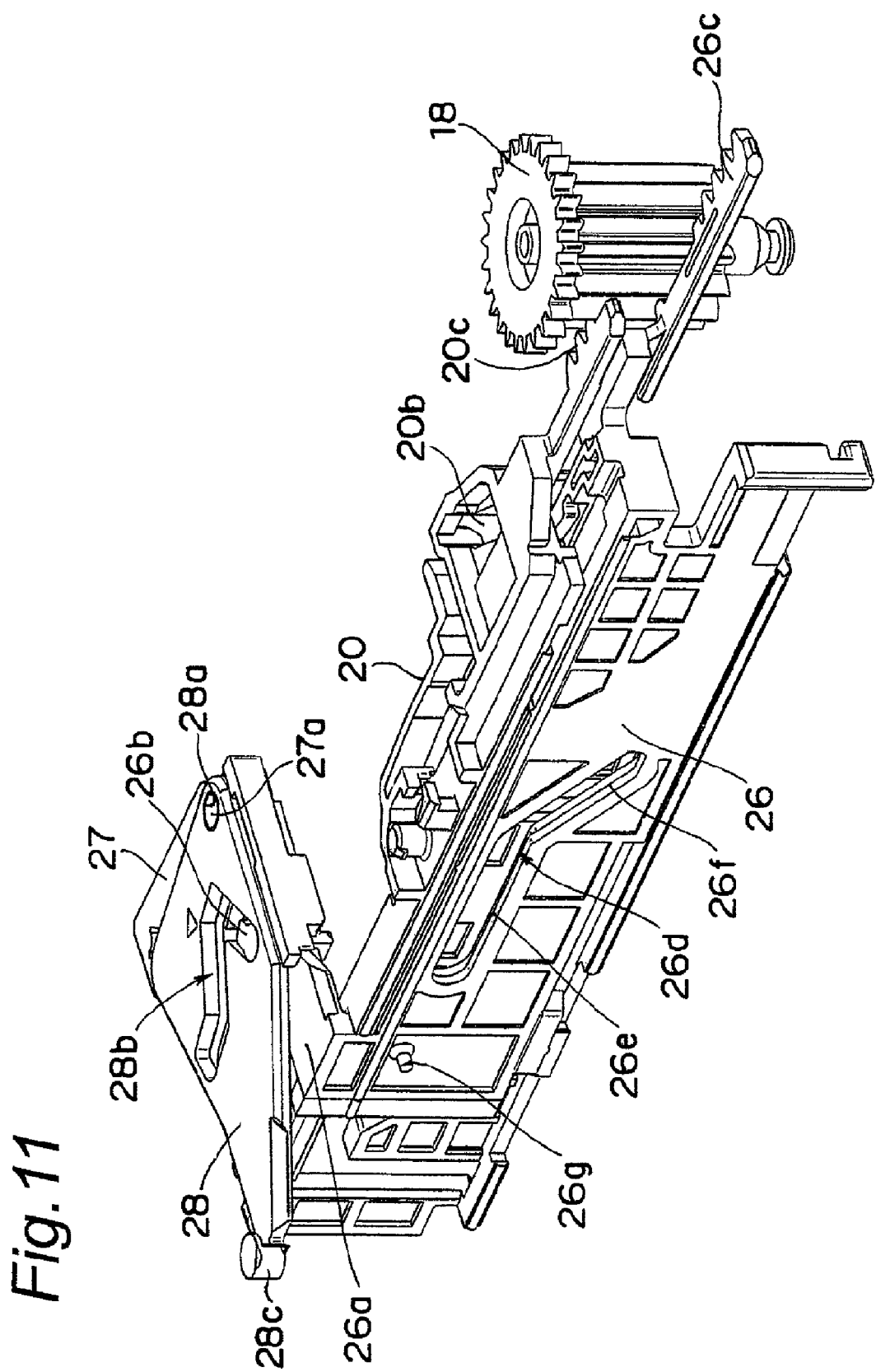
FIG. 11 is a perspective view that shows a structure of a tray transporting mechanism that transports a tray between the recording/reproducing position and the stand-by position in the disc changer device in accordance with the embodiment of the present invention.
Figure 12:
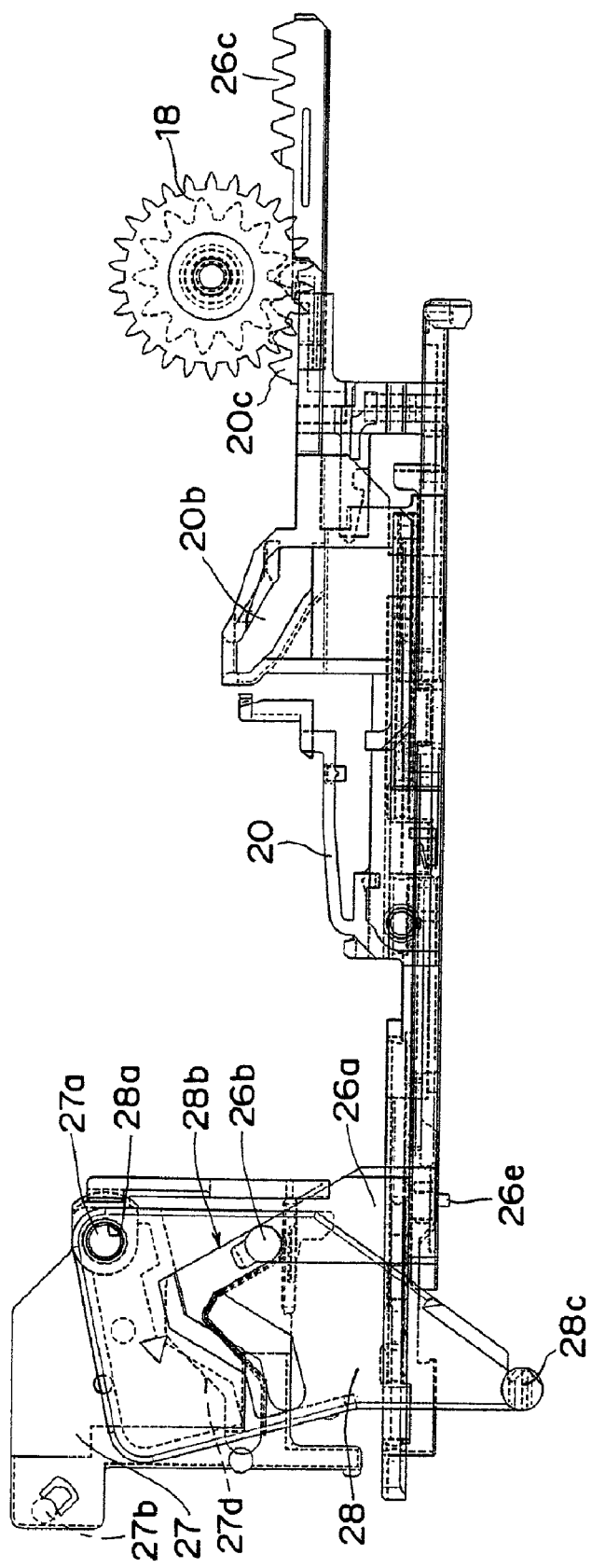
FIG. 12 is a plan view that shows the tray transporting mechanism of FIG. 11.
Figure 13:
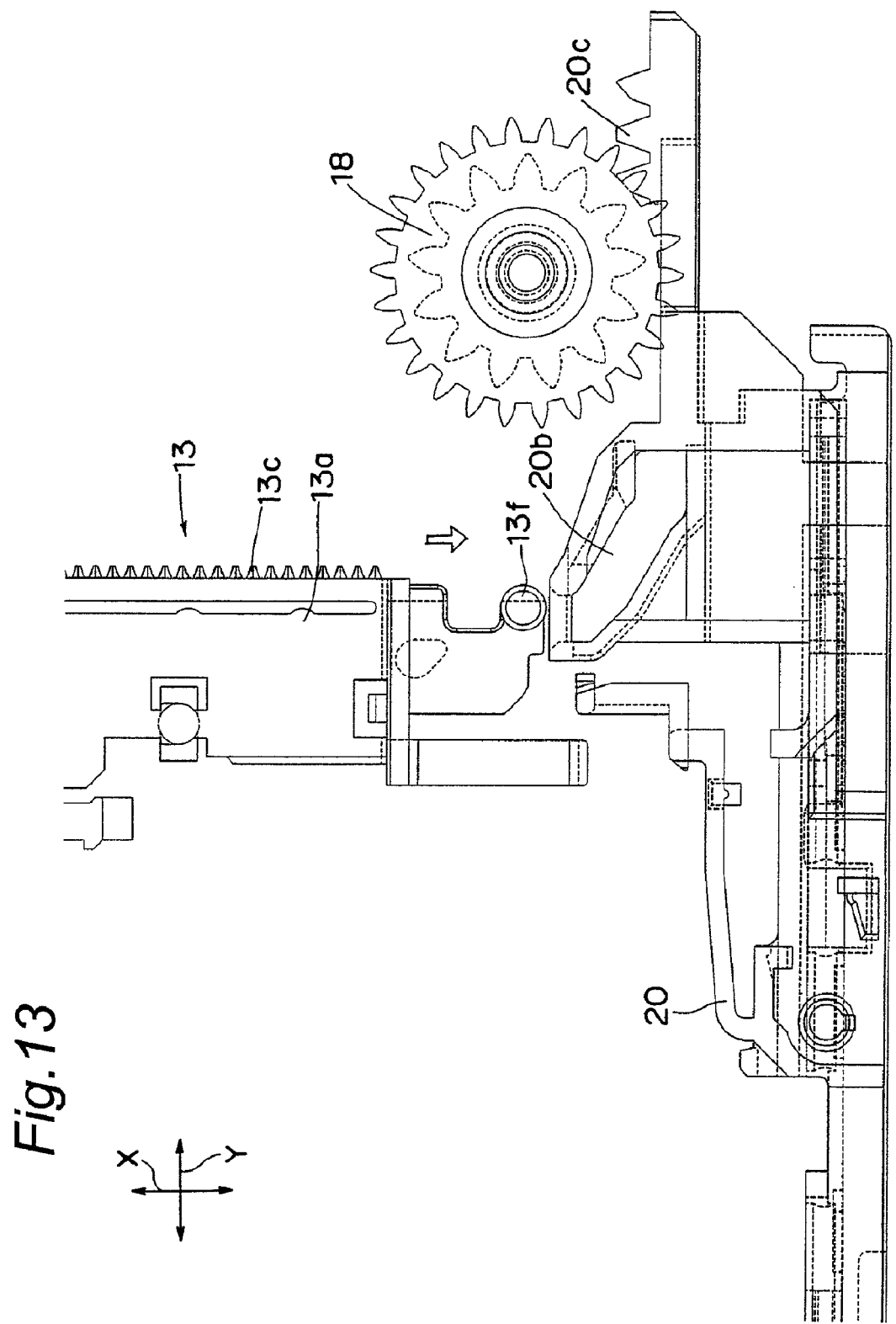
FIG. 13 is a plan view that shows a state prior to engagement between the feeding rack and a traverse slide plate.
Figure 14:
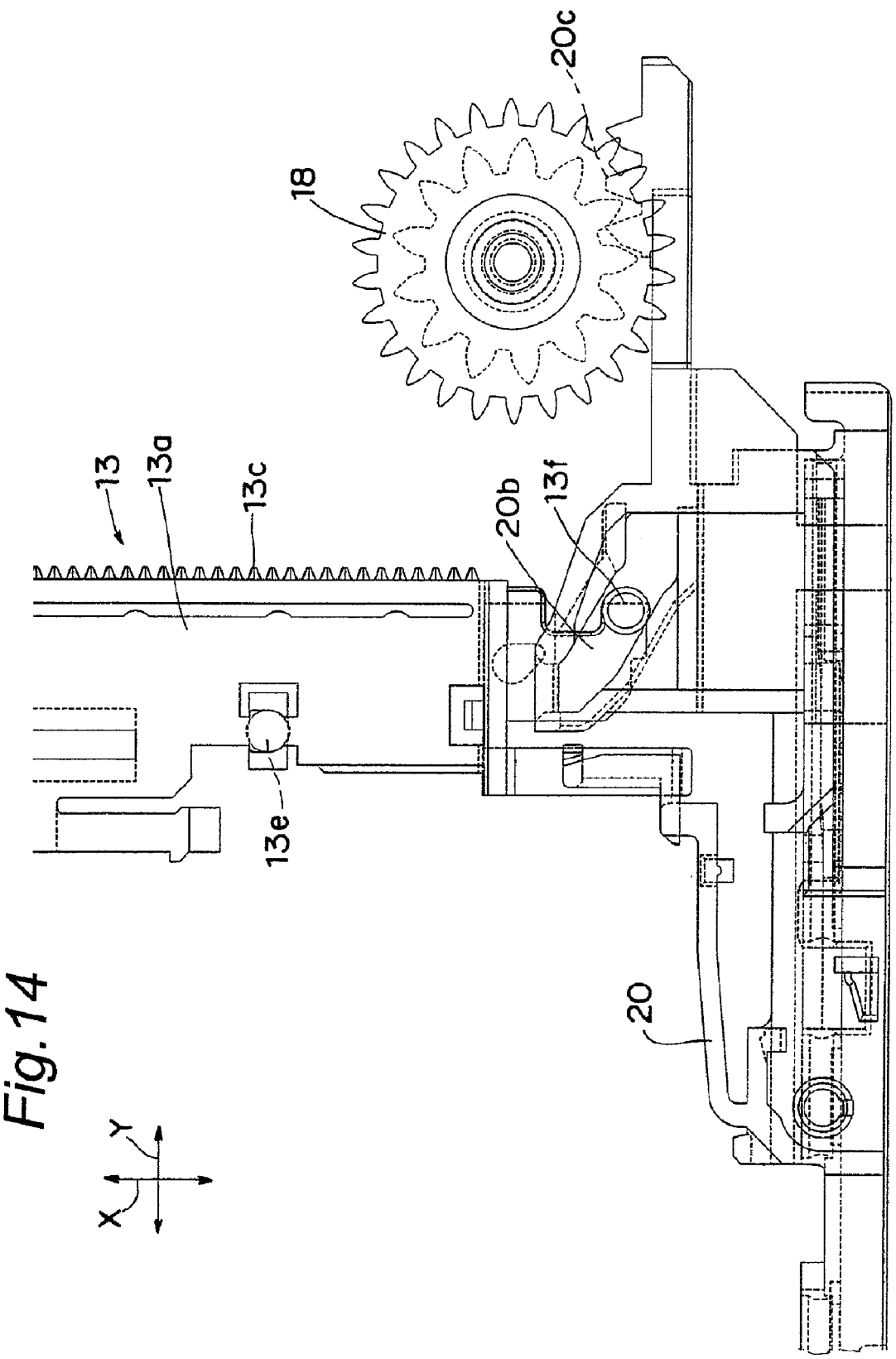
FIG. 14 is a plan view that shows a state in which the feeding rack and the traverse slide plate have been engaged with each other.
Figure 15:
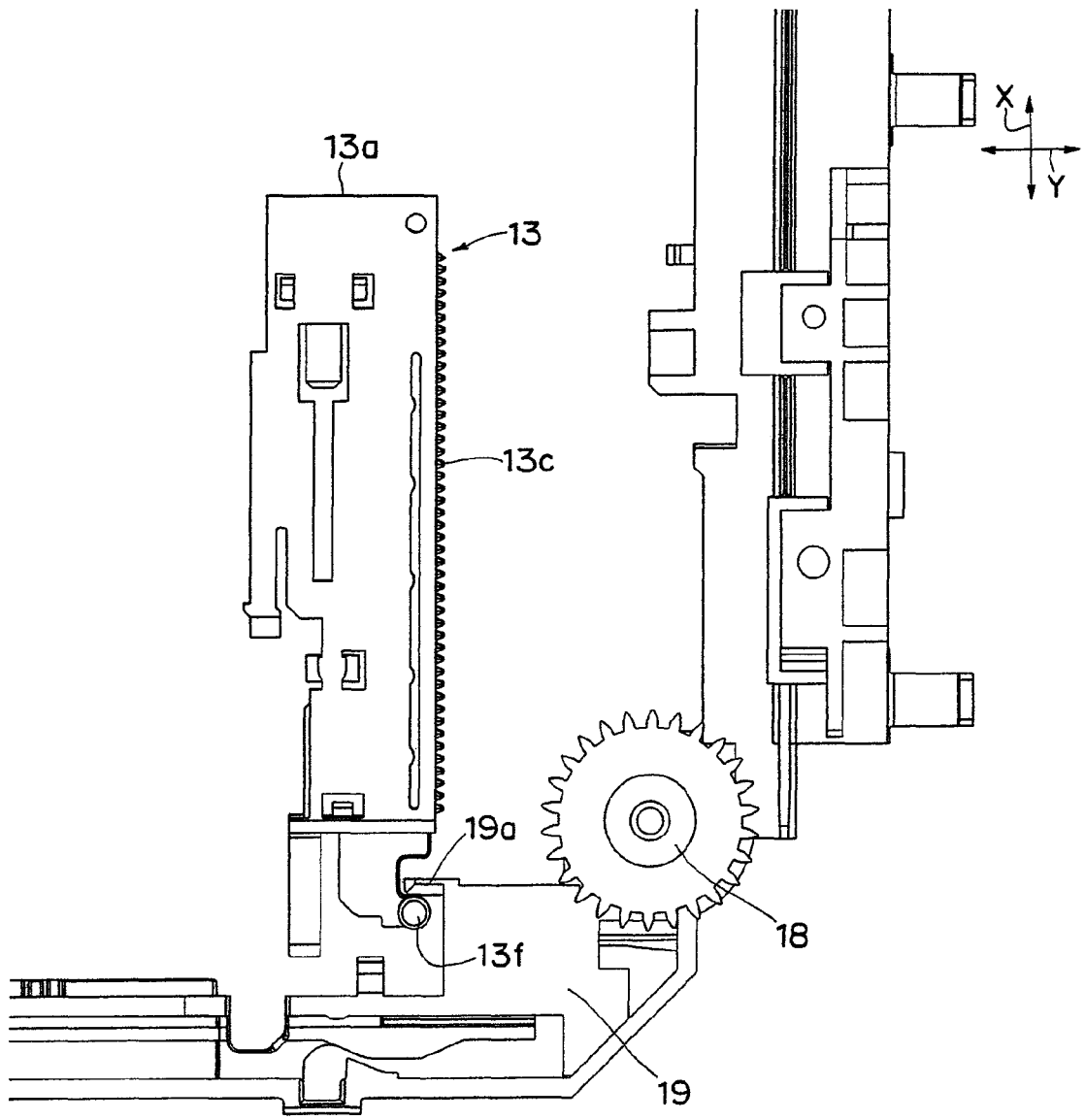
FIG. 15 is a plan view that shows a state in which a pin of the feeding rack and a stopping claw of an elevation base are engaged with each other.

Moreover, as shown in FIGS. 11 and 12, an introducing groove 20b that tilts so as to approach the play pinion 18 in the device-width direction Y as it comes close to the stand-by section B2 side in the device-depth direction X is formed on the traverse slide plate 20. Here, as shown in FIGS. 7A and 7B, a pin 13f that can be engaged with the introducing groove 20b so as to slide therein is formed on an upper-side plate-member 13a of a feeding rack 13 at the tip portion thereof on the stand-by section B2 side in the device-depth direction X. As shown in FIG. 13, when the upper-side plate-shaped member 13a is further moved toward the stand-by section B2 side in the device-depth direction X from a lower-side plate-shaped member 13b, the pin 13f is moved along the introducing groove 20b. At this time, since the moving direction of the upper-side plate-shaped member 13a is fixed to one direction, the pin 13f pushes the side wall of the introducing groove 20b, as shown in FIG. 14, so that the traverse slide plate 20 is slide-moved in a departing direction from the play pinion 18 in the device-width direction Y. By this slide-movement, a rack 20c attached to the tip portion of the traverse slide plate 20 is meshed with the play pinion 18. In this state, when the driving force of the first motor 10 is transmitted to the play pinion 18, the play pinion 18 is allowed to further slide-move the traverse slide plate 20 in the device-width direction Y (leftward in FIG. 13). This further slide movement allows the bosses 17d, 17d of the traverse holding case 17 to slide along the cam grooves 20a, 20a of the traverse slide plate 20 so that the traverse holding case 17 is allowed to pivot downward to move to the retreat position. When the traverse holding case 17 has been moved to the retreat position, the pin 13f, moved together with the traverse holding case 17, is engaged with an engaging claw 19a formed on the elevation base 19 to be stopped, as shown in FIG. 15. Thus, the movement of the feeding rack 13 in the disc radial direction is regulated.

In the present embodiment, the first and second traverse gears 11 and 12, the feeding rack 13, the loading gear 14A, the relay gear 14B, the play pinion 18, the traverse slide plate 20 are allowed to form a disc clamp unit capable of moving the traverse base 9 between the clamp position and the retreat position.

Moreover, between the traverse slide plate 20 and the side face of the elevation base 19 on the stand-by section B2 side, a sub-slide plate 26 is attached so as to slide-move in the device-width direction Y. As shown in FIGS. 11 and 12, on the upper end portion of the sub-slide plate 26 on the departing side from the play pinion 18 in the device-width direction Y as well as on the recording/reproducing section B1 side, a protruding claw 26a having a virtually plate shape in parallel with the device-depth direction X and the device-width direction Y is formed. A load blade 27 and a load lever 28 are installed so as to sandwich this protruding claw 26a. As shown in FIGS. 11 and 12, a boss 27a that protrudes upward in device-thickness direction Z is formed on the load plate 27. The boss 27a is inserted into a hole 28a formed on the load lever 28 to shaft-support the load lever 28 so as to rotate therein. Moreover, as shown in FIG. 16A, two engaging pins 27b and 27c that respectively protrude downward in the device-thickness direction Z are formed on the load plate 27. These engaging pins 27b and 27c are respectively engaged with engaging grooves 19b and 19c respectively formed on the elevation base 19, with a virtually L-letter shape in parallel with the load blade 27, so as to slide therein. The engaging grooves 19b and 19c are disposed to deviate from each other in the device-depth direction X as well as in the device-width direction Y. With this arrangement, when the engaging pins 27b and 27c of the load plate 27 slide on the engaging grooves 19b and 19c, the load plate 27 is allowed to move in parallel therewith without rotating in the face direction.

Figure 16B:
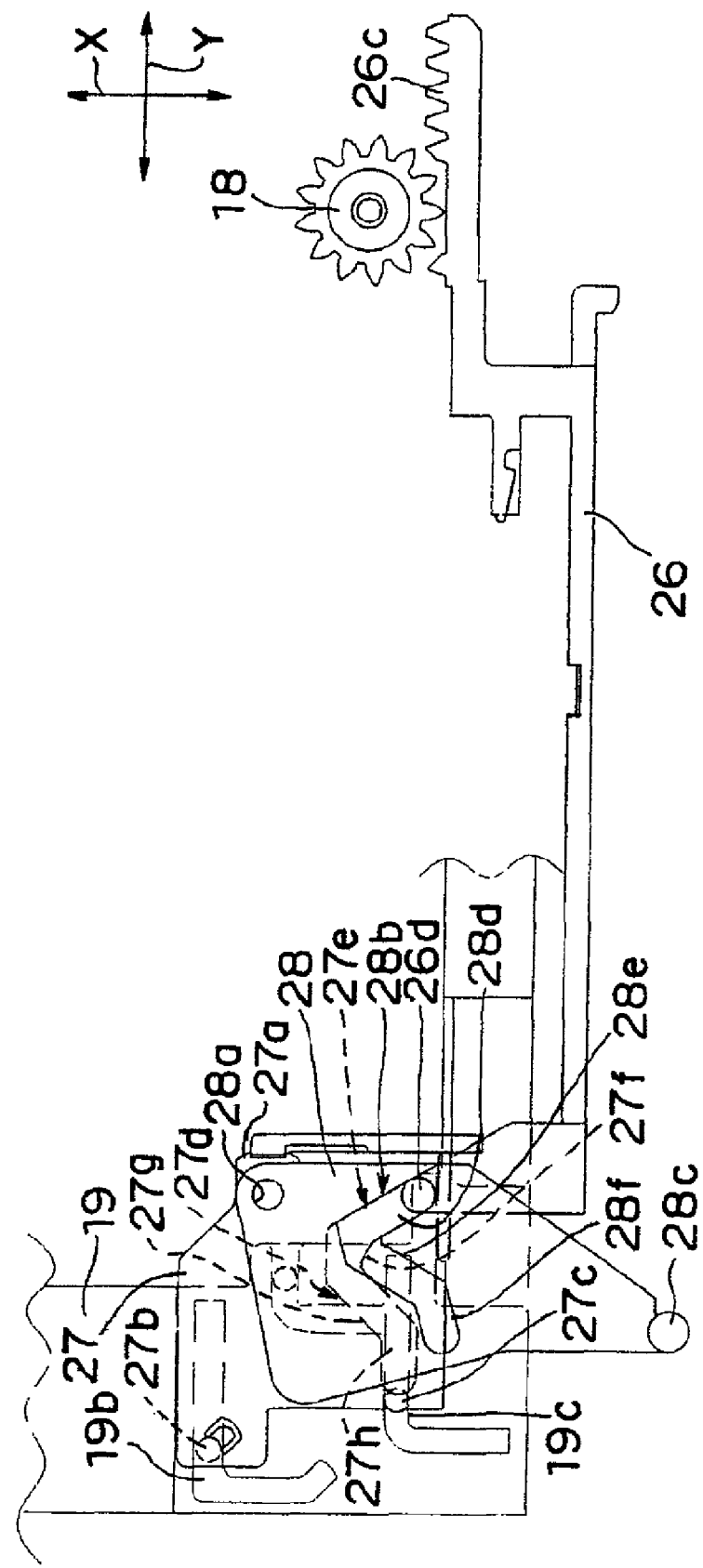
FIG. 16B is a plan view that shows a state following the state of FIG. 16A in which the tray is transported from the recording/reproducing position to the stand-by position.
Figure 16C:
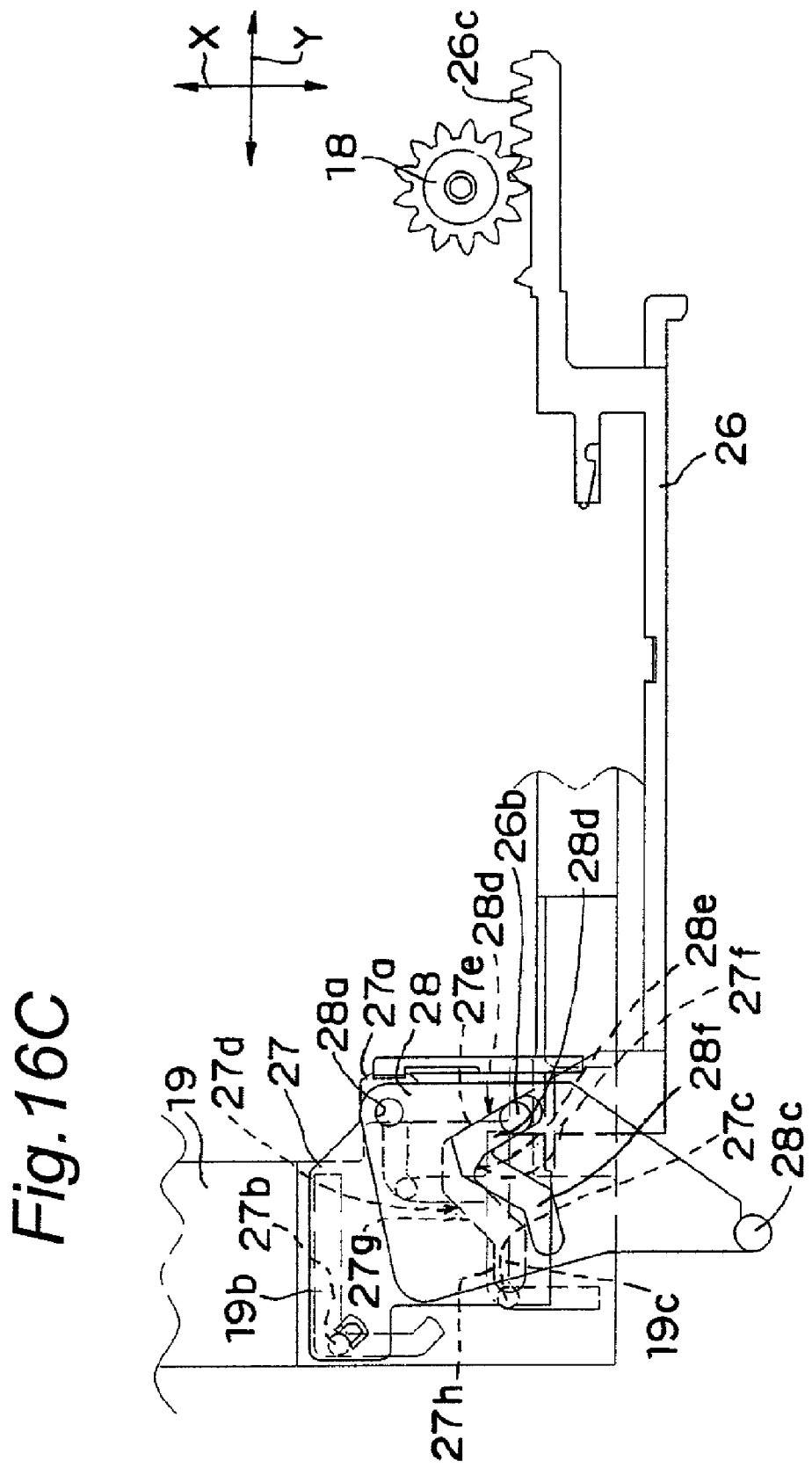
FIG. 16C is a plan view that shows a state following the state of FIG. 16B.

Moreover, an engaging pin 26b that protrudes upward as well as downward in the device-thickness direction Z is attached to the tip portion of the protruding portion 26a of the sub-slide plate 26. This engaging pin 26b protruding downward of the protruding portion 26a is engaged with an engaging groove 27d formed on the load plate 27 with a virtually L-letter shape so as to slide therein. Thus, when the sub-slide plate 26 is slide-moved in a departing direction from the play pinion 18, the side wall of the engaging groove 27d of the load plate 27 is pushed by the engaging pin 26b of the protruding portion 26a so that, as shown in FIGS. 16A to 16C, the engaging pins 27b and 27c of the load plate 27 slide along the engaging grooves 19b and 19c of the elevation base 19. That is, in the same manner as in the sub-slide plate 26, the load plate 27 is designed to slide-move in a departing direction from the play pinion 18.

Here, as shown in FIG. 16A, the engaging groove 27d of the load plate 27 is provided with first to fourth groove portions 27e to 27h that have respectively different tilt angles. The first groove portion 27e is formed so as to tilt toward the recording/reproducing section B1 side in the device-depth direction X as it departs from the play pinion 18 in the device-width direction Y. The first groove portion 27e is made to tilt abruptly relative to the device-width direction Y so as not to allow the engaging pin 26b of the protruding portion 26a to slide along the first groove portion 27e. When the sub-slide plate 26 is slide-moved in a departing direction from the play pinion 18, the second groove portion 27f also tilts in the same manner as in the first groove portion 27e; however, the degree of its tilt is made smaller in comparison with that of the first groove portion 27e. The third groove portion 27g is made to tilt toward the stand-by section B2 side in device-depth direction X as it departs from the play pinion 18 in the device-width direction Y. The fourth groove portion 27h is formed in parallel with the device-width direction Y.

Here, the engaging pin 26b protruding upward of the protruding portion 26a is engaged with an engaging groove 28b formed on the load lever 28, with a virtually L-letter shape so as to slide therein. Thus, when the sub-slide plate 26 is slide-moved in a departing direction from the play pinion 18, the side wall of the groove portion 28d of the load lever 28 is pushed by the engaging pin 26b of the protruding portion 26a so that the load lever 28 is slide-moved in a departing direction from the play pinion 18 in the same manner as in the load plate 27.

Here, the engaging groove 28b of the load lever 28 is provided with first to third groove portions 28d to 28f having mutually different tilt angles. As shown in FIG. 16A, the angle made by the first groove portion 28d and the second groove portion 28e of the load lever 28 is made narrower than the angle made by the first groove portion 27e and the third groove portion 27g of the load plate 27. The angle made by the second groove portion 28e and the third groove portion 28f of the load lever 28 is made the same as the angle made by the third groove portion 27g and the fourth groove portion 27h of the load plate 27.

Figure 17A:
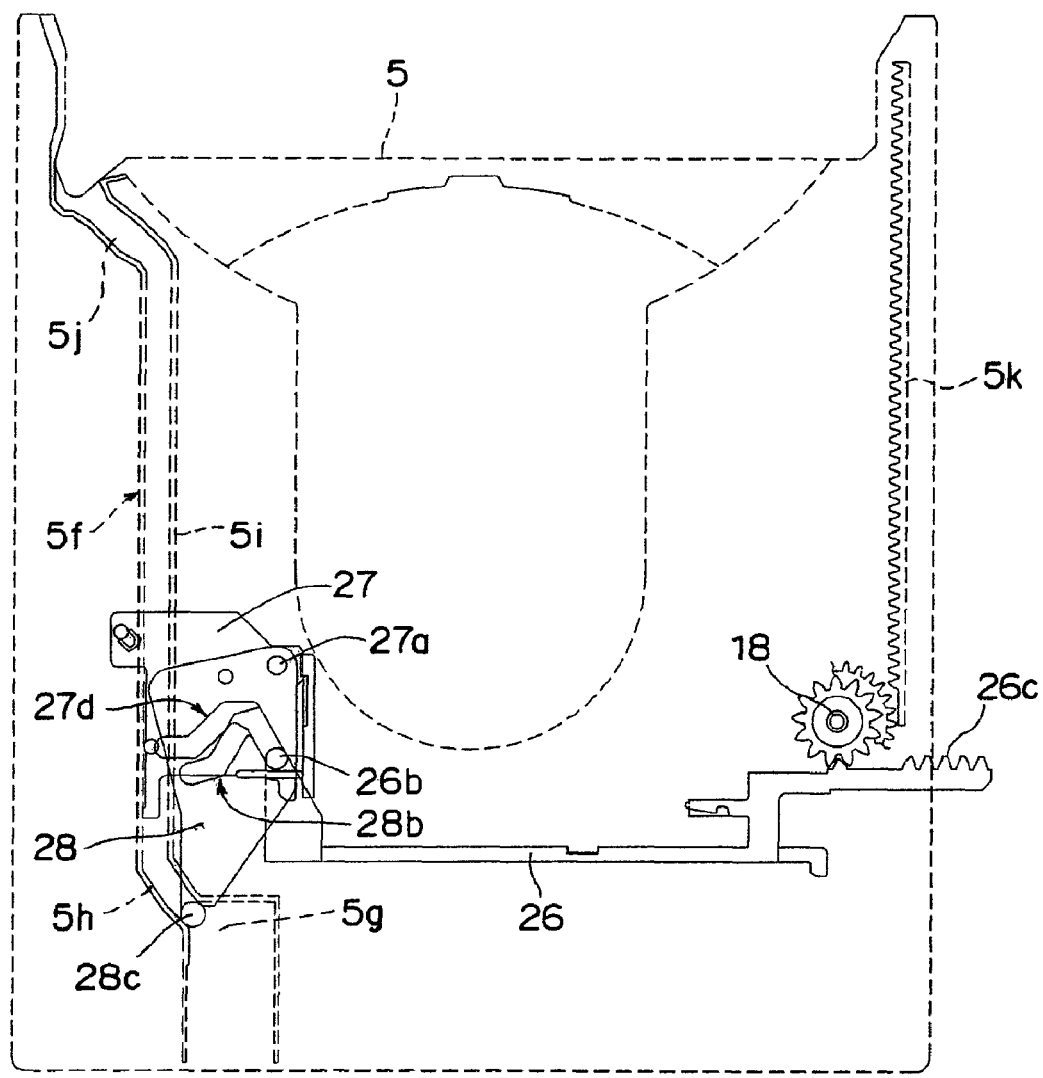
FIG. 17A is a plan view that shows a positional relationship between the tray transporting mechanism and the tray shown in FIG. 11, when the tray is located at the recording/reproducing position.

Moreover, a tray driving pin 28c is attached to the tip portion on the stand-by section B2 side of the load lever 28. When the sub-slide plate 26 is located closest to the play pinion 18 side, the tray driving pin 28c is engaged with the tray 5 at a terminal portion 5g of the guide groove 5f formed on the rear face of the tray 5 located at the recording/reproducing position A1, as shown in FIG. 17A. In addition to the terminal portion 5g, the guide groove 5f is provided with a first tilt portion 5h, a linear portion 5i and a second tilt portion 5j. The first tilt portion 5h has one end that is connected to the terminal portion 5g, while the other end is allowed to tilt toward the recording/reproducing section B2 side (upper side of FIG. 17A) as it departs from the play pinion 18. The linear portion 5i has one end that is connected to the tilt portion 5h, and extends in parallel with the device-depth direction X. The second tilt portion 5j has one end that is connected to the other end of the linear portion 5i, while the other end is allowed to tilt toward the recording/reproducing section B2 side (upper side of FIG. 17A) as it departs from the play pinion 18. The other end of the second tilt portion 5*j* is released, without being stopped.

Figure 17B:
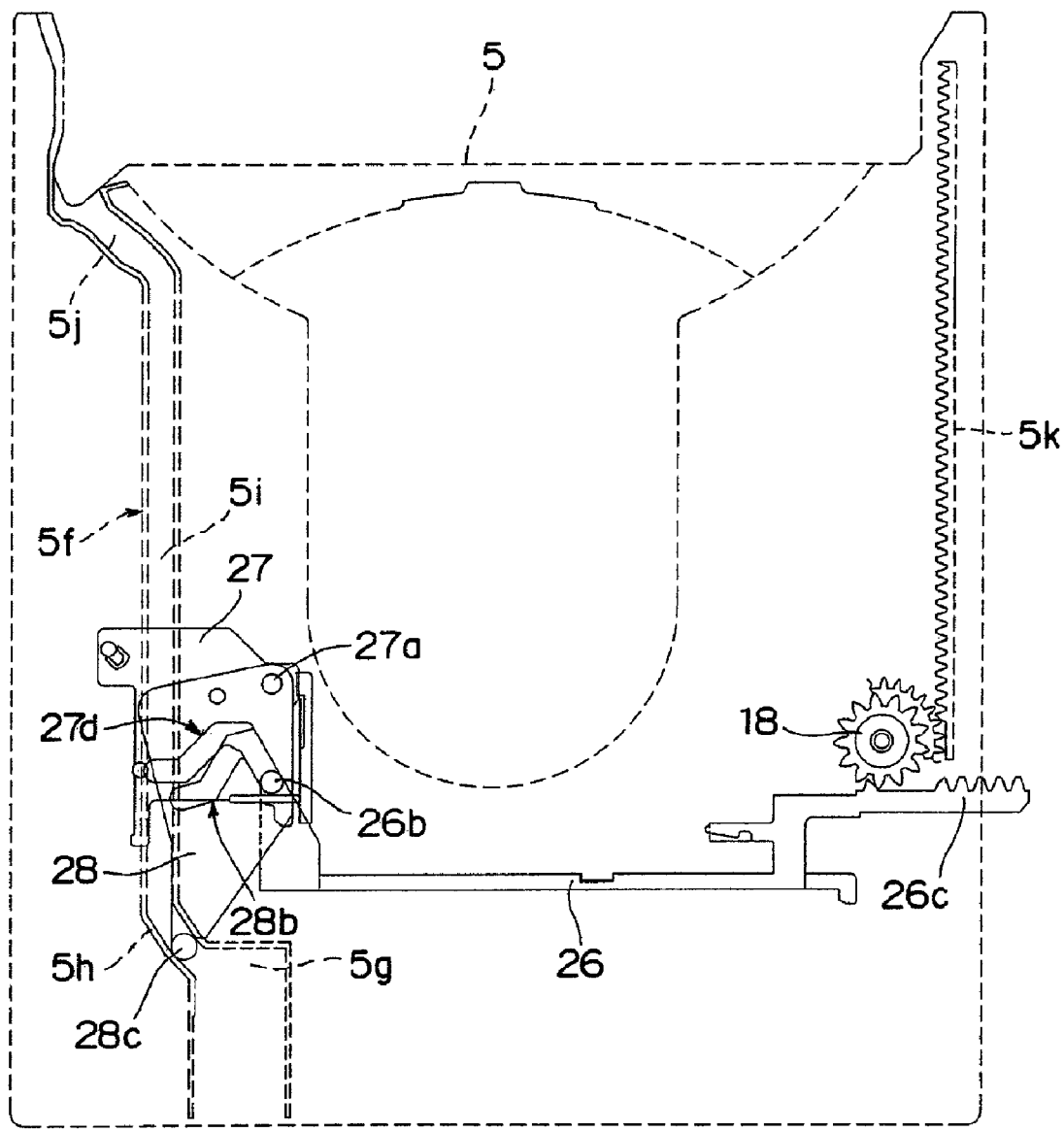
FIG. 17B is a plan view that shows a positional relationship between the tray transporting mechanism and the tray in a state following FIG. 17A, when the tray is transported from the recording/reproducing position to the stand-by position.

As described above, when the load lever 28 is slide-moved in a departing direction from the play pinion 18, the tray driving pin 28*c* is introduced to the vicinity of an inlet of the first tilt portion 5*h* along the side wall of the terminal portion 5*g*, as shown in FIG. 17A. In this state, when the load lever 28 is further moved, the tray driving pin 28*c* slides on the first tilt portion 5*h* as shown in FIG. 17B, and moves to the vicinity of an inlet of the linear portion 5*i*. At this time, the play pinion 18 is meshed with a rack 5*k* formed on the lower face of the side portion of the tray 5 in parallel with device-depth direction X. In this state, when the driving force of the first motor 10 is transmitted to the play pinion 18, the tray 5 is moved toward the stand-by section B2 side (downward in FIG. 17A) in the device-depth direction X so that the tray driving pin 28*c* slides on the linear portion 5*i*. At this time, a rack 26*c* (see FIG. 11), formed on the end of the sub-slide plate 26 on the opposite side to the formation side of the protruding claw 26*a*, and the play pinion 18 are not meshed with each other, as shown in FIG. 17C.

Figure 17C:
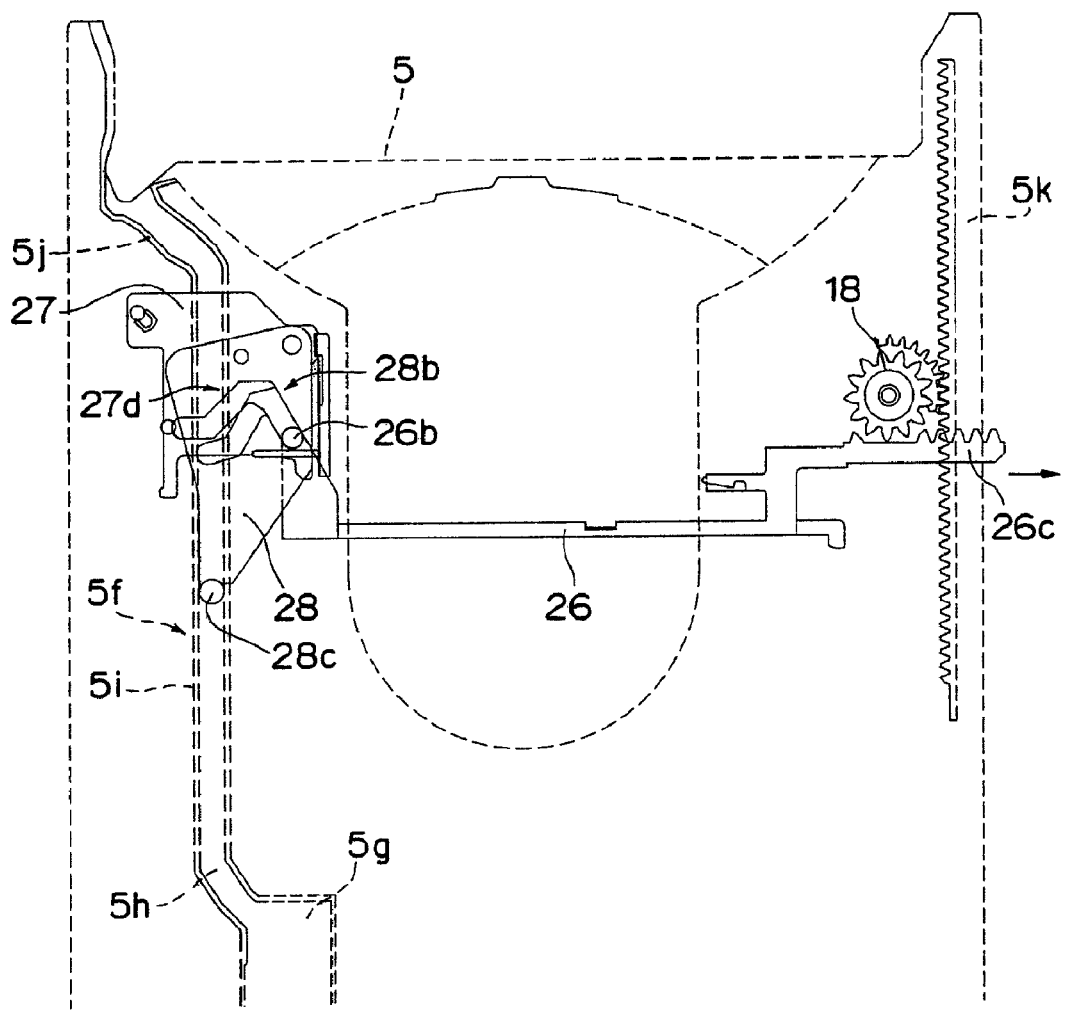
FIG. 17C is a plan view that shows a state following the state of FIG. 17B.
Figure 17D:
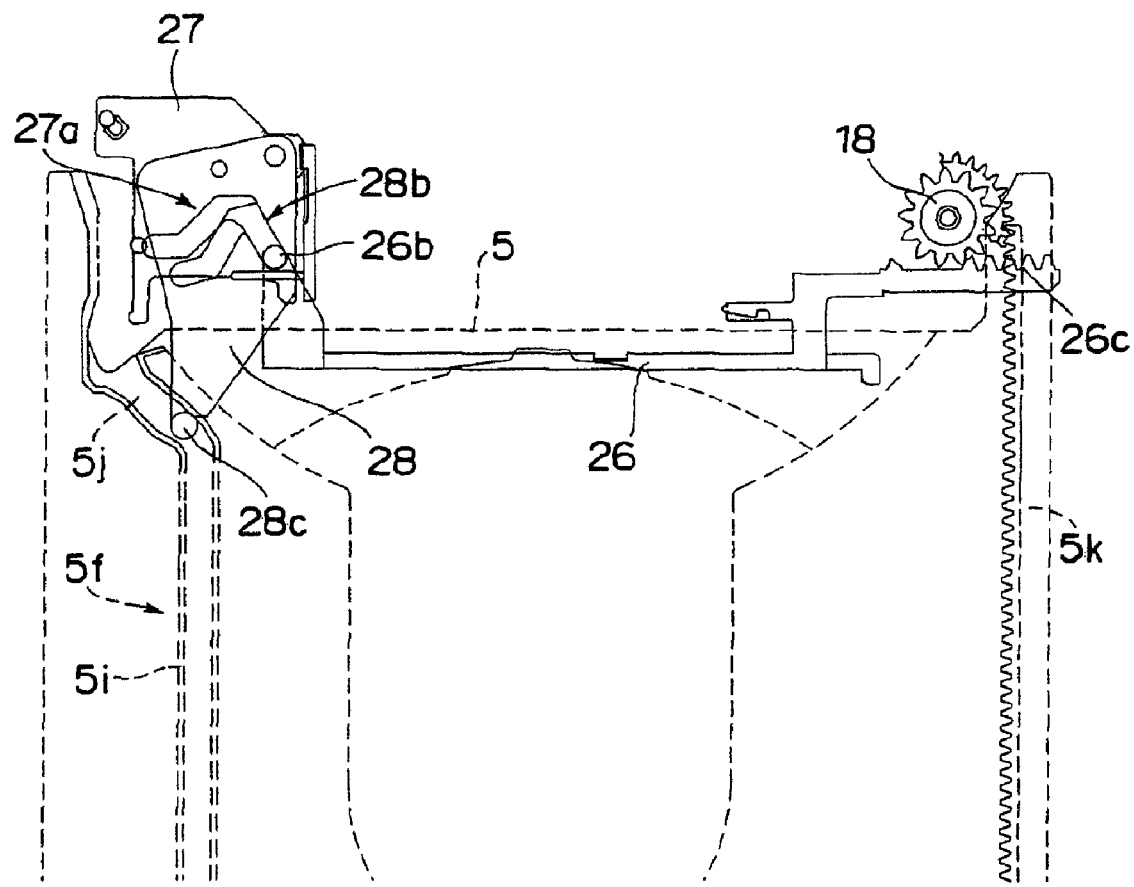
FIG. 17D is a plan view that shows a state following the state of FIG. 17C.
Figure 17E:
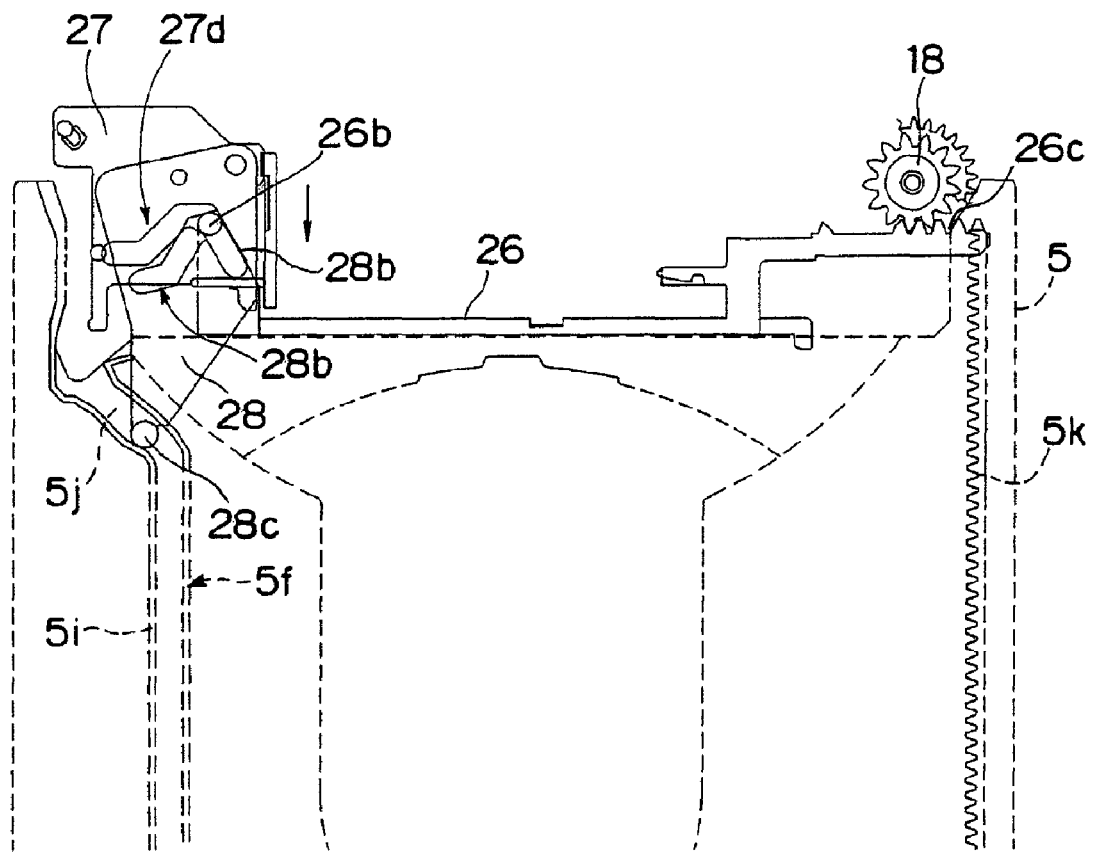
FIG. 17E is a plan view that shows a state following the state of FIG. 17D.

When the tray 5 is further moved toward the stand-by section B2 side from the state shown in FIG. 17C, the tray driving pin 28*c* is moved to the vicinity of an inlet of the second tilt portion 5*j*, as shown in FIG. 17D. In this state, when the tray 5 is further moved toward the stand-by section B2 side, the tray driving pin 28*c* slides on the second tilt portion 5*j* as shown in FIG. 17E. At this time, the tray driving pin 28*c* is pushed by the side wall of the second tilt portion 5*j* so that, as shown in FIG. 16*c*, the load lever 28 is further moved to the side departing from the play pinion 18 in the device-width direction Y. At this time, the sub-slide plate 26, coupled to the load lever 28 through the load plate 27, is also moved to the side departing from the play pinion 18 in the device-width direction Y. Thus, the meshed state between the play pinion 18 and the rack 5*k* of the tray 5 is released, while the play pinion 18 and the rack 26*c* of the sub-slide plate 26 are meshed with each other. In this state, when the driving force of the first motor 10 is transmitted to the play pinion 18, the sub-slide plate 26 is pushed toward the side departing from the play pinion 18 in the device-width direction Y. Thus, as shown in FIG. 17E, pushed by the engaging pin 26*b* of the sub-slide plate 26, the load lever 28 is moved toward the stand-by section B2 side in the device-depth direction X (lower side of FIG. 17E). In accordance with this movement, pushed by the tray driving pin 26*c* of the load lever 26, the tray 5 is moved toward the stand-by section B2 side in the device-depth direction X (lower side of FIG. 17E). Thus, the tray 5 is located at the stand-by position A2.

Figure 16F:
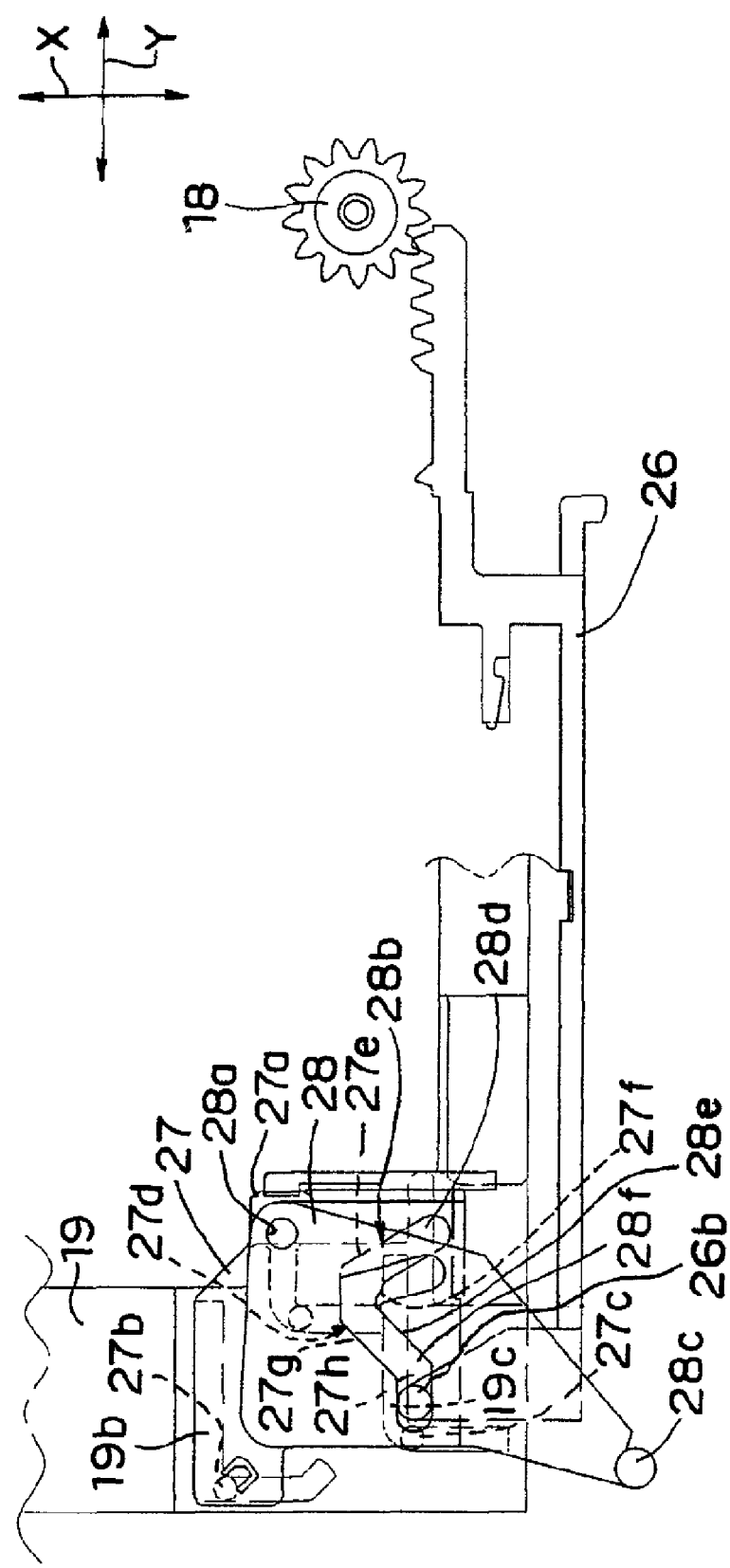
FIG. 16F is a plan view that shows a state following the state of FIG. 16E.
Figure 17F:
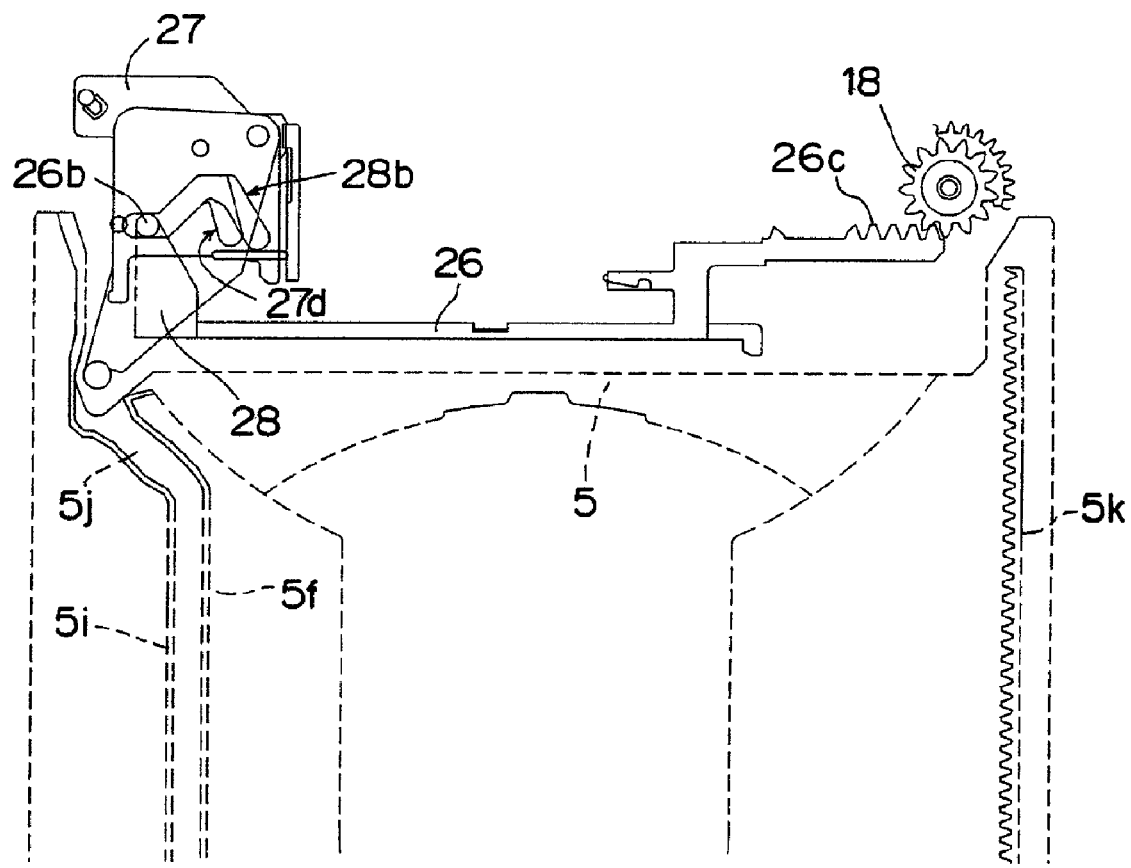
FIG. 17F is a plan view that shows a state following the state of FIG. 17E.

When the sub-slide plate 26 is further moved to the side departing from the play pinion 18 from the state shown in FIG. 17E, the engaging pin 26*b* is made in contact with the second groove portion 27*f* of the load plate 27, as shown in FIG. 16D. Thereafter, the load lever 28 is allowed to rotate clockwise in FIG. 16D around the vicinity of the engaging pin 26*b* serving as a shaft. Thus, as shown in FIG. 16E, the third groove portion 27*g* and the fourth groove portion 27*h* of the load plate 27 and the second groove portion 28*e* and the third groove portion 28*f* of the load lever 28 are made coincident with each other. In this state, when the sub-slide plate 26 is further moved to the side departing from the play pinion 18, the load plate 27 and the load lever 28, pushed by the engaging pin 26*b*, are moved to the recording/reproducing section B1 side in the device-depth direction X. When the engaging pin 26*b* is moved to the fourth groove portion 27*h* of the load plate 27 and the third groove portion 28*f* of the load lever 28, the movements of the load plate 27 and the load lever 28 in the device-depth direction X are regulated. Thus, as shown in FIGS. 16F and 17F, the engagement between the tray driving pin 28*c* and the guide groove 5*f* of the tray 5 is released. Thus, the movement of tray 5 from the recording/reproducing position A1 to the stand-by position A2 is completed. Here, the movement from the stand-by position A2 to the recording/reproducing position A1 can be carried out by driving the first motor 10 reversely from the aforementioned direction. In this case, the above-mentioned respective parts are operated completely reversely from the manner as described above.

Here, a switch slider 29 is attached to the sub-slide plate 26 so as to be moved integrally with the sub-slide plate 26. A guide groove (not shown) is formed on the switch slider 29 in the device-thickness direction, with a pin 91*a* of a switch rod 91 shown in FIG. 4 being engaged with the guide groove so as to slide therein. The switch rod 29 is disposed so that, in the timing at which the switch slider 29 is moved with the sub-slider plate 26 so that the engaging pin 26*b* is fitted to the third groove portion 28*f* of the load lever 28, the switch rod 29 is made in contact with a switch (not shown) attached to the elevation base 19 to turn the switch on. By turning the switch on, a control unit (not shown) installed in the device stops the driving operation of the first motor 10. Moreover, when the traverse base 9 is moved upward/downward, the pin 91*a* of the switch rod 91 is moved upward/downward through a guide groove (not shown) of the switch slider 29. Thus, the switch rod 91 is allowed to move integrally with the traverse base 9.

In accordance with the embodiment of the present invention, the load plate 27 and the load lever 28 are arranged as described above so that, in the case where the tray 5 is moved to the stand-by position A2, the tray driving pin 28*c* is moved toward the recording/reproducing section B1 side, and engaged with the guide groove 5*f* of the tray 5. In contrast, after the tray 5 has been moved to the stand-by position A2, the tray driving pin 28*c* is allowed to retreat toward the recording/reproducing section B1 side so as to prevent the guide groove 5*f* of the tray 5 from being engaged with the tray driving pin 28*c*. Thus, the length of the device-depth direction X can be shortened by a length corresponding the retreat length of the tray driving pin 28*c* so that it becomes possible to achieve a small-size device. In contrast, in the case of a structure in which the tray driving pin 28 is not allowed to retreat, the tray 5 needs to be further moved toward the stand-by section B2 side in the device-depth direction X so as to release the engagement between the guide groove 5*f* of the tray 5 and the tray driving pin 28*c*, thereby failing to achieve a small-size device.

In the present embodiment, the first and second traverse gears 11 and 12, the feeding rack 13, the loading gear 14A, the relay gear 14B, the play pinion 18, the traverse slide plate 20, the sub-slide plate 26, the load plate 27 and the load lever 28 are allowed to form a first tray driving unit that can move the tray 5 reciprocatingly between the stand-by position A2 and the recording/reproducing position A1.

Referring to FIGS. 5 and 6, the following description will discuss respective components disposed in the stand-by section B2 and the respective operations thereof.

As shown in FIG. 5, in the stand-by section B2, a second motor 31, which generates a driving force used for raising/lowering the elevation base 19 in the device-thickness direction Z and for transporting the tray 5 between the stand-by position A2 and the exchange position A3, is attached to the device main body 2.

Figure 18B:
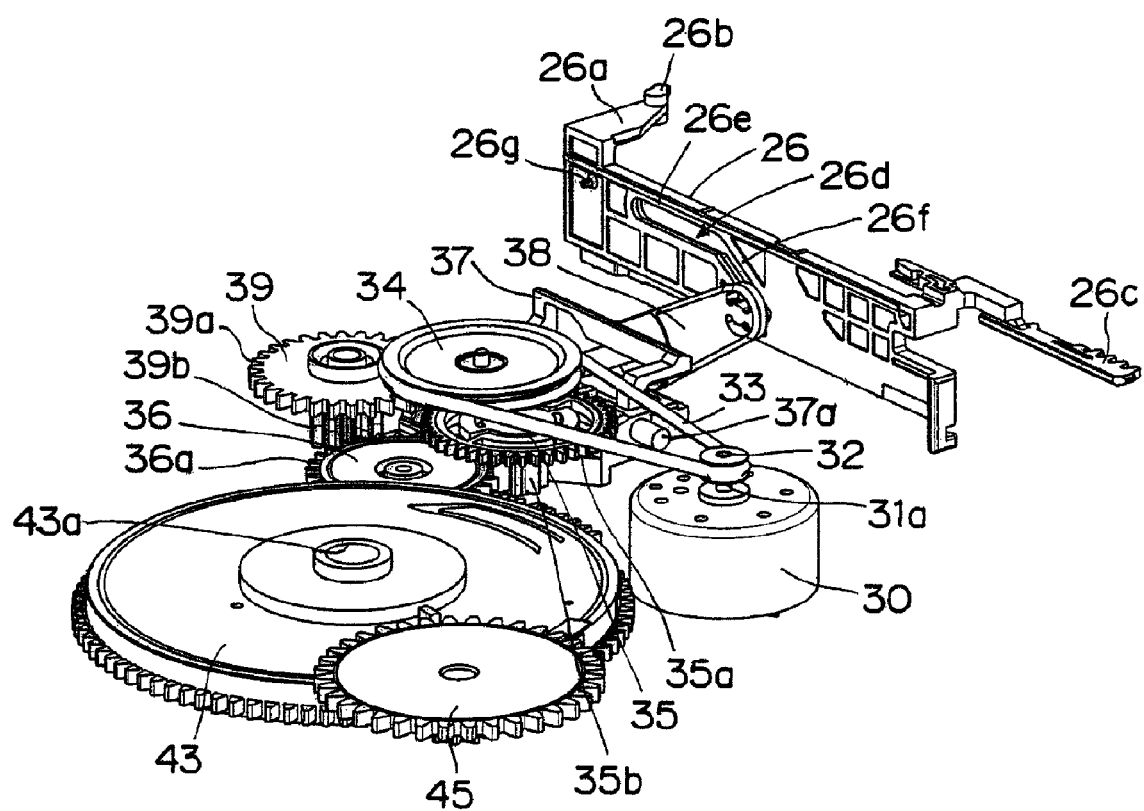
FIG. 18B is a perspective view that shows the state in which the switching gear to which a driving force from the second motor is transmitted is meshed with the cam gear, when viewed in a different angle from FIG. 18A.

As shown in FIGS. 18A and 18B, a motor pulley 32 is attached to a driving shaft 31*a* of the second motor 31. A pulley gear 34 is disposed at a position slightly apart from the motor pulley 32, and a belt 33 having a ring shape is passed over the two members so as to transmit the driving force of the second motor 31 to the pulley gear 34. An input gear 35*a* of the relay gear 35 is meshed with an output gear (not shown) of the pulley gear 34. An input gear 36*a* of the switching gear 36 is meshed with an output gear 35*b* of the relay gear 35.

Figure 19:
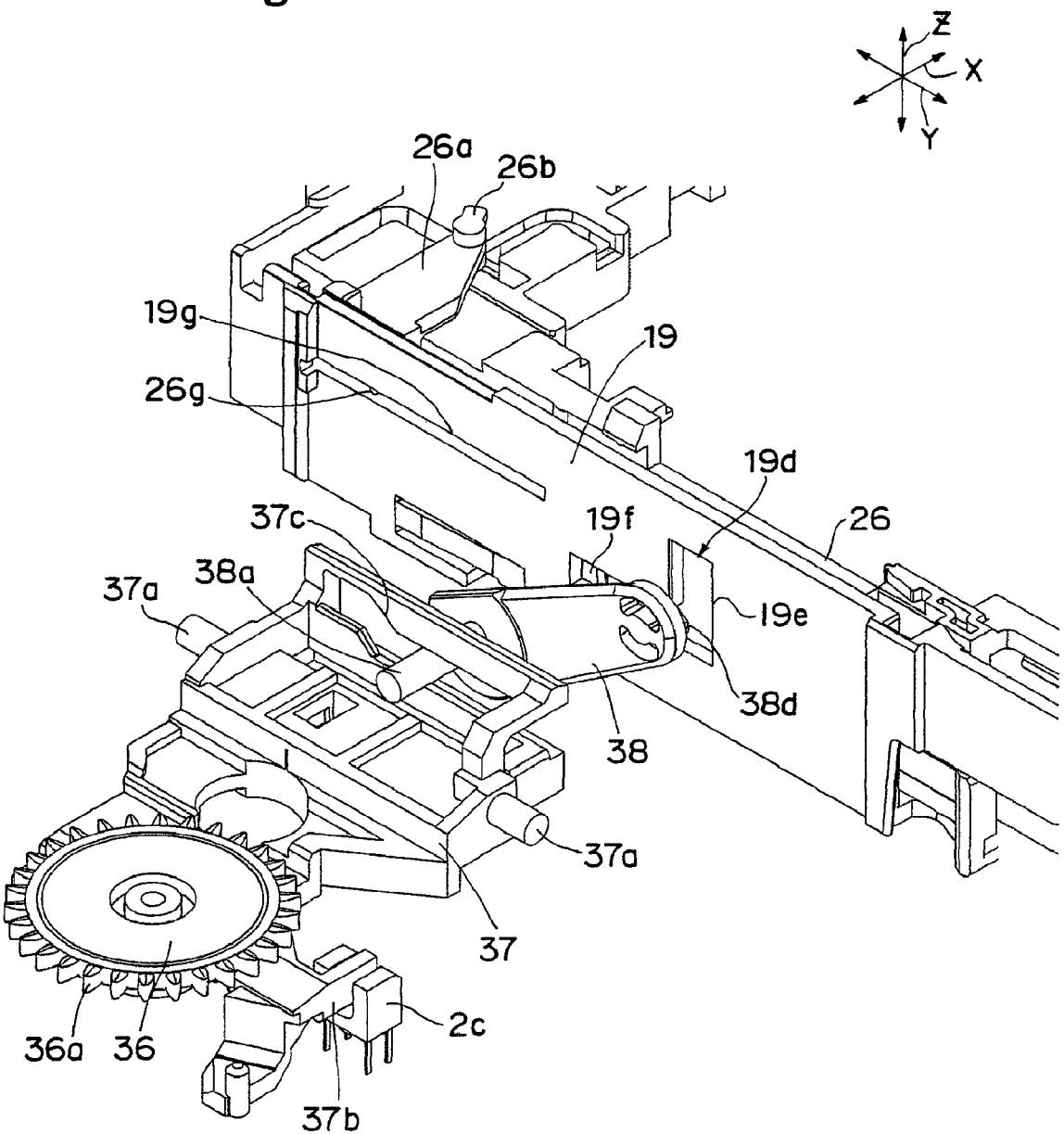
FIG. 19 is a perspective view that shows a state in which the switching gear is lowered.

As shown in FIG. 19, the switching gear 36 is attached to one end of the switching lever 37 that is one example of a power transmitting unit. Two bosses 37*a*, 37*a* that protrude in mutually departing directions are formed on the other end of the switching lever 37. By allowing two holding portions 2*a*, 2*a* formed on the device main body 2 to hold the two bosses 37*a*, 37*a* so as to pivot thereon, the switching lever 37 is designed so as to pivot centered on a straight line connecting the two bosses 37*a*, 37*a* serving as a shaft. By allowing the switching lever 37 to pivot, the switching gear 36 can be raised and lowered. That is, when the switching lever 37 pivots downward, the switching gear 36 is placed at each of positions indicated by FIGS. 18A, 18B and 19, and when the switching lever 37 pivots upward, the switching gear 36 is placed at each of positions indicated by FIGS. 20A, 20B and 21.

Moreover, as shown in FIG. 19, a protruding claw 37*b* is attached to one end portion of the switching lever 37. The protruding claw 37*b* is designed so that, when the switching lever 37 is located on the lower side, the protruding claw 37*b* shields a sensor 2*c* on a substrate 2*b* attached to the device main body 2. Here, when the switching lever 37 pivots upward, the protruding claw 37*b* is separated from the sensor 2*c*, as shown FIG. 21. By detecting whether or not the protruding claw 37*b* is shielding the sensor 2*c*, it is possible to find which side the switching lever 37 is located on, the upper side or the lower side.

Moreover, as shown in FIG. 19, a cam groove 37*c* having one tilt step portion is formed on the other end portion of the switching lever 37. An engaging pin 38*a* formed on a switching arm 38 is engaged with the cam groove 37*c* so as to slide therein. Engaging pin 38*a* is formed so as to protrude from one end of an elongated plate-shaped main body portion of the switching arm 38. Furthermore, a protruding pin 38*b* that protrudes in a direction opposite to that of the engaging pin 38*a* is formed on the other end of the main body portion of the switching arm 38. The protruding pin 38*b* is allowed to penetrate a cam groove 19*d* having an L-letter shape, formed on the side face of the elevation base 19 on the stand-by section B2 side, as shown in FIG. 19, and is engaged with a cam groove 26*d* having a virtually L-letter shape, formed on the sub-slide plate 26, as shown in FIGS. 18A and 18B. The cam groove 19*d* of the elevation base 19 is provided with a thickness-direction linear portion 19*e* that is in parallel with the device-thickness direction Z and a width-direction linear portion 19*e* that is in parallel with the device-width direction Y. The cam groove 26*d* of the sub-slide plate 26 is provided with a linear portion 26*e* that is in parallel with the device-width direction Y and a tilt portion 26*f* that tilts downward toward the rack 26*c* side.

Moreover, the sub-slide plate 26 is provided with a protruding pin 26*g* so that, as shown in FIG. 19, this protruding pin 26*g* is engaged with a guide groove 19*g* formed on the side face of the elevation base 19 so as to slide therein. Thus, the sub-slide plate 26 is guided so as to move in parallel with the device-width direction Y. Here, in FIG. 18A, FIG. 18B, FIG. 20A and FIG. 20B, the elevation base 19 is omitted from the drawings.

The switching arm 38, which is engaged with the cam groove 19*d* of the elevation base 19 and the cam groove 26*d* of the sub-slide plate 26, as described above, is allowed to move as indicated by FIGS. 22A to 22G. Referring to FIGS. 22A to 22G, the following description will discuss operations of the switching arm 38. Here, for convenience of description, supposing that the cam groove 37*c* of the switching lever 37 has a linear form, the description is given.

Figure 22A:
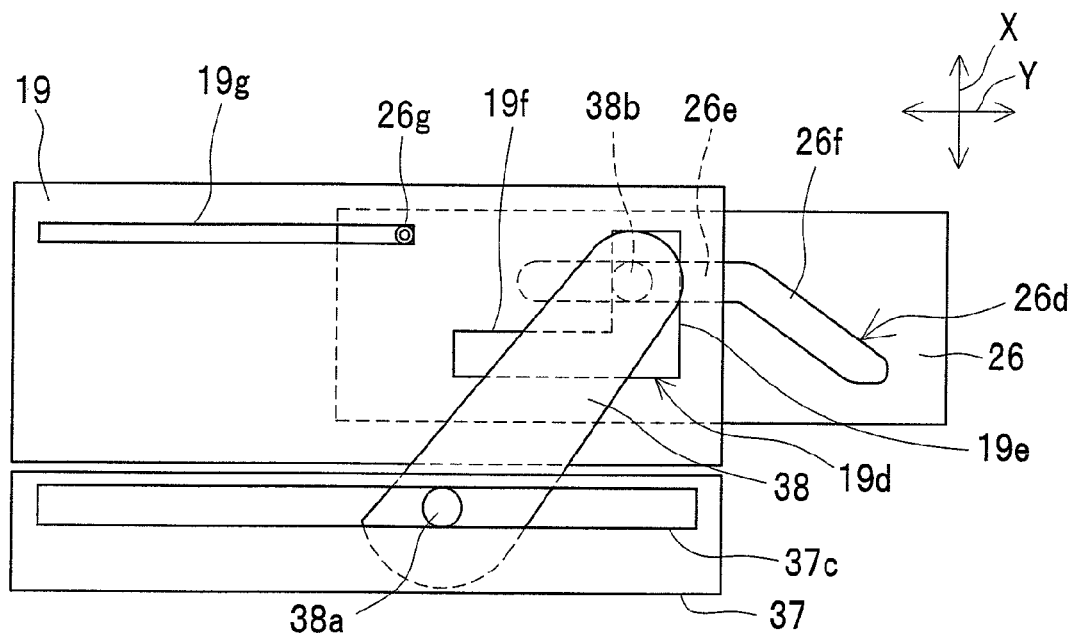
FIG. 22A is a side view that schematically shows a state of a switching arm in which a sub-slide plate is located most closely to a play pinion in the disc changer device in accordance with the embodiment of the present invention.
Figure 22B:
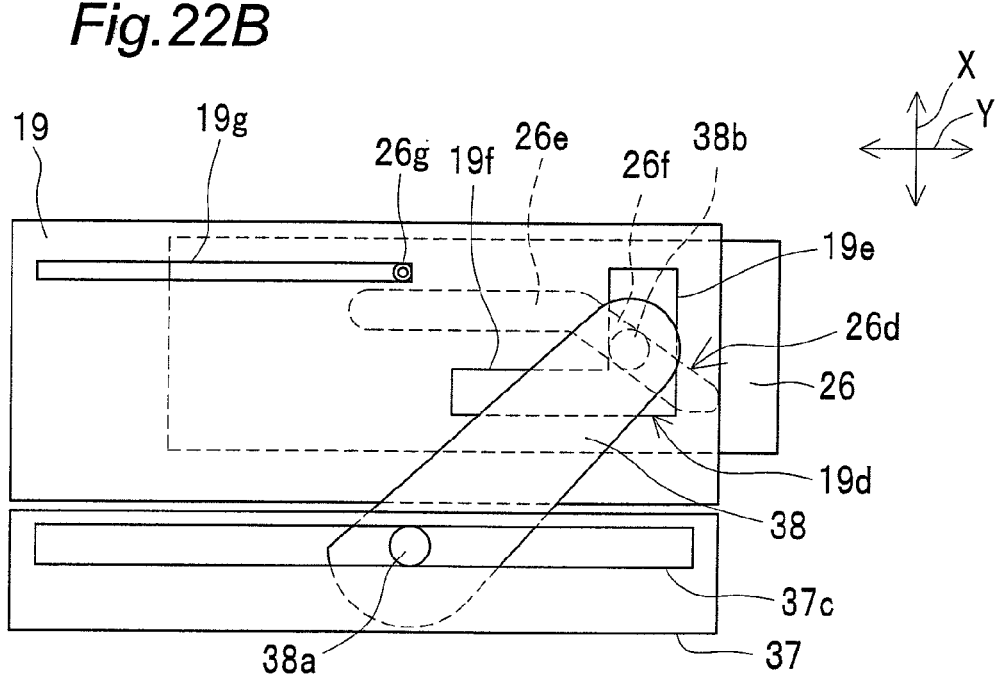
FIG. 22B is a side view that schematically shows a state of the switching arm in which the sub-slide plate is moved in a departing direction from the play pinion from the state shown in FIG. 22A.
Figure 22C:
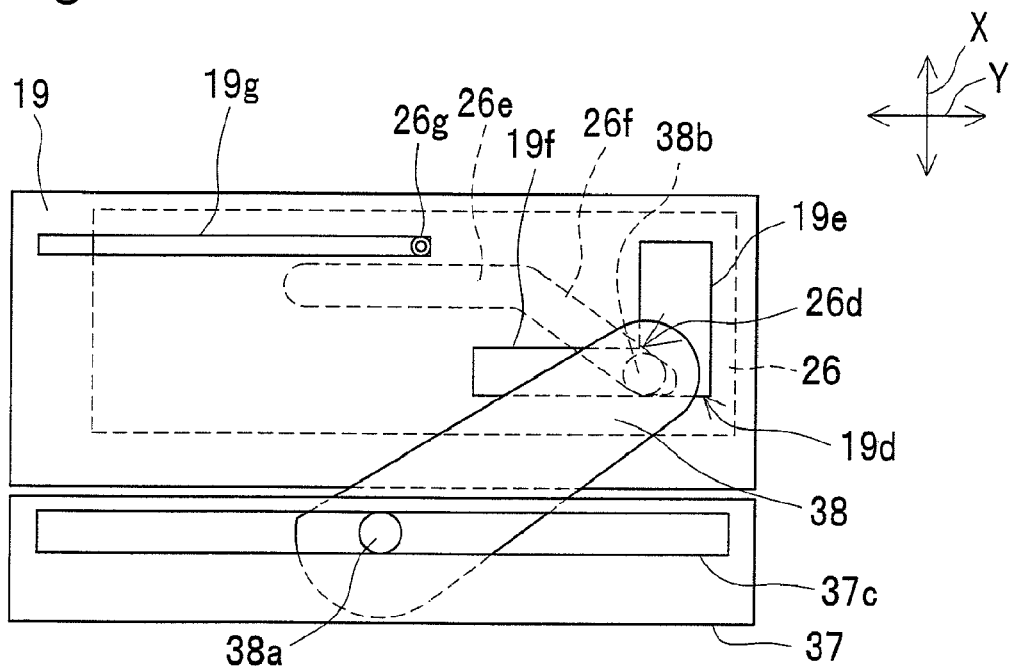
FIG. 22C is a side view that schematically shows a state of the switching arm in which the sub-slide plate is further moved in the departing direction from the play pinion from the state shown in FIG. 22B.
Figure 22D:
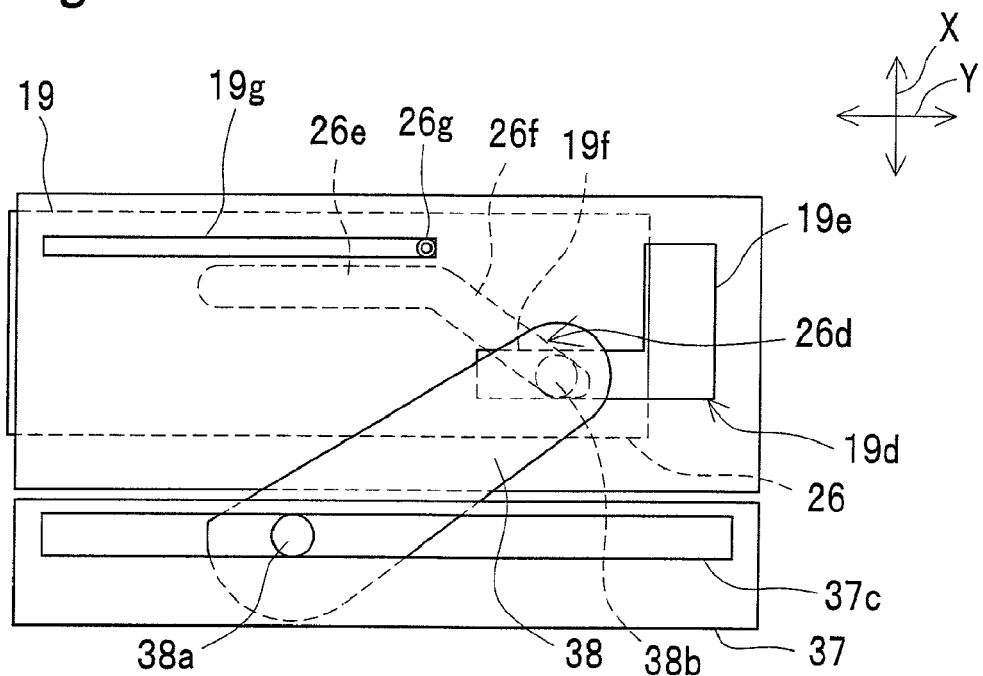
FIG. 22D is a side view that schematically shows a state of the switching arm in which the sub-slide plate is further moved in the departing direction from the play pinion from the state shown in FIG. 22C.
Figure 22E:
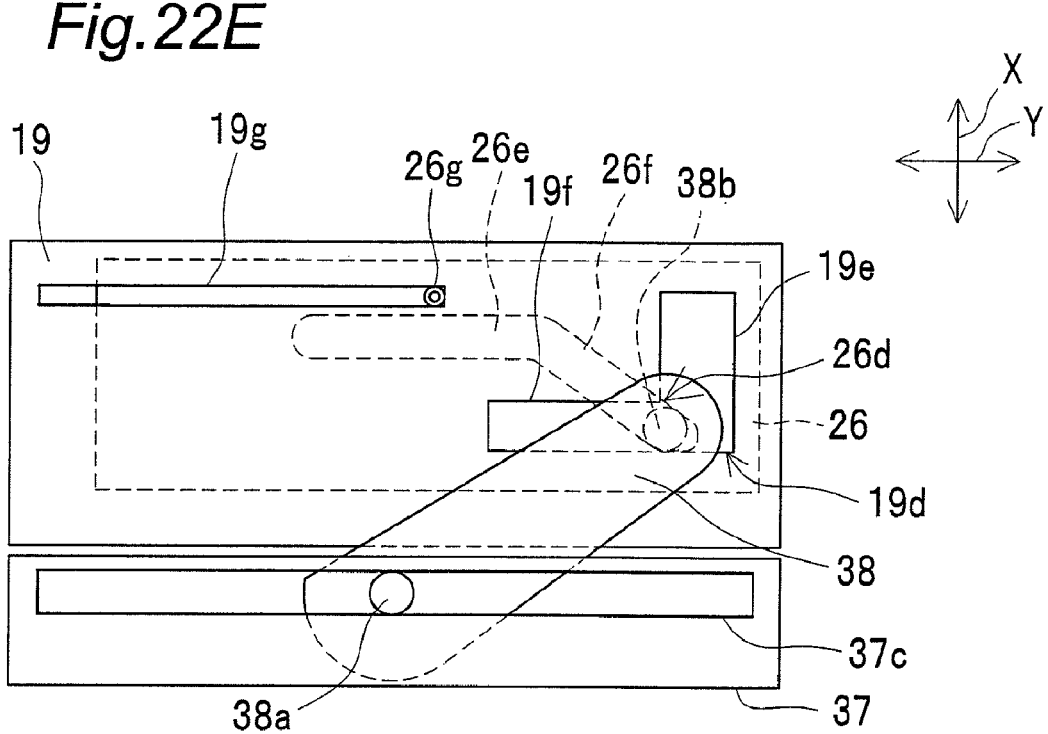
FIG. 22E is a side view that schematically shows a state of the switching arm in which the sub-slide plate is moved in an approaching direction to the play pinion from the state shown in FIG. 22D.
Figure 22F:
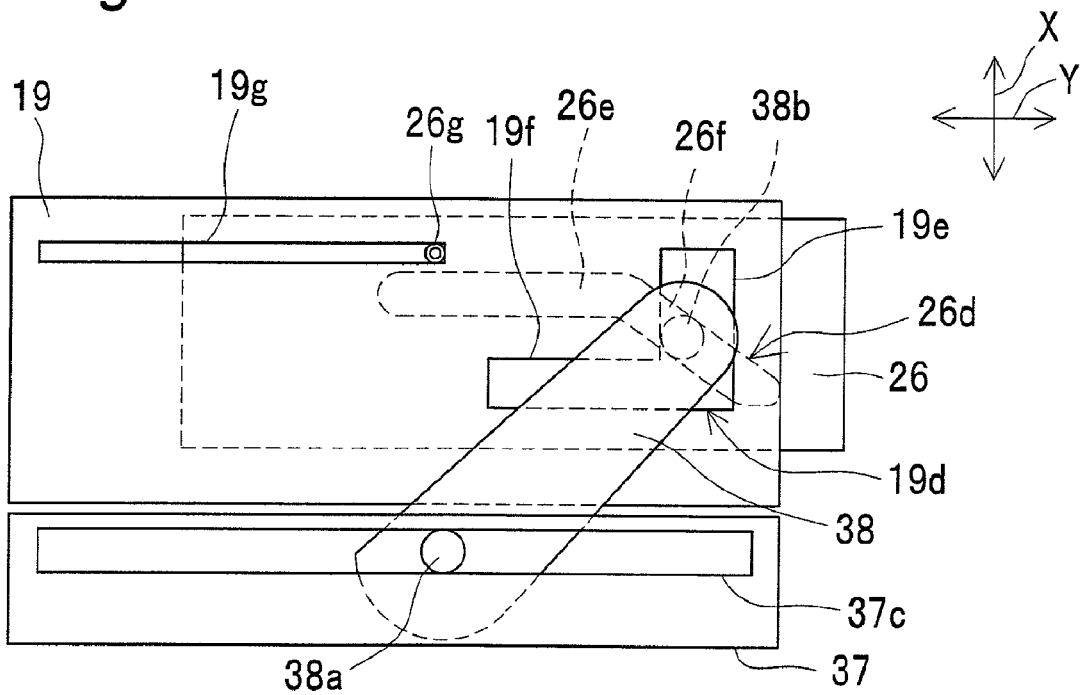
FIG. 22F is a side view that schematically shows a state of the switching arm in which the sub-slide plate is further moved in the approaching direction to the play pinion from the state shown in FIG. 22E.
Figure 22G:
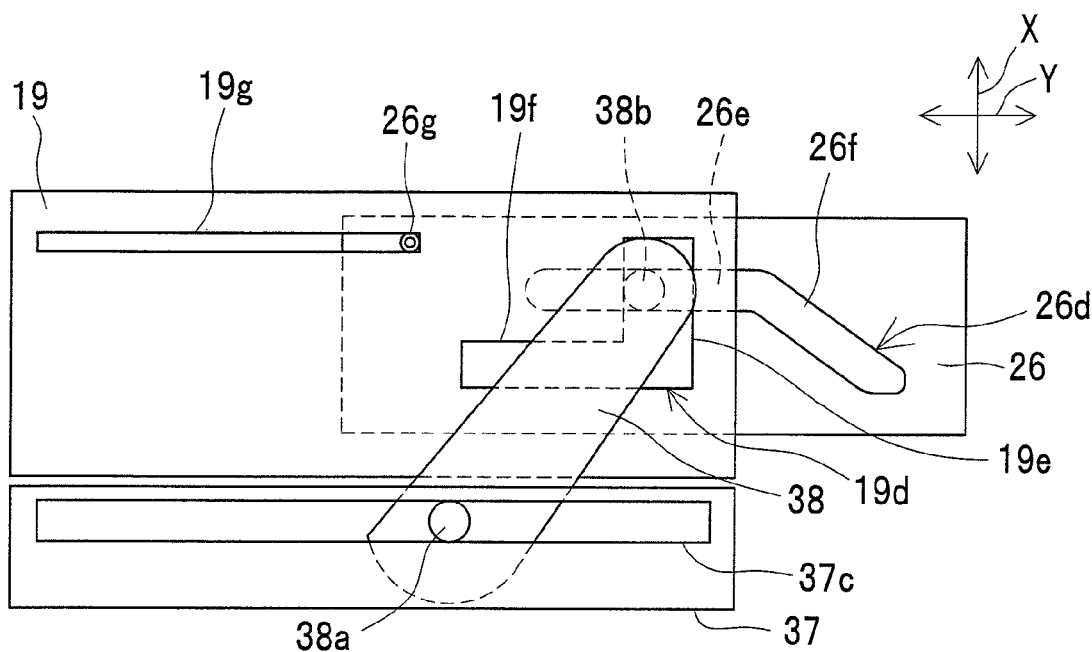
FIG. 22G is a side view that schematically shows a state of the switching arm in which the sub-slide plate is further moved in the approaching direction to the play pinion from the state shown in FIG. 22F.
Figure 23A:
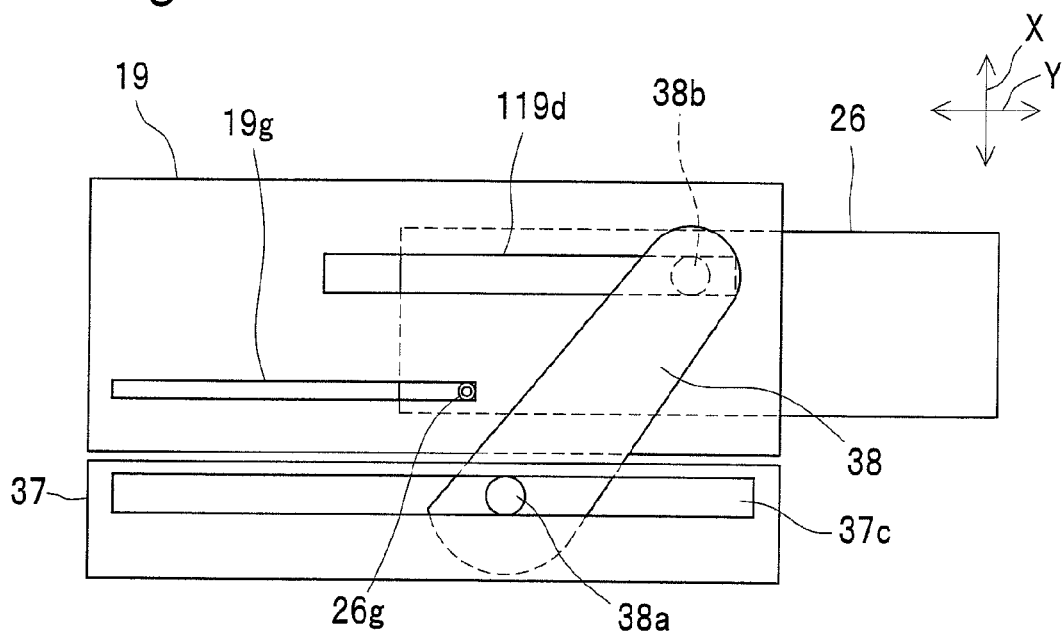
FIG. 23A is a side view that schematically shows a state of a switching arm in which a sub-slide plate is located at the closest position to a play pinion in a disc changer device as a comparative example.
Figure 23B:
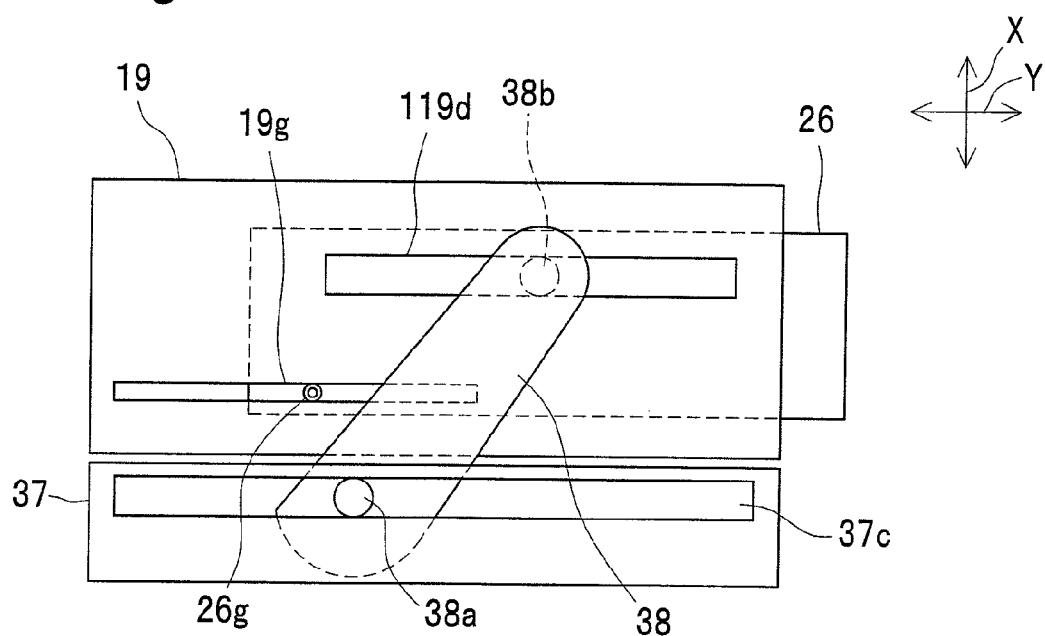
FIG. 23B is a side view that schematically shows a state of the switching arm in which the sub-slide plate is moved in a departing direction from the play pinion from the state shown in FIG. 23A.
Figure 23C:
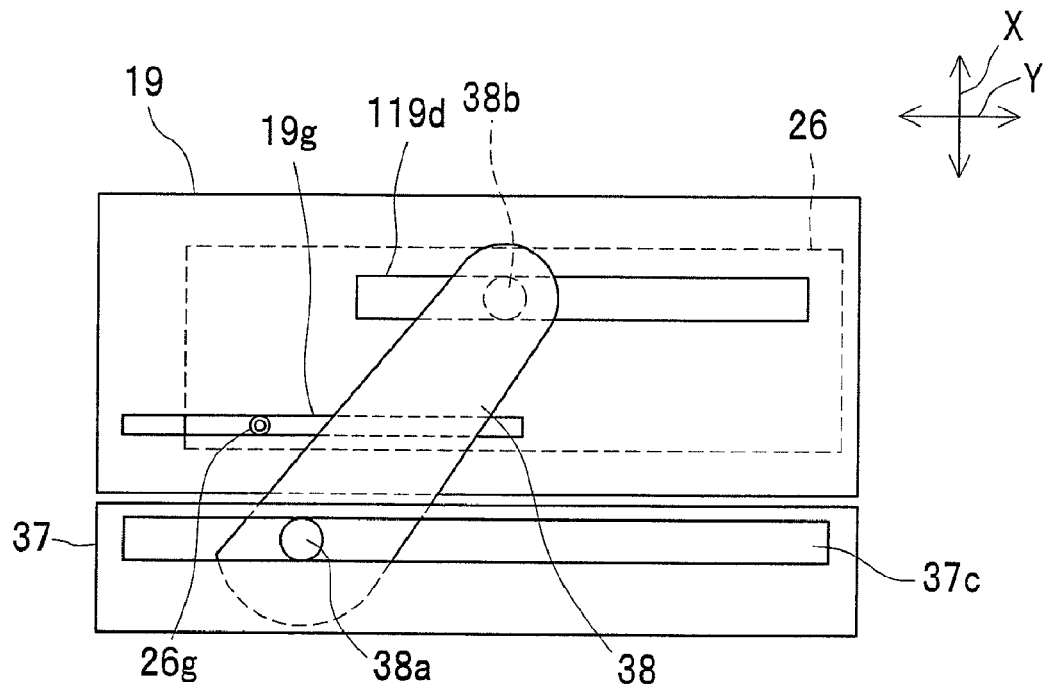
FIG. 23C is a side view that schematically shows a state of the switching arm in which the sub-slide plate is further moved in the departing direction from the play pinion from the state shown in FIG. 23B.
Figure 23D:
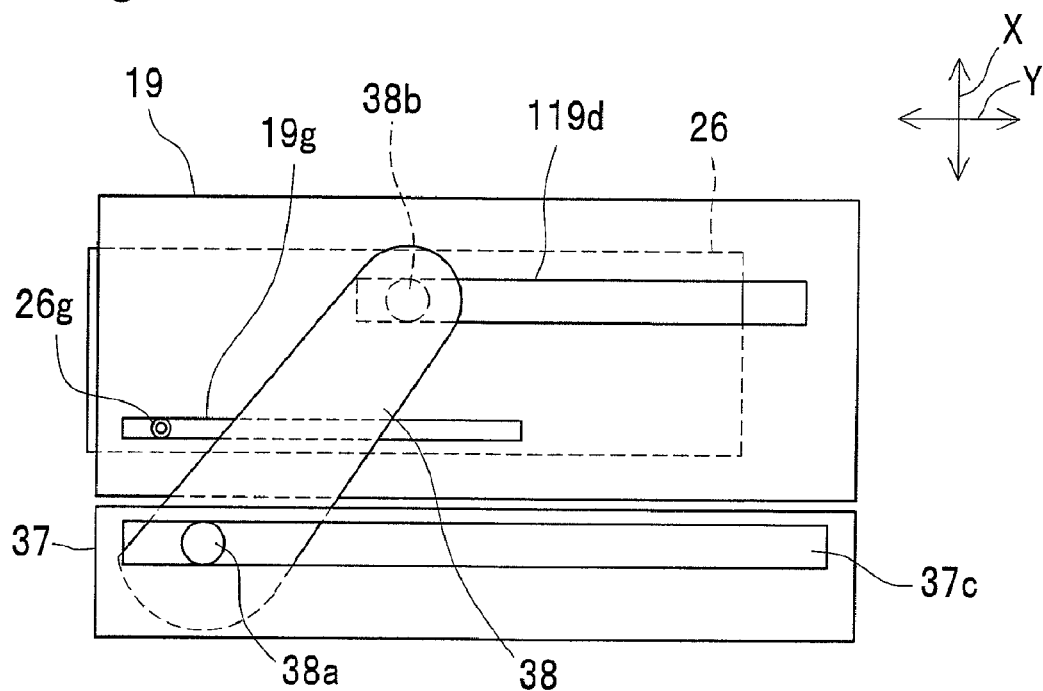
FIG. 23D is a side view that schematically shows a state of the switching arm in which the sub-slide plate is further moved in the departing direction from the play pinion from the state shown in FIG. 23C.
Figure 23E:
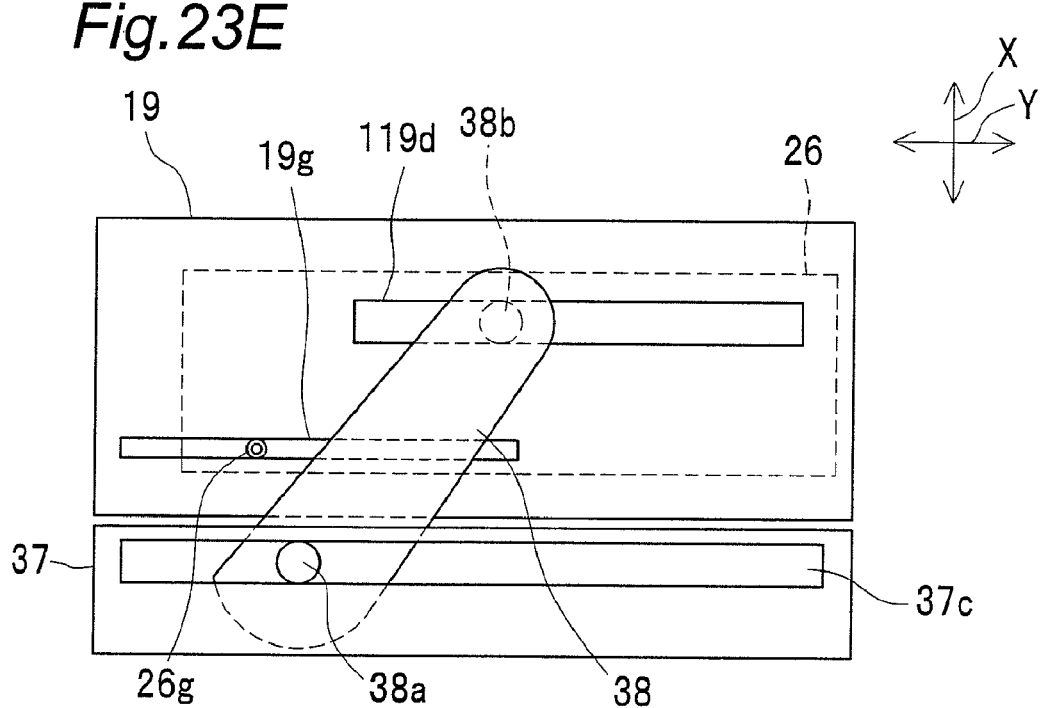
FIG. 23E is a side view that schematically shows a state of the switching arm in which the sub-slide plate is moved in an approaching direction to the play pinion from the state shown in FIG. 23D.
Figure 23F:
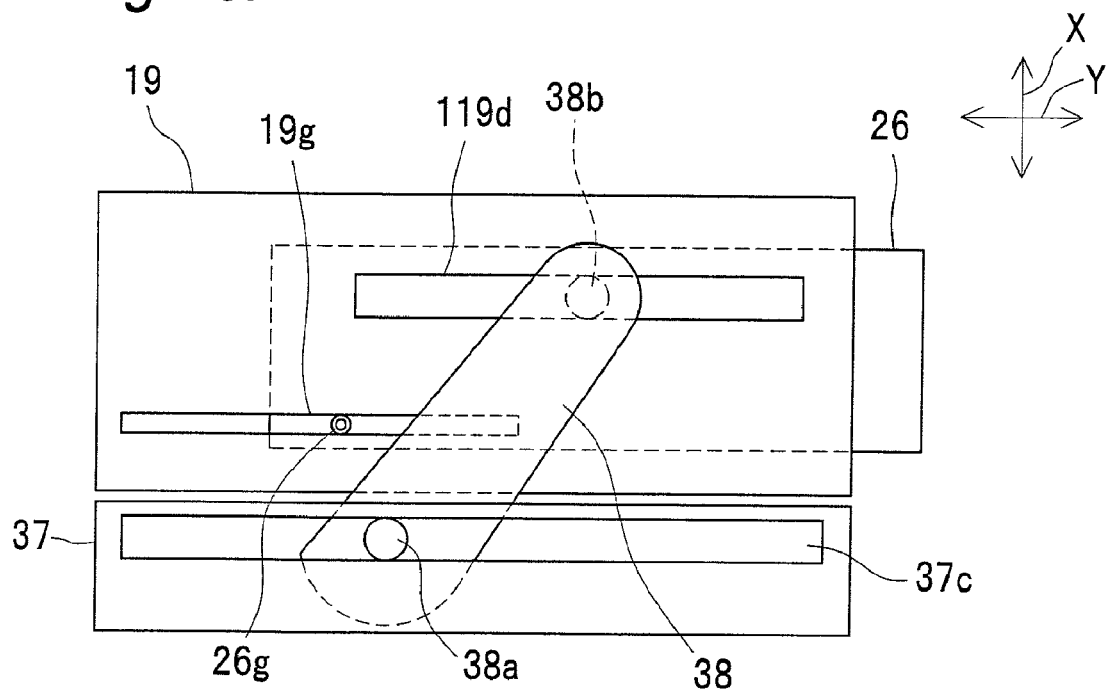
FIG. 23F is a side view that schematically shows a state of the switching arm in which the sub-slide plate is further moved in the approaching direction to the play pinion from the state shown in FIG. 23E.
Figure 23G:
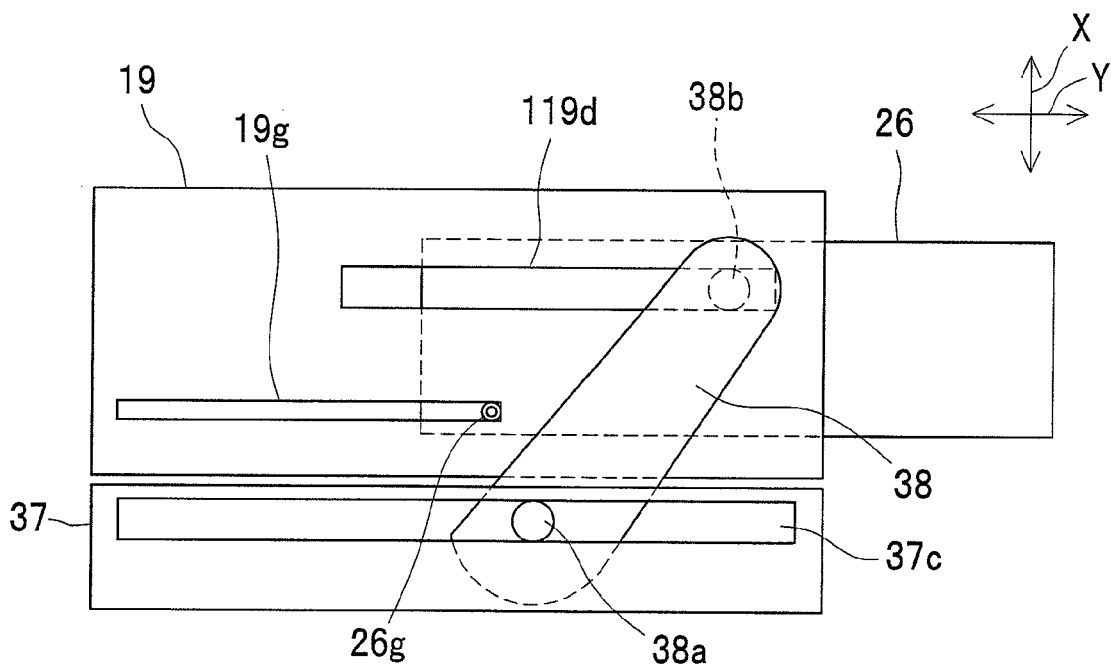
FIG. 23G is a side view that schematically shows a state of the switching arm in which the sub-slide plate is further moved in the approaching direction to the play pinion from the state shown in FIG. 23F.

FIG. 22A shows a state of the switching arm 38 when it is located at the furthest rightward position (play pinion 18 side) of the sub-slide plate 26 (that is, the state of the switching arm 38 when the tray 5 is located at the recording/reproducing position A1). FIGS. 22B to 22D show states of the switching arm 38 when the sub-slide plate 26 is gradually moved leftward (to the load plate 27 side) from the state of FIG. 22A (that is, states of the switching arm 38, when a selected tray located at the recording/reproducing position A1 is transported to the stand-by position A2). Moreover, FIGS. 22E to 22G show states of the switching arm 38 when the sub-slide plate 26 is gradually moved rightward (to the play pinion 18 side) from the state of FIG. 22D (that is, states of the switching arm 38, when a tray, selected from a plurality of trays 5 located at the stand-by position A2, is transported to the recording/reproducing position A1).

First, as shown in FIG. 22A, when the sub-slide plate 26 is located at the furthest rightward position, the protruding pin 38*b* of the switching arm 38 is positioned on the linear portion 26*e* of the sub-slide plate 26, and is also positioned on the thickness-direction liner portion 19*e* of the elevation base 19.

Next, when the sub-slide plate 26 is further moved leftward from the state of FIG. 22A, as shown in FIG. 22B, the protruding pin 38*b* is not moved leftward in the drawing because it is made in contact with the side wall of the thickness-direction linear portion 19*e*, but pressed downward by the tilt portion 26*f*. At this time, the engaging pin 38*a* of the switching lever 38 is allowed to slightly move leftward along the cam groove 37*c* of the switching lever 37.

Next, when the sub-slide plate 26 is further moved leftward from the state of FIG. 22B, the protruding pin 38*b* is further moved downward from the tilt portion 26*f*, as shown in FIG. 22C, so that it is released from the contact to the thickness-direction linear portion 19*e*, and moved onto the width-direction linear portion 19*f*.

Figure 21:
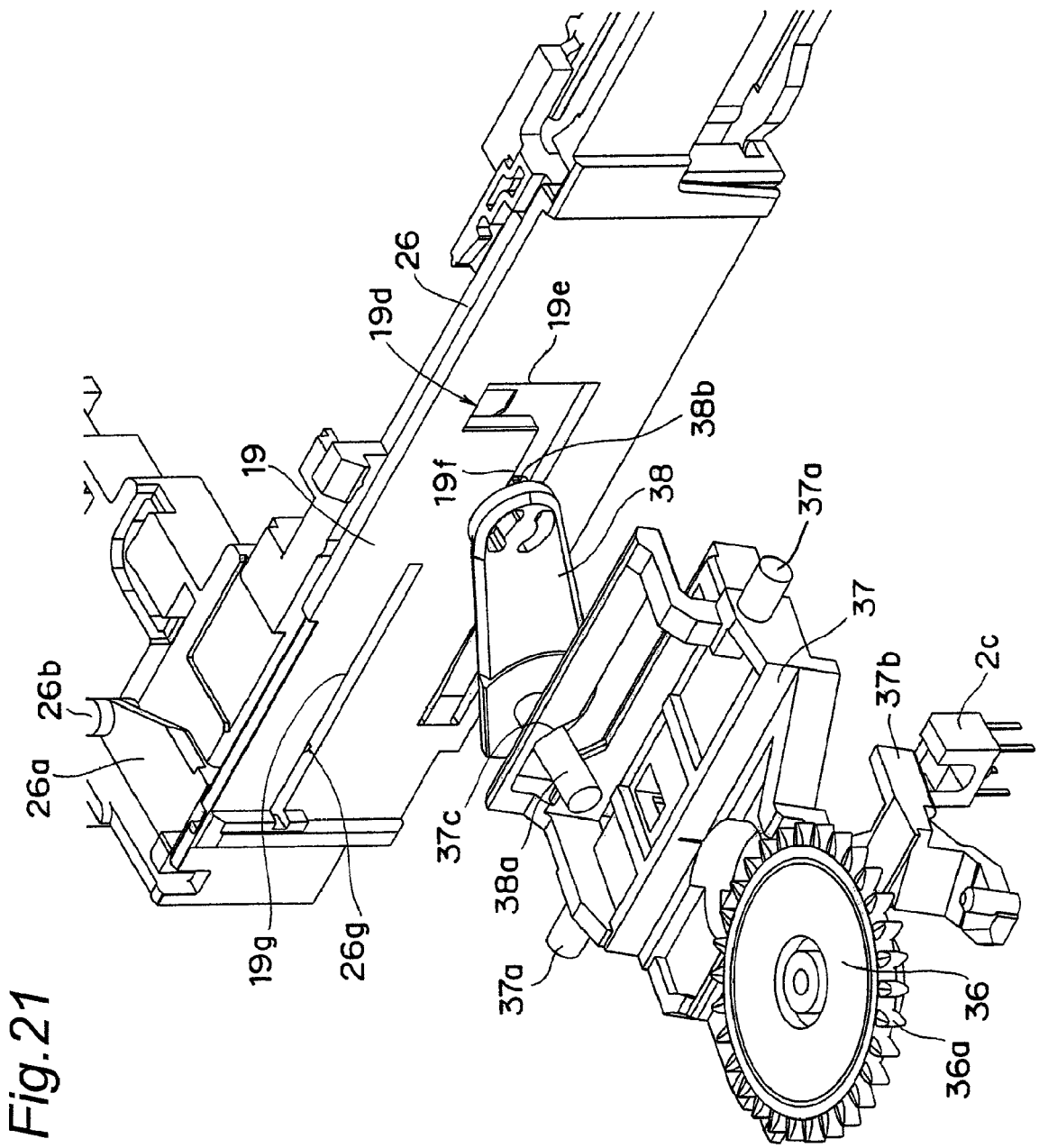
FIG. 21 is a perspective view that shows a state in which the switching gear has been raised.

Next, when the sub-slide plate 26 is further moved leftward from the state of FIG. 22C, the protruding pin 38*b* is moved along the width-direction linear portion 19*f*, as shown in FIG. 22D. At this time, since the protruding pin 38*b* is positioned on the lower end of the tilt portion 26*f*, it is moved leftward together with the sub-slide plate 26. In contrast, the engaging pin 38*a* of the switching lever 38 is moved leftward along the cam groove 37*c* of the switching lever 37. By this movement, the engaging pin 38*a* is moved leftward, while pressing down the tilt portion of the cam groove 37*c* of switching lever 37, as shown in FIG. 21. With this arrangement, the switching lever 37 is allowed to pivot so that the switching gear 36 is raised.

In a manner reversed to that described above, when the first motor 10 is reversely driven so that the sub-slide plate 26 is moved rightward from the state of FIG. 22D, the protruding pin 38*b* is moved rightward together with the sub-slide plate 26 along the width-direction linear portion 19*f*, as shown in FIG. 22E. At this time, the engaging pin 38*a* is also moved rightward along the cam groove 37*c* of the switching lever 37 in the same manner as in the protruding pin 38*b*. By this movement, the engaging pin 38*a* is moved leftward, while pushing up the tilt portion of the cam groove 37*c* of the switching lever 37, as shown in FIG. 19. With this arrangement, the switching lever 37 is allowed to pivot so that the switching gear 36 is lowered.

Next, when the sub-slide plate 26 is further moved rightward from the state shown in FIG. 22E, the protruding pin 38*b* is raised upward by the tilt portion 26*f* as shown in FIG. 22F, and moved to the thickness-direction linear portion 19*e*. At this time, the engaging pin 38*a* is moved rightward slightly along the cam groove 37*c* of the switching lever 37. Thus, the position of the switching arm 38 is returned to the state shown in FIG. 22A.

In accordance with the embodiment of the present invention, since the cam groove 19*d* of the elevation base 19 and the cam groove 26*d* of the sub-slide plate 26 are designed as described above, the amount of shift of the switching arm 38 is made smaller relative to the amount of shift of the sub-slide plate 26 in the device width direction Y. Thus, the switching lever 37 and the like can be miniaturized so that the entire device can be miniaturized.

Here, FIGS. 23A to 23G show operations of a comparative example in which the sub-slide plate 26 is not provided with the cam groove 26*d*, with elevation base 19 being provided with a linear cam groove 119*d* in place of the cam groove 19*d*. In this case, as shown in FIGS. 23A to 23G, the switching arm 38 is moved in accordance with the amount of shift of the sub-slide plate 26 in the device-width direction Y. Therefore, the switching lever 37 and the like become bulky, thereby failing to miniaturize the entire device.

In the present embodiment, the sub-slide plate 26 and the switching arm 38 are allowed to form a switching unit that brings any one of the disc clamp unit, the second tray driving unit and the elevation unit into a state to which the driving force of the first or second motor 10, 31 can be transmitted.

Figure 20A:
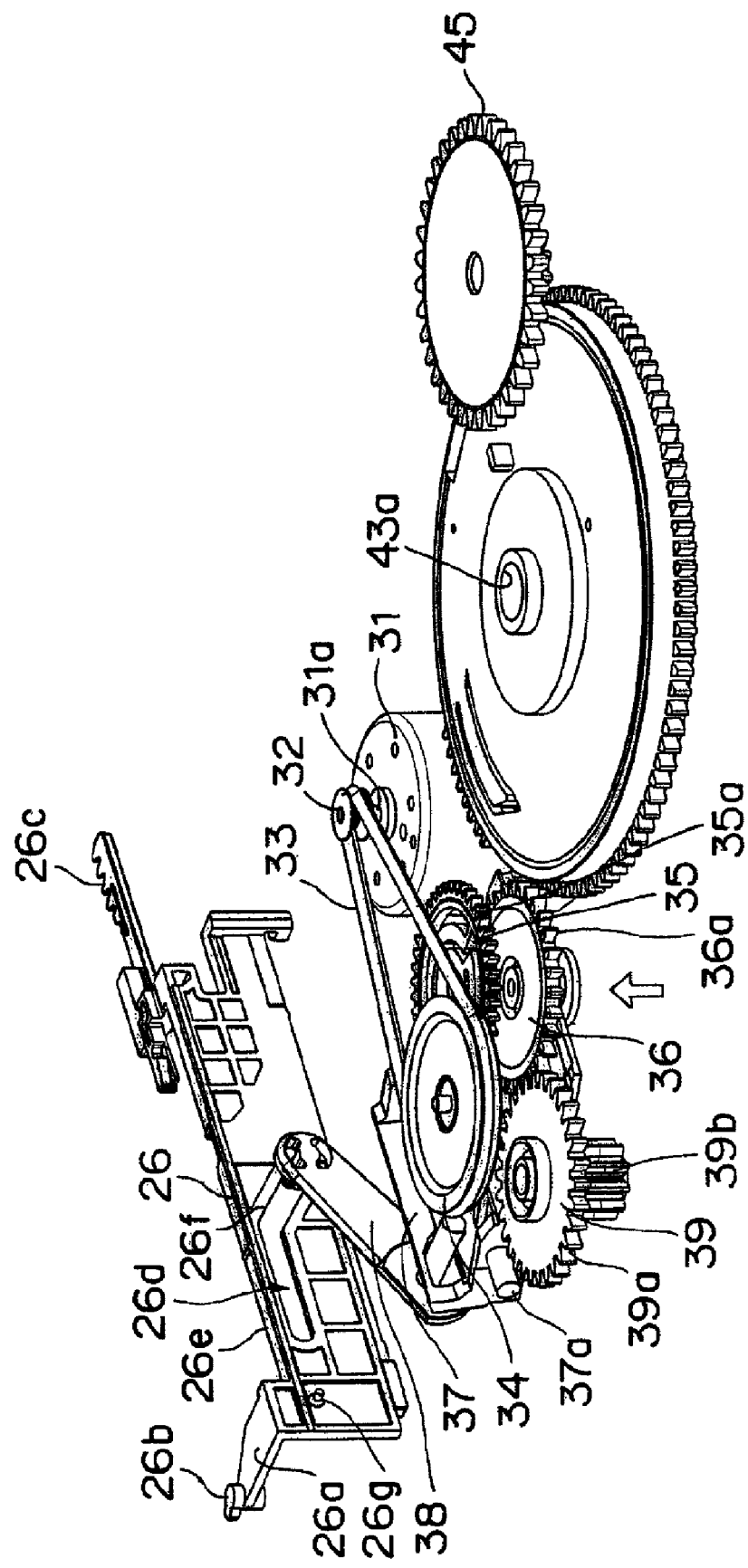
FIG. 20A is a perspective view that shows a state in which the switching gear to which a driving force from the second motor is transmitted is meshed with an elevation driving gear.
Figure 20B:
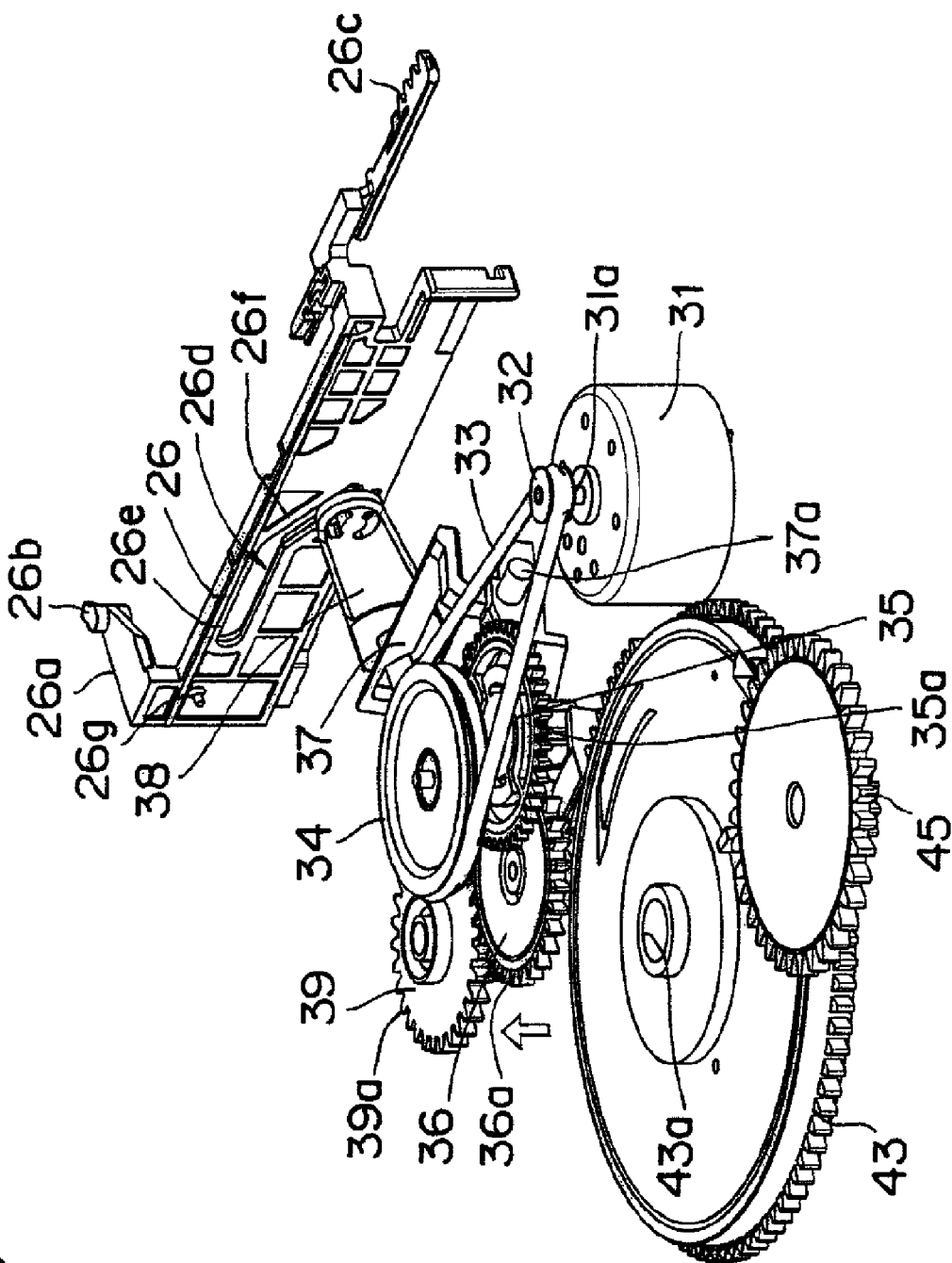
FIG. 20B is a perspective view that shows the state in which the switching gear to which a driving force from the second motor is transmitted is meshed with the elevation driving gear, when viewed in a different angle from FIG. 20A.
Figure 24:
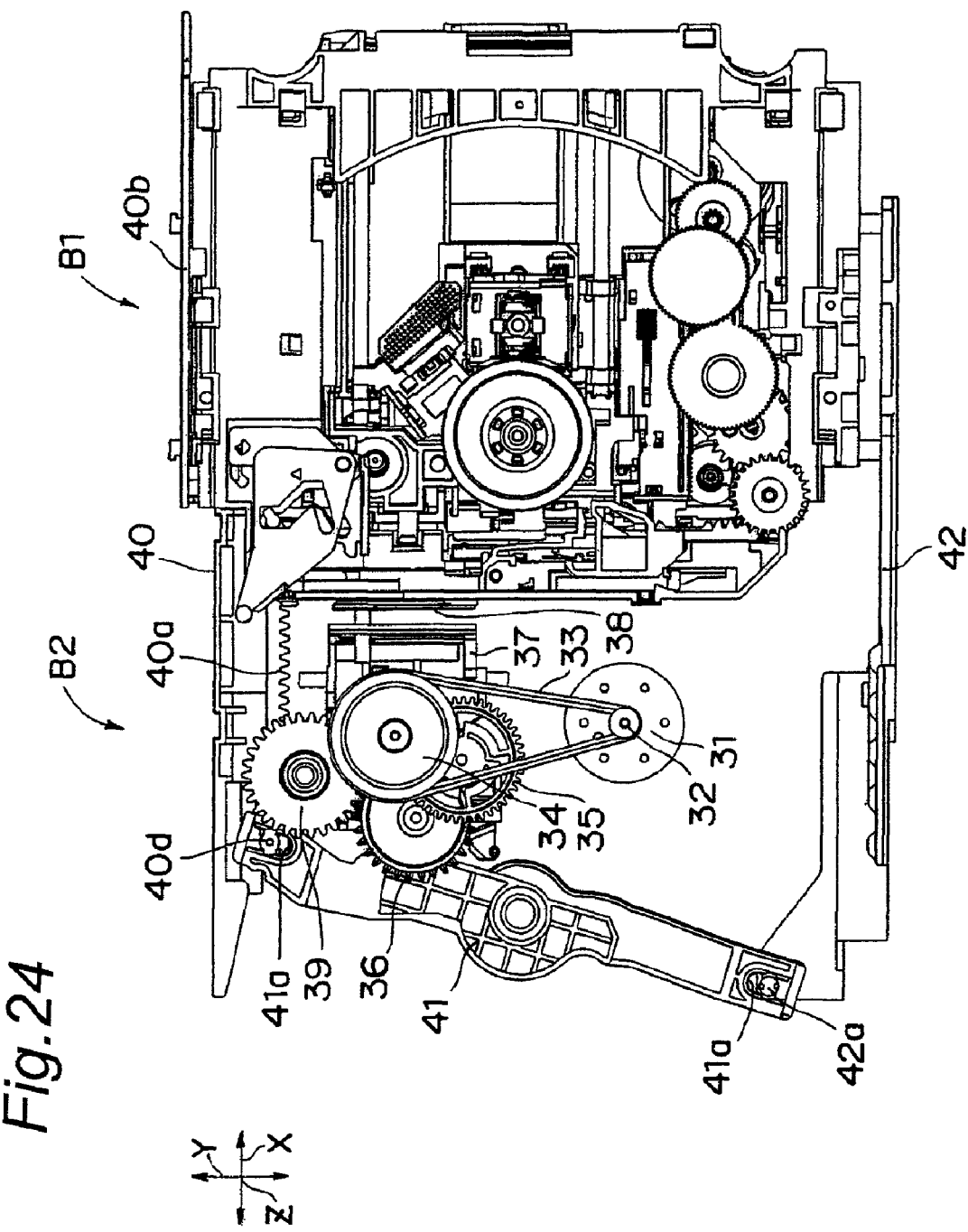
FIG. 24 is a plan view that shows a positional relationship between right-side and left-side slide elevation racks in the case where an elevation base is positioned at a height suitable for a tray on the first step.
Figure 25:
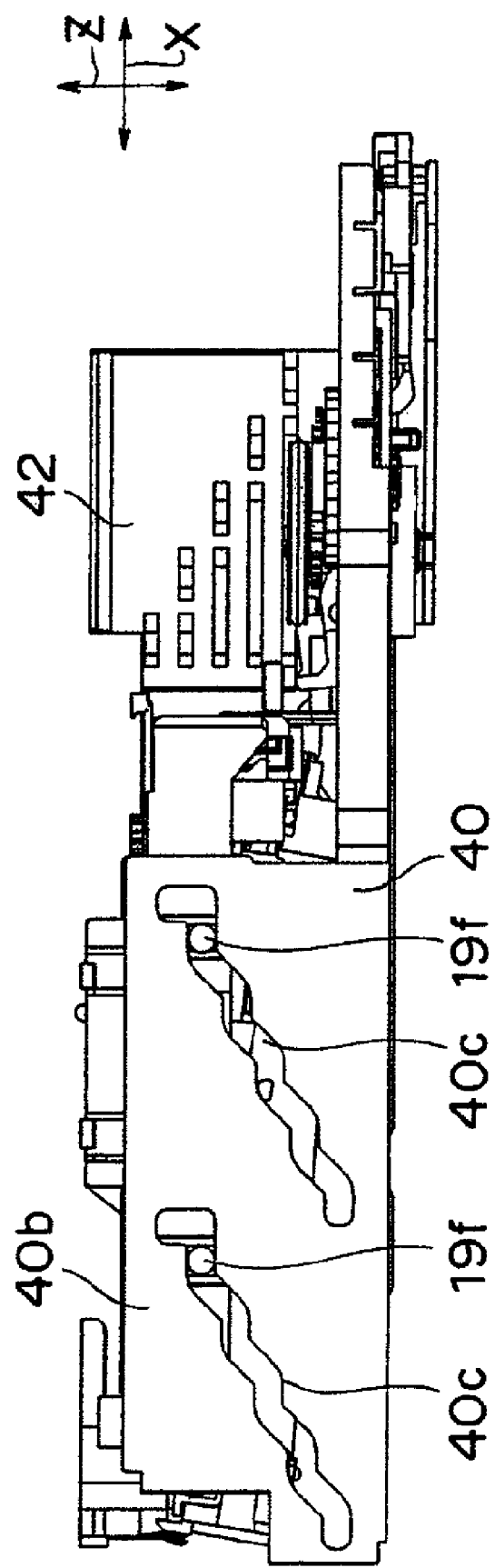
FIG. 25 is a side view that shows the structure of FIG. 24, viewed from the left-side slide elevation rack.
Figure 26:
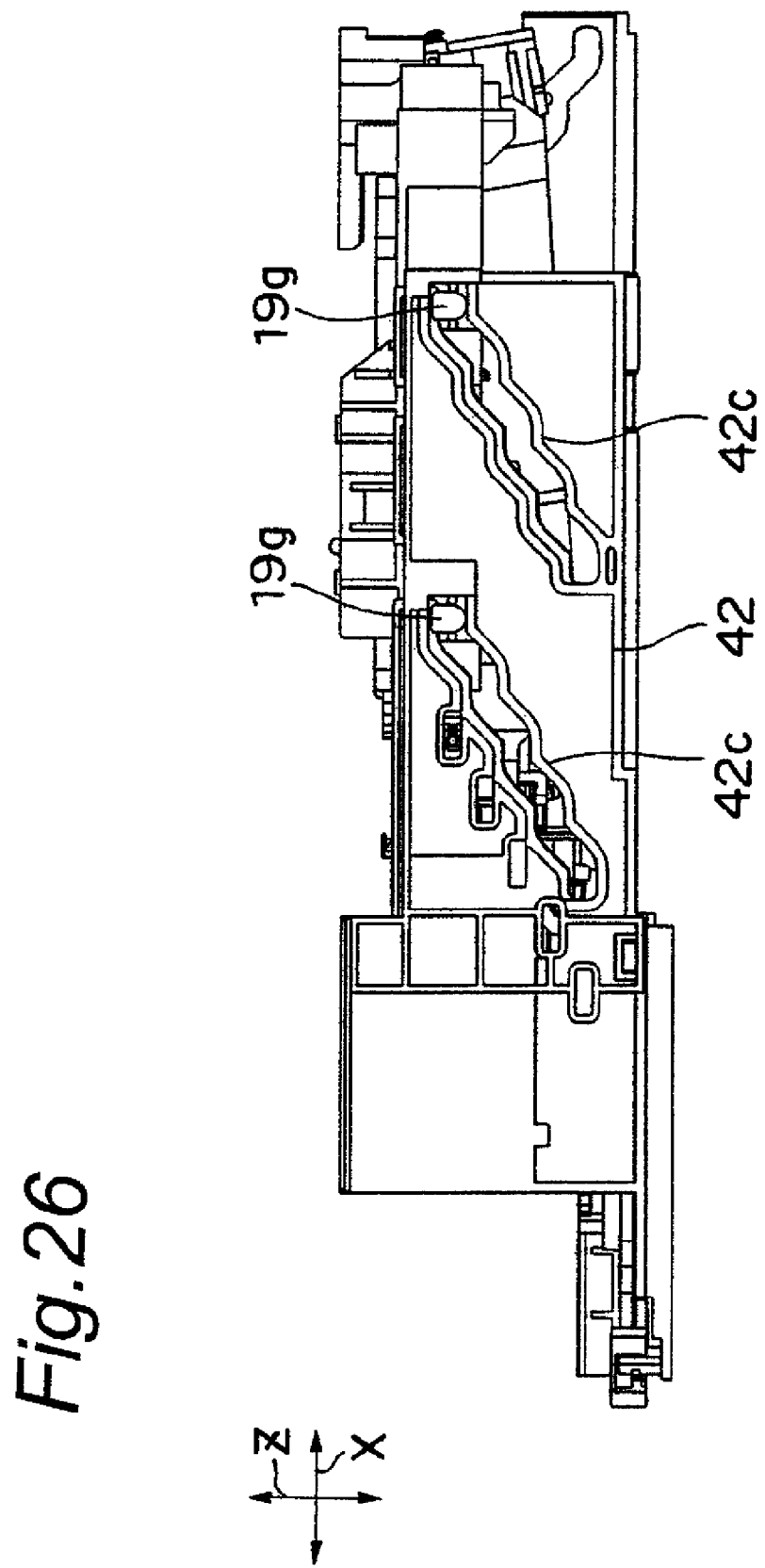
FIG. 26 is a side view that shows the structure of FIG. 24, viewed from the right-side slide elevation rack.

As described above, the switching gear 36, which is moved upward and downward by a pivotal movement of the switching lever 37, is designed so that, when raised as shown in FIGS. 20A, 20B and FIG. 21, it is meshed with an input gear 39*a* of an elevation driving gear 39. As shown in FIG. 24, an output gear 39*b* of the elevation driving gear 39 is meshed with a rack 40*a* formed on a left-side slide elevation rack 40. This rack 40*a* is installed in parallel with the device-depth direction X. Therefore, when a driving force of the second motor 31 is transmitted to the elevation driving gear 39, the entire left-side slide elevation rack 40 is slide-moved in the device-depth direction X, as shown in FIG. 25.

A portion 40*b* of the left-side slide elevation rack 40 on the recording/reproducing section B1 side (right side of FIG. 24) in the device-depth direction X is formed into a virtually plate shape in parallel with the device-thickness direction Z. This plate-shaped portion 40*b* is held by the device main body 2 so as to be moved to slide in the device-depth direction X along one of side faces of the device main body 2. Two cam grooves 40*c*, 40*c* are formed on the plate-shaped portion 40*b*. Each of the cam grooves 40*c*, 40*c* is formed so as to virtually tilt upward toward the stand-by section B1 side in the device-depth direction X. Moreover, each of the cam grooves 40*c*, 40*c* is provided with five step portions in accordance with the respective heights of five trays 5, which are placed so as to be offset in parallel with one another in the device-depth direction X. Two engaging pins 19*f*, 19*f*, formed on one of side faces of the elevation base 19, are respectively engaged with the cam grooves 40*c*, 40*c* so as to slide thereon. Here, FIG. 25 shows a state in which each of the engaging pins 19*f*, 19*f* is located on the uppermost step of each of the cam grooves 40*c*, 40*c*.

A cylinder-shaped engaging pin 40*d* sticking out upward in the device-thickness direction Z is formed on an end portion of the left-side slide elevation rack 40 on the stand-by section B2 side (left side of FIG. 24) in the device-depth direction X. The engaging pin 40*d* is engaged with one of through holes 41*a*, 41*a* formed on the two ends of a thin elongated plate-shaped coupling lever 41. A cylinder-shaped engaging pin 42*a*, formed on an end portion of the right-side slide elevation rack 42 on the stand-by section B2 side (left side of FIG. 24) in the device-depth direction X, is engaged with the other through hole 41*a* of coupling lever 41. Each of the through holes 41*a*, 41*a* of the coupling lever 41 is formed into a virtually elliptical shape, and the length of the minor diameter portion is made virtually equal to the diameter of each of the engaging pins 40*d* and 42*a*. The distance by which the respective through holes 41*a*, 41*a* are made apart from each other is made equal to the shortest distance between the respective engaging pins 40*d* and 42*a*, or made shorter than the shortest distance. In contrast, the entire length of the coupling lever 41 is made longer than the shortest distance between the respective engaging pins 40*d* and 42*a*. For this reason, in the case where the left-side slide elevation rack 40 is slide-moved onto the stand-by section B2 side in the device-depth direction X by a driving force of the second motor 31, as shown in FIG. 27, the right-side slide elevation rack 42 is slide-moved toward the recording/reproducing section B1 side (right side of FIG. 27) in the device-depth direction X that is the reversed direction therefrom.

A portion 42*b* of the right-side slide elevation rack 42 on the recording/reproducing section B1 side (right side of FIG. 24) in the device-depth direction X is formed into a virtually plate shape in parallel with the device thickness direction Z. This plate-shaped portion 42*b* is held by the device main body 2 so as to be moved to slide in the device-depth direction X along one of side faces of the device main body 2. In the same manner as in the plate-shaped portion 40*b* of the left-side slide elevation rack 40, two cam grooves 42*c*, 42*c* are formed on the plate-shaped portion 42*b*. Each of the cam grooves 42*c*, 42*c* is formed so as to virtually tilt downward to the stand-by section B1 side in the device-depth direction X. Moreover, in the same manner as in the cam grooves 42*c*, 42*c* of the left-side slide elevation rack 42, each of the cam grooves 42*c*, 42*c* is provided with five step portions in accordance with the respective heights of the five trays 5, which are placed so as to be offset in parallel with one another in the device-depth direction X. Two engaging pins 19*g*, 19*g* formed on the side face opposite to the formation face of the engaging pins 19*f* of the elevation base 19, are respectively engaged with the cam grooves 42*c*, 42*c* so as to slide thereon. By allowing the two engaging pins 19*f*, 19*f* and two engaging pins 19*g*, 19*g* to be engaged with the cam grooves 40*c*, 40*c* and 42*c*, 42*c*, the elevation base 19 is held by the right-side and left-side slide elevation racks 40 and 42. Here, FIG. 25 shows a state in which each of the engaging pins 19*g*, 19*g* is located on the uppermost step of each of the cam grooves 40*c*, 40*c*.

Figure 27:
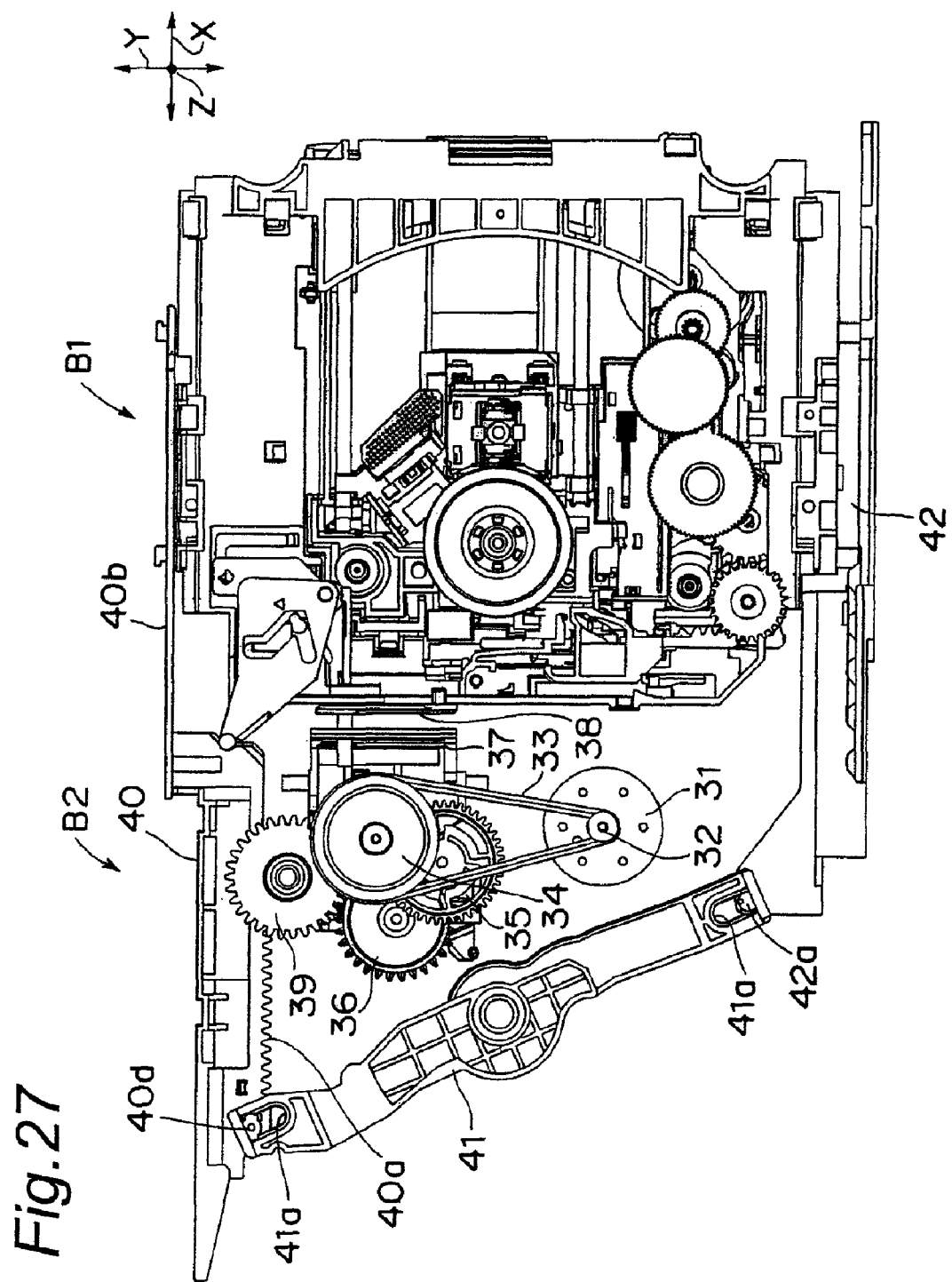
FIG. 27 is a plan view that shows a positional relationship between the right-side and left-side slide elevation racks in the case where the elevation base is positioned at a height suitable for a tray on the lowermost step.
Figure 28:
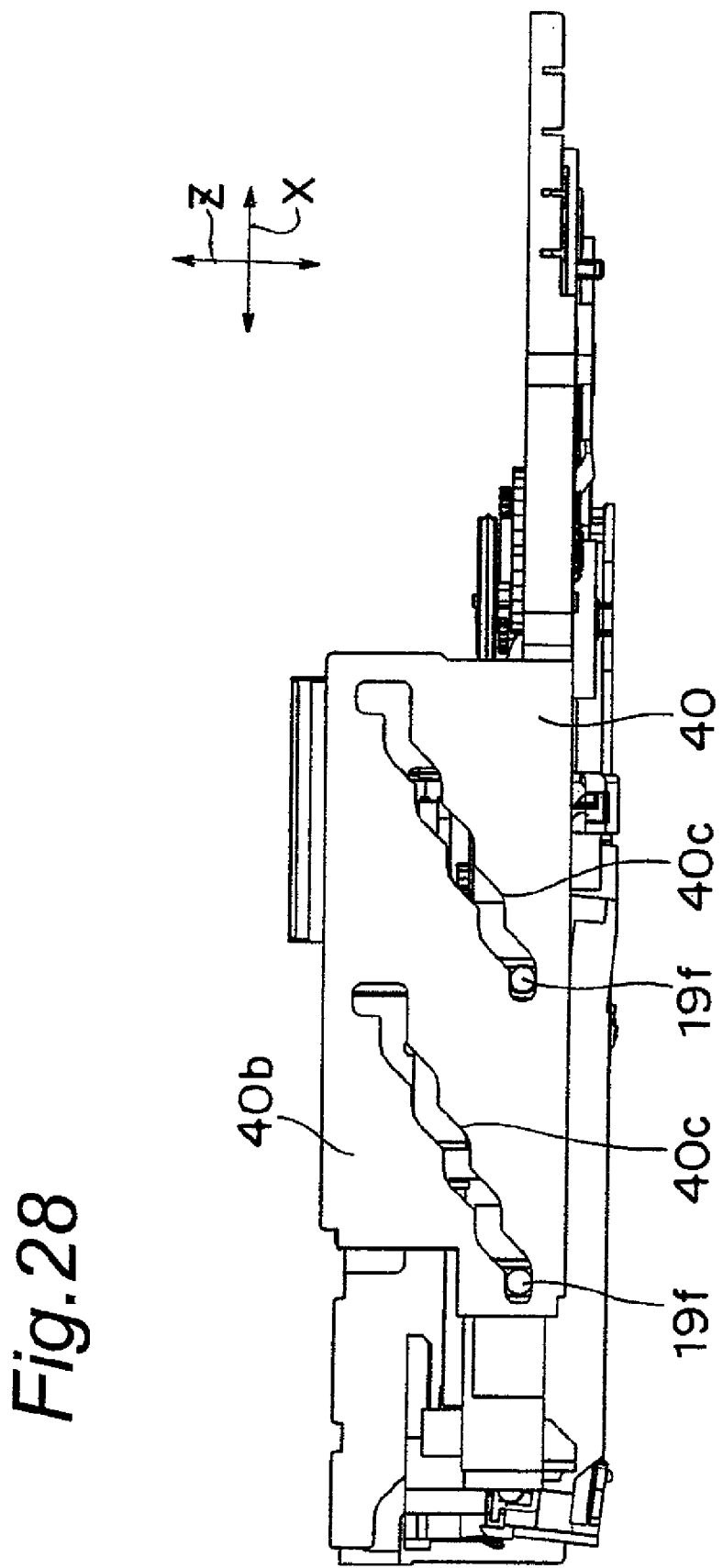
FIG. 28 is a side view that shows the structure of FIG. 27, viewed from the left-side slide elevation rack.
Figure 29:
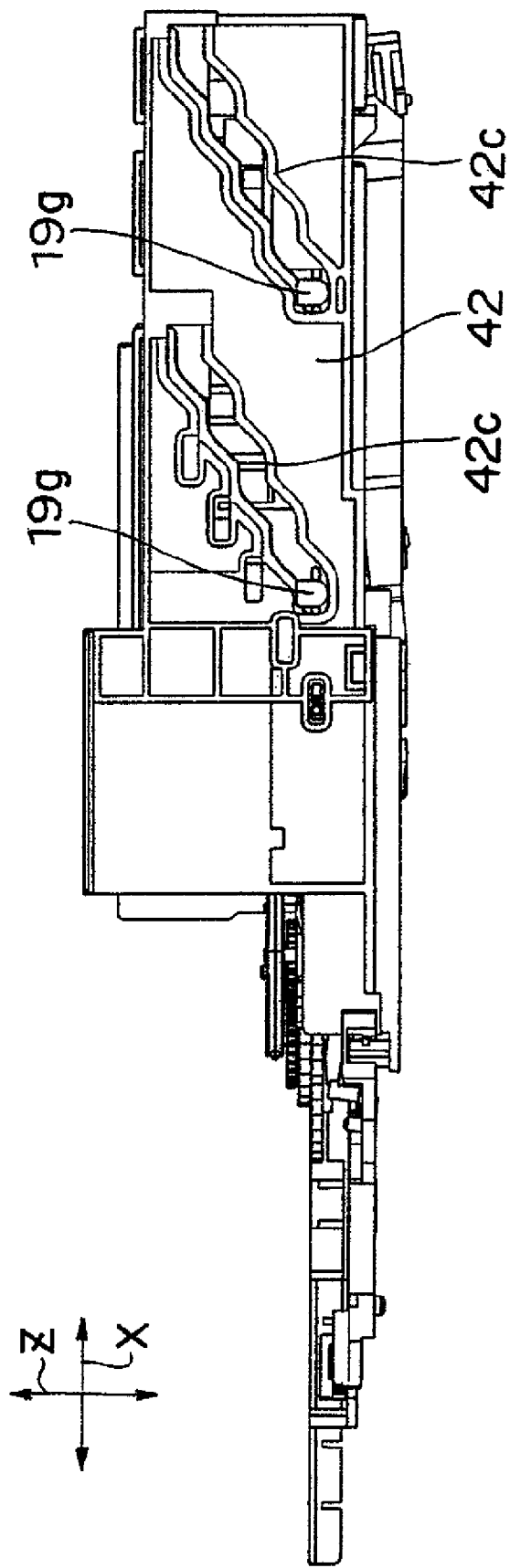
FIG. 29 is a side view that shows the structure of FIG. 27, viewed from the right-side slide elevation rack.

In the case where the left-side and right-side slide elevation racks 40 and 42 are slide-moved from the state shown in FIG. 24 to a state as shown in FIG. 27 by the driving force of the second motor 31 as described above, the respective engaging pins 19*f*, 19*f* and 19*g*, 19*g* of the elevation base 19 are allowed to slide from the uppermost step to the lowermost step of the cam grooves 40*c*, 40*c* and 42*c*, 42*c*, as shown in FIGS. 28 and 29. Thus, the elevation base 19 can be moved to a position having a height suitable for the tray 5*e* that is located on the lowermost step. Here, by adjusting the amounts of slide shift of the left-side and right-side slide elevation racks 40 and 42, the elevation base 19 can be moved to a position having a height suitable for a desired tray 5.

In the present embodiment, the motor pulley 32, the belt 33, the pulley gear 34, the relay gear 35, the switching gear 36, the switching lever 37, the sub-slide blade 26, the elevation base 19, the elevation driving gear 39, the left-side and right-side slide elevation racks 40 and 42, and the coupling lever 41 are allowed to form an elevation unit capable of moving the traverse base 9 upward/downward so as to be placed at a position having a height suitable for the tray located at the recording/reproducing position A2.

Figure 30:
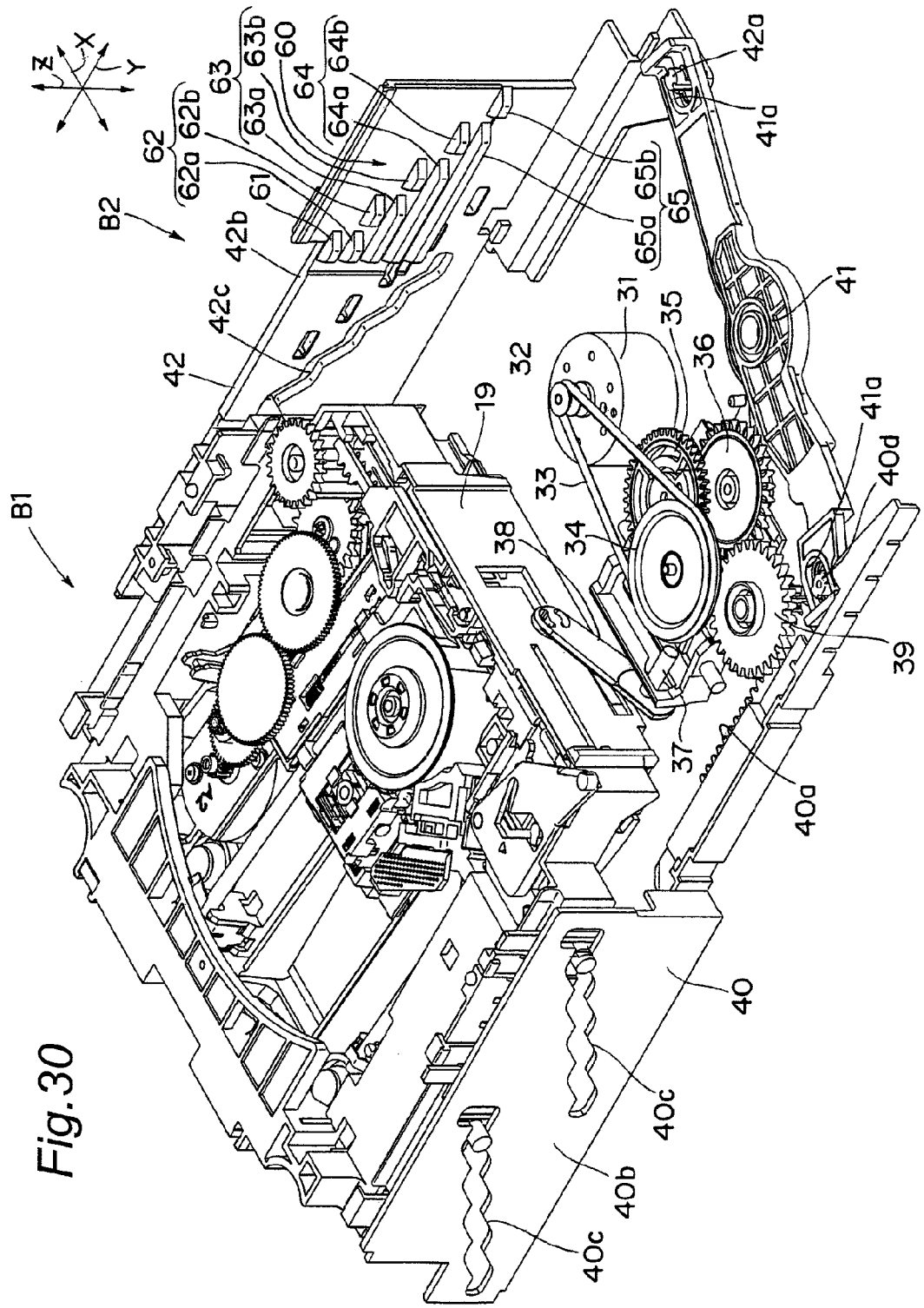
FIG. 30 is a perspective view that shows the structure of FIG. 24 viewed diagonally from above.

Moreover, as shown in FIG. 30, a plurality of protruding portions 60 are formed on a portion of the stand-by section B2 side in the device-depth direction X of the plate-shaped member 42b of the right-side slide elevation rack 42. The protruding portions 60 are configured by a first-step protruding portion 61 placed at a position having a height corresponding to the tray 5a on the first step (uppermost step), a second-step protruding portion 62 placed at a position having a height corresponding to the tray 5b on the second step, a third-step protruding portion 63 placed at a position having a height corresponding to the tray 5c on the third step, a fourth-step protruding portion 64 placed at a position having a height corresponding to the tray 5d on the fourth step and a fifth-step protruding portion 65 placed at a position having a height corresponding to the tray 5e on the fifth step (lowermost step).

The protruding portion 62 on the second step is configured by two protruding portions 62a and 62b placed with a predetermined interval between them. Each of the protruding portions 62a and 62b is formed to have the same size as the protruding portion 61 on the first step. The protruding portion 63 on the third step is configured by two protruding portions 63a and 63b placed with a predetermined interval between them. The protruding portion 63a positioned on the recording/reproducing section B1 side in the device-depth direction X has a length corresponding to a coupled length between the protruding portions 62a and 62b on the second step with the mutual interval being filled. The protruding portion 63b positioned on the stand-by section B2 side in the device-depth direction X is formed to have the same size as the protruding portion 61 on the first step. The protruding portion 64 on the fourth step is configured by two protruding portions 64a and 64b placed with a predetermined interval between them. The protruding portion 64a positioned on the recording/reproducing section B1 side in the device-depth direction X has a length corresponding to a coupled length between the protruding portions 63a and 63b on the third step with the mutual interval being filled. The protruding portion 64b positioned on the stand-by section B2 side in the device-depth direction X is formed to have the same size as the protruding portion 61 on the first step. The protruding portion 65 on the fifth step is configured by two protruding portions 65a and 65b placed with a predetermined interval between them. The protruding portion 65a positioned on the recording/reproducing section B1 side in the device-depth direction X has a length corresponding to a coupled length between the protruding portions 64a and 64b on the fourth step with the mutual interval being filled. The protruding portion 65b positioned on the stand-by section B2 side in the device-depth direction X is formed to have the same size as the protruding portion 61 on the first step. The protruding portions 61 to 65 on the first to fifth steps are disposed so as to allow the respective ends on the recording/reproducing section B1 side in the device-depth direction X of the protruding portions 61a to 65a to be aligned in the device-thickness direction Z. All the protruding portions 61a to 65a and 61b to 65b from the first to fifth steps are formed into shapes, each having a trapezoidal shape in its cross section.

Here, the switching gear 36, which is moved upward and downward by a pivotal movement of the switching lever 37 as described above, is designed so that, when raised as shown in FIGS. 20A, 20B and FIG. 21, the switching gear 36 is not meshed with a cam gear 43. A center hole 43a is formed in the center of the cam gear 43. As shown in FIGS. 5 and 6, a shaft member 44 is inserted into the center hole 43a of the cam gear 43, and the shaft member 44 is attached to the device main body 2. Therefore, the cam gear 43 is designed so as to rotate around the shaft member 44 serving as a center axis. Moreover, the cam gear 43 is designed to be meshed with an input gear (not shown) of a tray relay gear 45. An output shaft 45a of the tray relay gear 45 is designed to be meshed with a shaft gear 76 of a tray driving gear unit 70.

Figure 32:
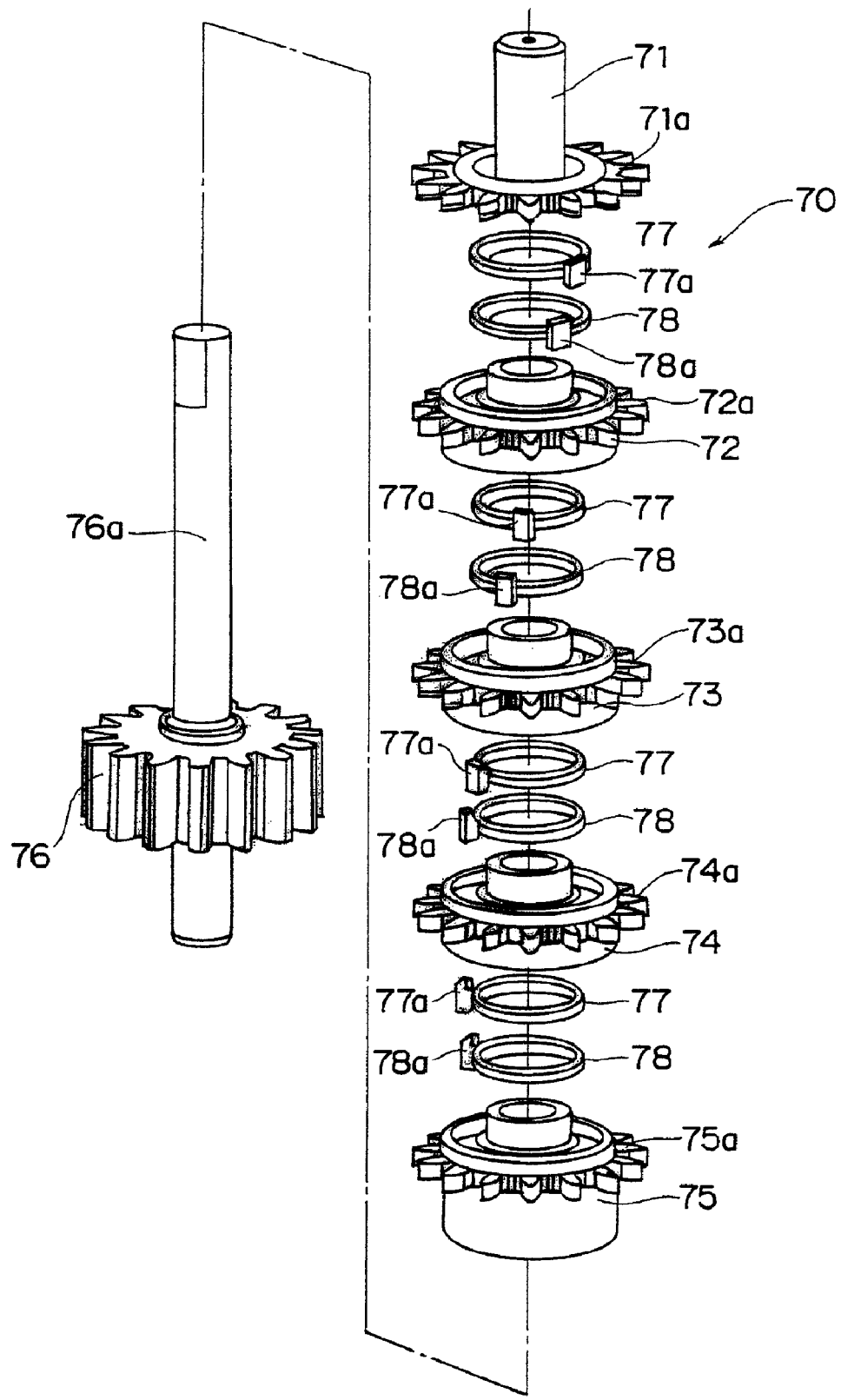
FIG. 32 is an exploded perspective view of a tray driving gear unit.

FIG. 32 is an exploded perspective view of the tray driving gear unit 70. As shown in FIG. 32, the tray driving gear unit 70 is provided with a first-step tray driving gear 71, a second-step tray driving gear 72, a third-step tray driving gear 73, a fourth-step tray driving gear 74 and a fifth-step tray driving gear 75, which are respectively inserted into a shaft portion 76a of a shaft gear 76. The first-step tray driving gear 71 is secured onto the periphery of the tip portion of a shaft portion 76a of the shaft gear 76 so as to rotate integrally with the shaft gear 76. The second to fifth-step tray driving gears 72 to 75 are attached onto the periphery of the shaft portion 76a so as to rotate thereon. The respective tray driving gears 71 to 75 are arranged so as to be meshed with racks 5f (see FIG. 1) that are formed on side faces of the corresponding trays 5. When the tray driving gears 71 to 75 are driven to rotate, with the tray driving gears 71 to 75 being meshed with the racks 5f of the corresponding trays 5, the corresponding trays 5 are transported between the stand-by position A2 and the exchange position A3. For example, in the case where the fifth-step tray driving gear 75 and the rack 5f of the fifth-step tray 5e are meshed with each other, upon transmission of a driving force of the second motor 31 to the tray driving gear 75 in its meshed state, the fifth-step tray 5e is transported between the stand-by position A2 and the exchange position A3.

Between the respective driving gears 71 to 75, two plastic rings 77 and 78 are attached onto the periphery of the shaft portion 76a of the shaft gear 76 so as to rotate thereon. Each of stopper ribs 77a and 78a is attached to one portion on its peripheral portion of each of the plastic rings 77 and 78. The respective stopper ribs 77a and 78a are formed into such sizes that, when plastic rings 77 and 78 are superposed on each other, they can be made in contact with each other.

Figure 33:
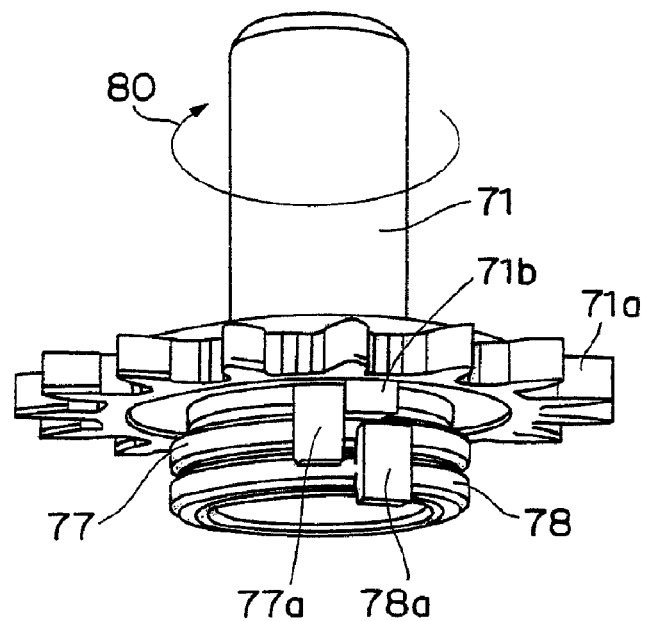
FIG. 33 is a perspective view that shows a positional relationship between a tray driving gear on the first step and upper and lower plastic rings.
Figure 34:
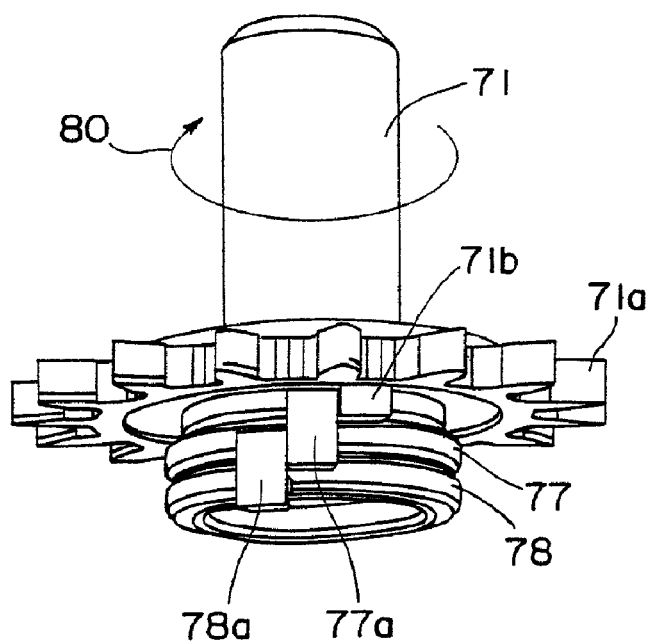
FIG. 34 is a perspective view that shows a state in which a tray driving gear on the first step and the upper plastic ring have been rotated from the state shown in FIG. 33.

FIG. 33 is a perspective view that shows a state in which the plastic rings 77 and 78 are attached to the first-step tray driving gear 71. As shown in FIG. 33, a lower stopper rib 71b, which can be made in contact with the stopper rib 77a of the upper plastic ring 77, is formed on a lower portion of the first-step tray driving gear 71. For example, in the case where the first-step tray driving gear 71 is allowed to rotate in a direction indicated by an arrow 80, as shown in FIG. 33, the lower stopper rib 71b is made in contact with the stopper rib 77a of the plastic ring 77. When the first-step tray driving gear 71 is further rotated in the direction of arrow 80 in this state, the stopper rib 77a is pushed by the lower stopper rib 71b so that the upper plastic ring 77 is also rotated in the direction of arrow 80. The stopper rib 77a of the upper plastic ring 77 rotating in the direction of arrow 80 is then made in contact with the stopper rib 78a as shown in FIG. 34. When the first-step tray driving gear 71 is further rotated in the direction of arrow 80 in this state, the lower plastic ring 78 is allowed to rotate in the direction of arrow 80, with respective the stopper ribs 71b, 77a and 78a being made in contact with one after another.

Figure 35:
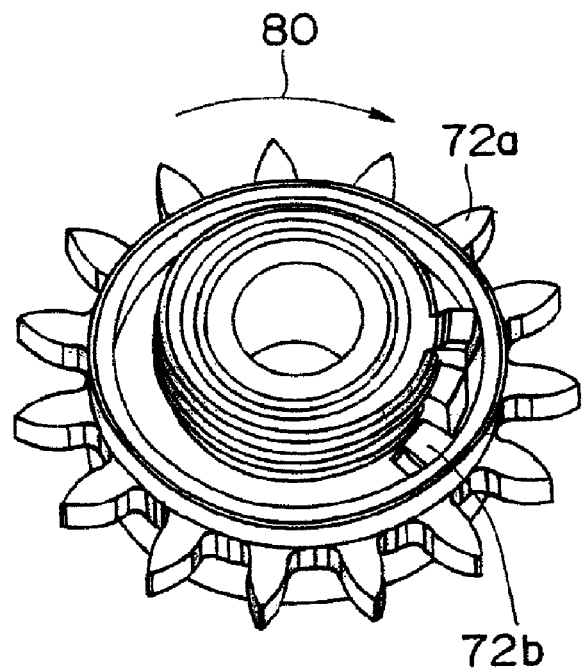
FIG. 35 is a perspective view that shows a structure of a tray driving gear on the second step, viewed diagonally from above.

FIG. 35 is a perspective view that shows a state in which the plastic rings 77 and 78 are disposed on the upper portion of the second-step tray driving gear 72. As shown in FIG. 35, an upper stopper rib 72b is placed on the upper portion of the second-step tray gear 72. The lower plastic ring 78 that rotates in the direction of arrow 80 as described above is made in contact with the upper stopper rib 72b as shown in FIG. 35. When the first-step tray driving gear 71 is further rotated in the direction of arrow 80 in this state, the second-step tray driving gear 72 is also rotated in the direction of arrow 80.

Figure 36:
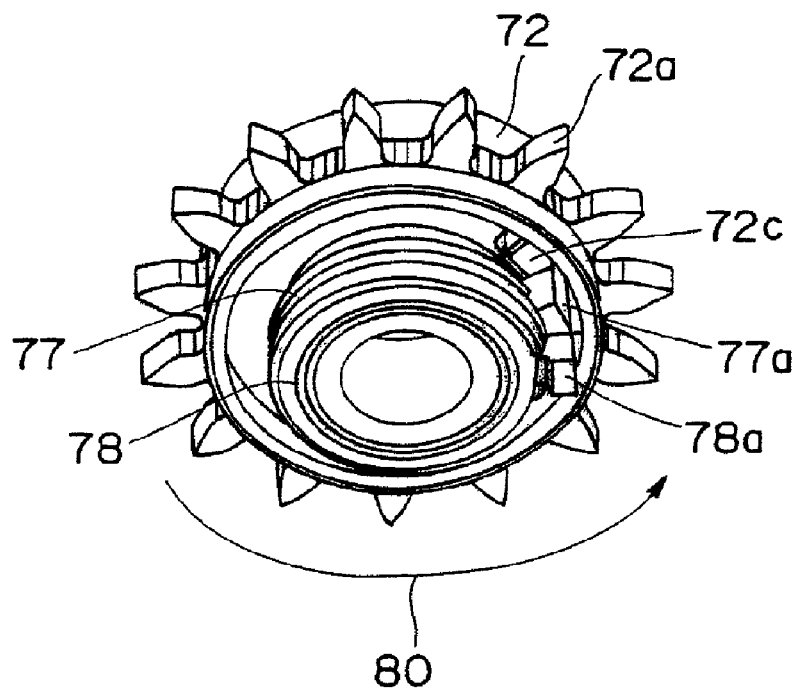
FIG. 36 is a perspective view that shows a structure of the tray driving gear on the second step, viewed diagonally from below.

FIG. 36 is a perspective view that shows a state in which the plastic rings 77 and 78 are disposed on the lower portion of the second-step tray driving gear 72. As shown in FIG. 36, a lower stopper rib 72c is placed on the lower portion of the second-step tray gear 72. The lower stopper rib 72c of the second-step tray driving gear 72 that rotates in the direction of arrow 80 as described above is made in contact with the stopper rib 77a of upper plastic ring 77. When the second-step tray driving gear 71 is further rotated in the direction of arrow 80 in this state, the stopper rib 77a is pushed by the lower stopper rib 72c so that the upper plastic ring 77 is also rotated in the direction of arrow 80. The stopper rib 77a of the upper plastic ring 77 rotating in the direction of arrow 80 is then made in contact with the stopper rib 78a as shown in FIG. 36. When the second-step tray driving gear 72 is further rotated in the direction of arrow 80 in this state, the lower plastic ring 78 is allowed to rotate in the direction of arrow 80, with the respective stopper ribs 72c, 77a and 78a being made in contact with one after another.

Since the third to fifth-step tray driving gears 73 to 75 are designed in the same manner as in the second-step tray driving gear 72, and operated in the same manner, the description thereof will not be given. Here, only the upper stopper rib (not shown) is placed on the fifth-step tray gear 75.

When all the respective driving gears 71 to 75 and plastic rings 77 and 78 are rotated in the same direction as described above, the respective stopper ribs are eventually made in contact with one another. When the tray driving gear unit 70 is further driven to rotate in this state, the respective tray driving gears 71 to 75 are allowed to rotate simultaneously. Thus, the five trays 5 can be simultaneously transported to the exchange position A3.

In the present embodiment, the motor pulley 32, the belt 33, the pulley gear 34, the relay gear 35, the switching gear 36, the switching lever 37, the sub-slide blade 26, the elevation base 19, the cam gear 43, the tray relay gear 45 and the tray driving gear unit 70 are allowed to form a second tray driving unit that can drive trays 5 to reciprocatingly move between the stand-by position A2 and the exchange position A3.

Figure 37:
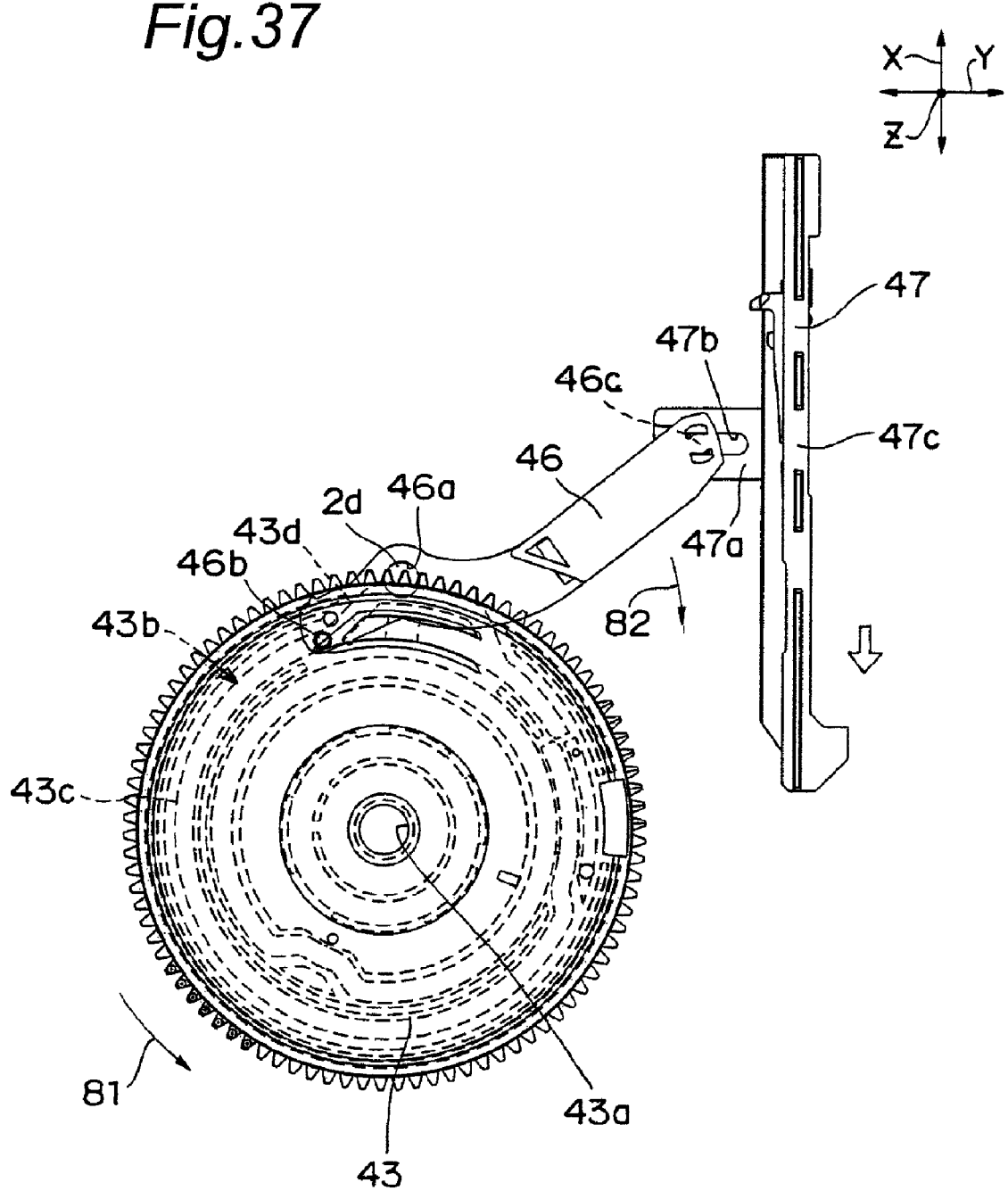
FIG. 37 is a plan view that shows a mechanism for moving a trigger slider.

Moreover, as shown in FIG. 6, a thin elongated virtually plate-shaped slider arm 46 is placed between the cam gear 43 that transmits a driving force from the second motor 31 to the above-mentioned tray driving gear unit 70 and the device main body 2. As shown in FIG. 37, a through hole 46a is formed on the slider arm 46 at a portion on its end side close to the cam gear 43. With a protruding shaft 2d formed on the device main body 2 being inserted into the through hole 46a, the slider arm 46 is attached to the device main body 2 so as to pivot centered on the protruding shaft 2d.

On the end portion of the slider arm 46 on the cam gear 43 side, as shown in FIG. 37, an engaging pin 46b that protrudes upward in the device-thickness direction Z is formed. The engaging pin 46b is engaged with a guide groove 43b formed on the lower face of the cam gear 43 so as to slide therein. As shown in FIG. 37, the guide groove 43b is provided with a virtually circular groove section 43c that is concentric with the center hole 43a of the cam gear 43 and a tilt portion 43d that tilts toward the departing side from the center hole 43a from the virtually circular groove section 43c. Even in the case where the cam gear 43 is rotated in a direction indicated by an arrow 81, with the engaging pin 46b being engaged with the virtually circular groove section 43c, the slider arm 46 is not rotated. In contrast, in the case where the cam gear 43 is rotated in the direction of arrow 81, with the engaging pin 46b being engaged with the tilt portion 43d, the slider arm 46 is allowed to rotate in the direction of arrow 82 centered on the protruding shaft 2d. Thus, the slider arm 46 is moved to a position shown in FIG. 38. Here, in the case where the cam gear 43 is rotated in a direction reversed to the direction of arrow 81, the slider arm 46 is rotated in a direction reversed to the direction of arrow 82. That is, the slider arm 46 is moved from the position shown in FIG. 38 to a position shown in FIG. 37.

Figure 38:
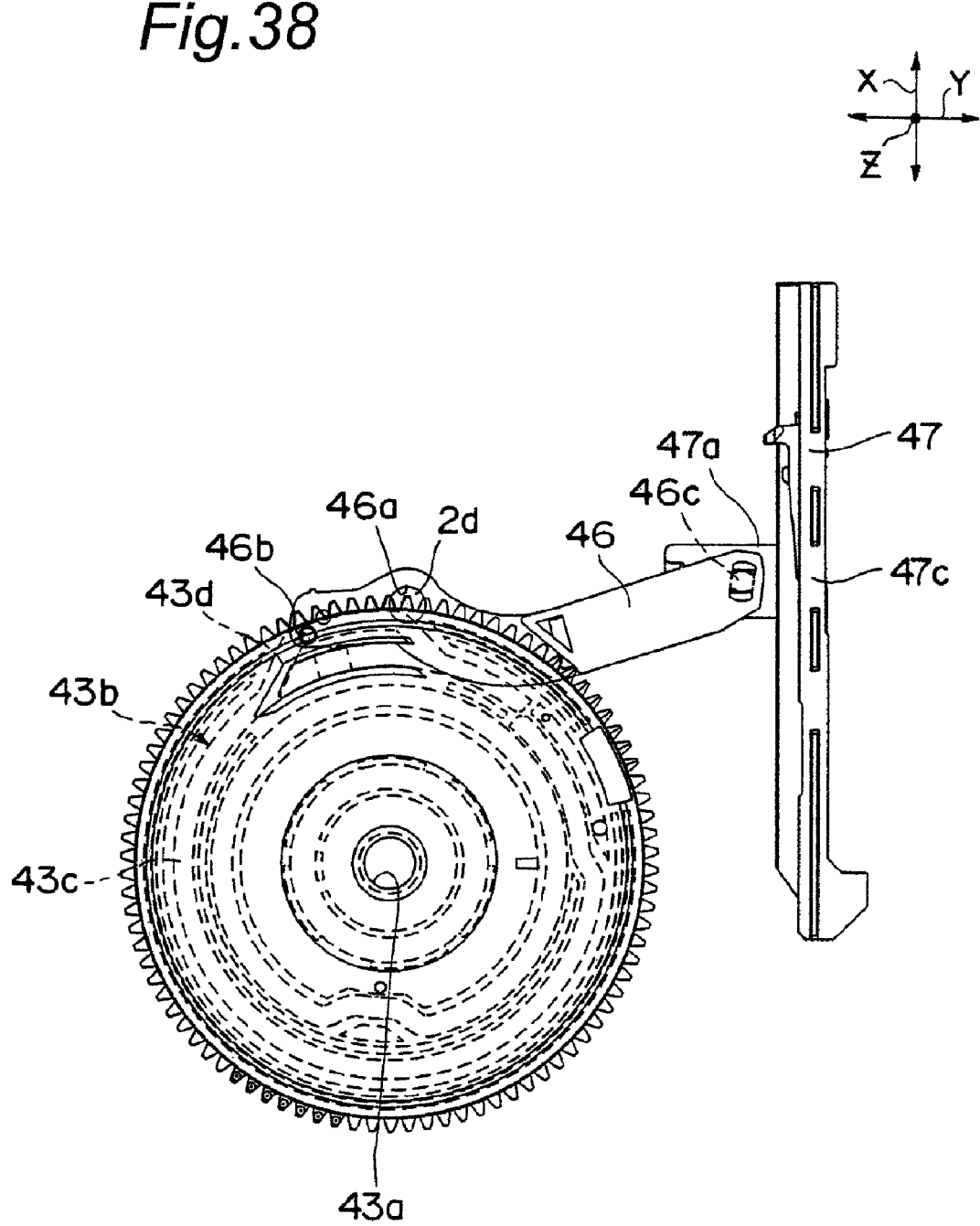
FIG. 38 is a plan view that shows a state in which the trigger slider has been moved from the state shown in FIG. 37.

On the end portion of the slider arm 46 on the departing side from the cam gear 43, an engaging pin 46c that protrudes downward in the device-thickness direction Z is formed. As shown in FIG. 37, the engaging pin 46c is engaged with a guide groove 47b formed on a plate-shaped protruding portion 47a of a trigger slider 47. The trigger slider 47 has a main body 47c having a virtually rectangular frame-shape in parallel with the device-depth direction X and device-thickness direction Z. The protruding portion 47a protrudes in the device-width direction Y from the center portion of the lower face of the frame-shaped main body 47c. A guide groove 47b is formed in parallel with the device-width direction Y. As shown in FIGS. 37 and 38, since the engaging pin 46c is engaged with the guide groove 47b, the trigger slider 47 is moved in parallel with the device-depth direction X when the slider arm 46 is allowed to pivot.

Figure 31:
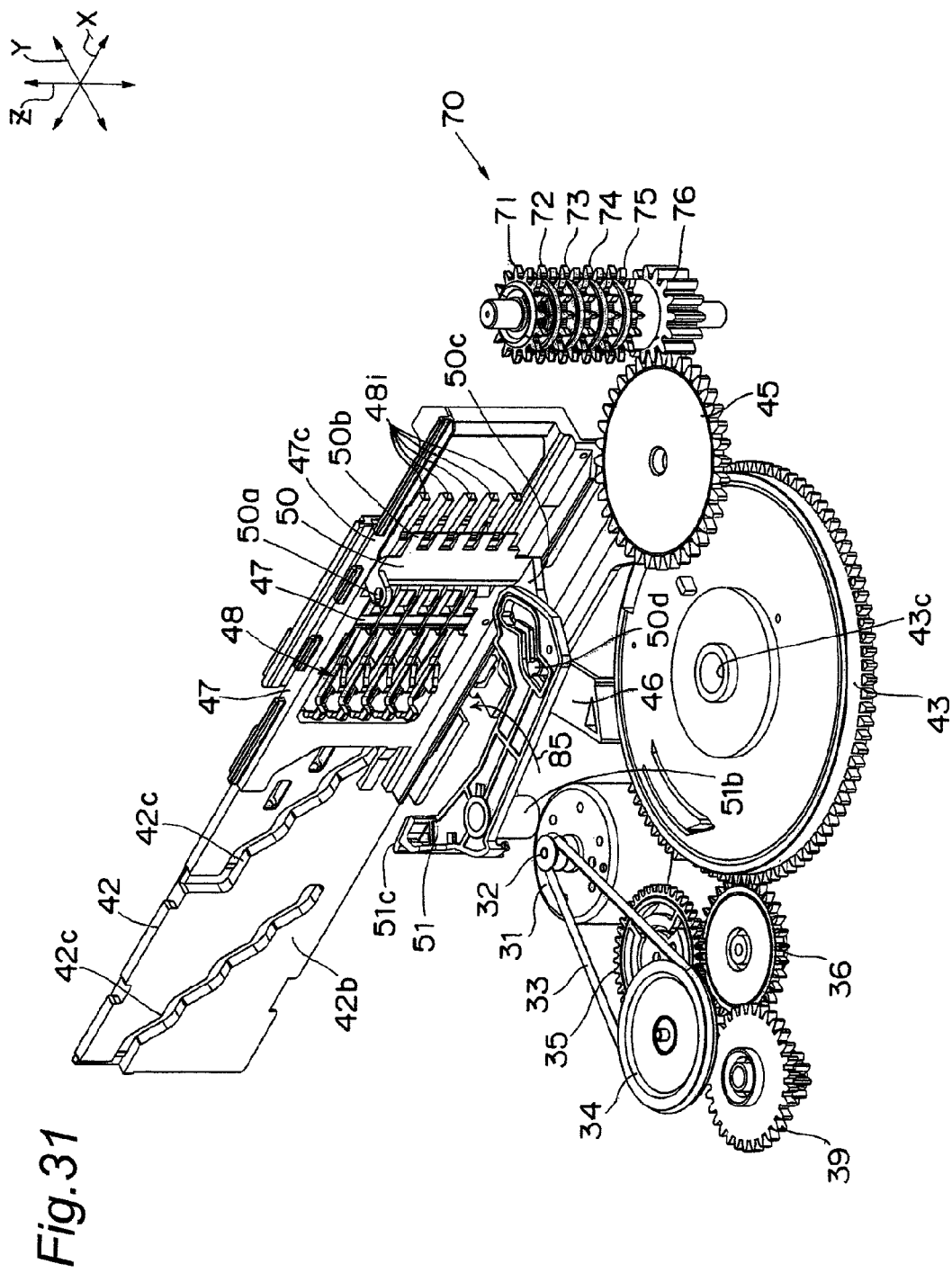
FIG. 31 is a perspective view that shows a structure of a transporting mechanism that transports a tray from a stand-by position to an exchange position.

Moreover, as shown in FIG. 5, the trigger slider 47 is provided with a shaft 47d that extends in the device-thickness direction, and is formed in the center portion thereof in the device-depth direction X. As shown in FIG. 31, trigger levers 48 (48a to 48e) that are examples of five trigger portions, each having a virtually rod shape, are attached to the shaft 47d. Each of the trigger levers 48 has a bearing portion 48f having a "C"-letter shape in the center portion in its extending direction so that, with the shaft 47d being fitted to each of the bearing portions 48f, each of the trigger levers 48 is attached to the trigger slider 47 so as to pivot thereon. The respective trigger levers 48 are formed into the same shape and the same size, and only the installation positions thereof are different.

Figure 39:
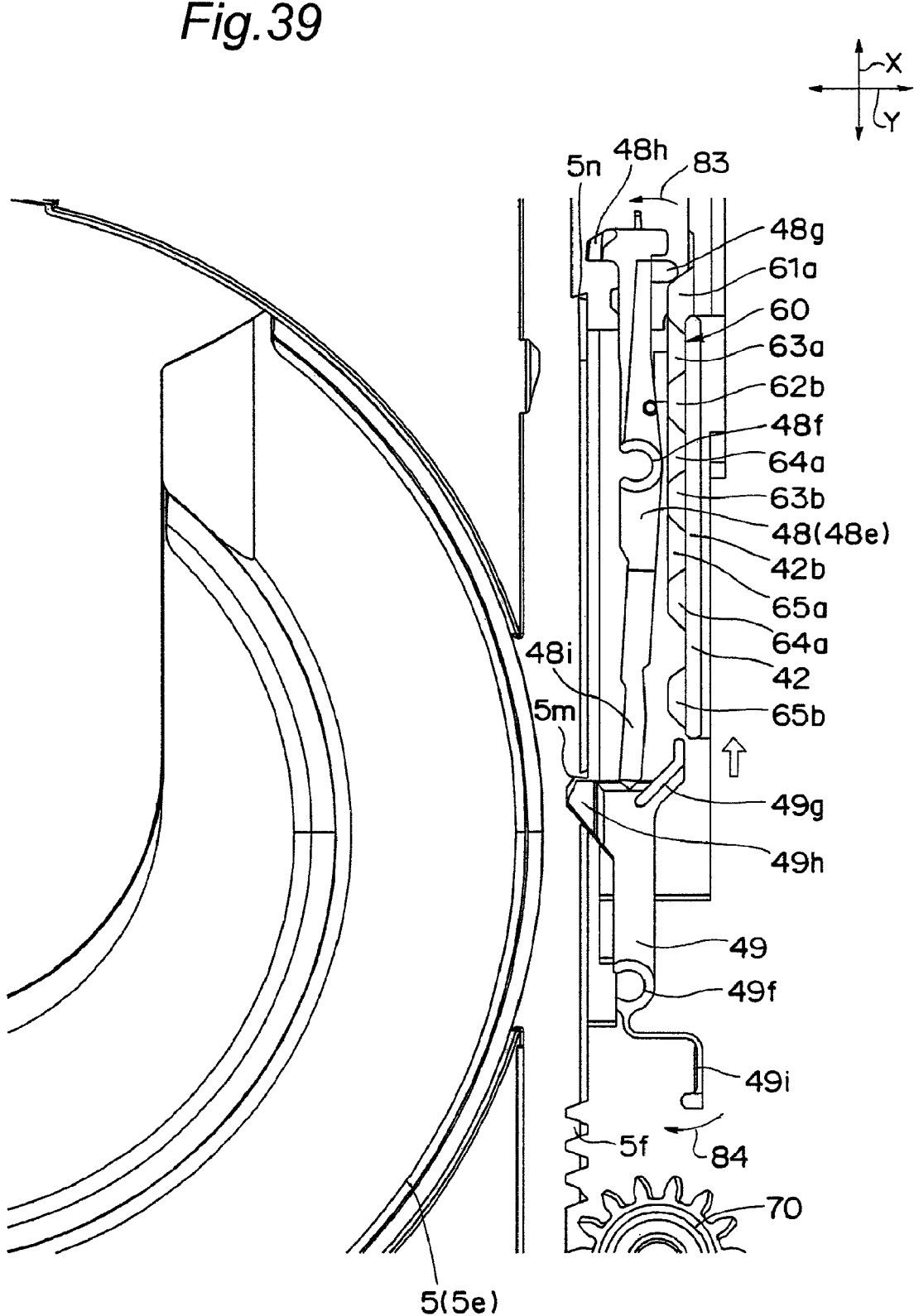
FIG. 39 is a plan view that shows a state in which a tray lock lever on the fifth step is locking the tray on the fifth step.
Figure 40:
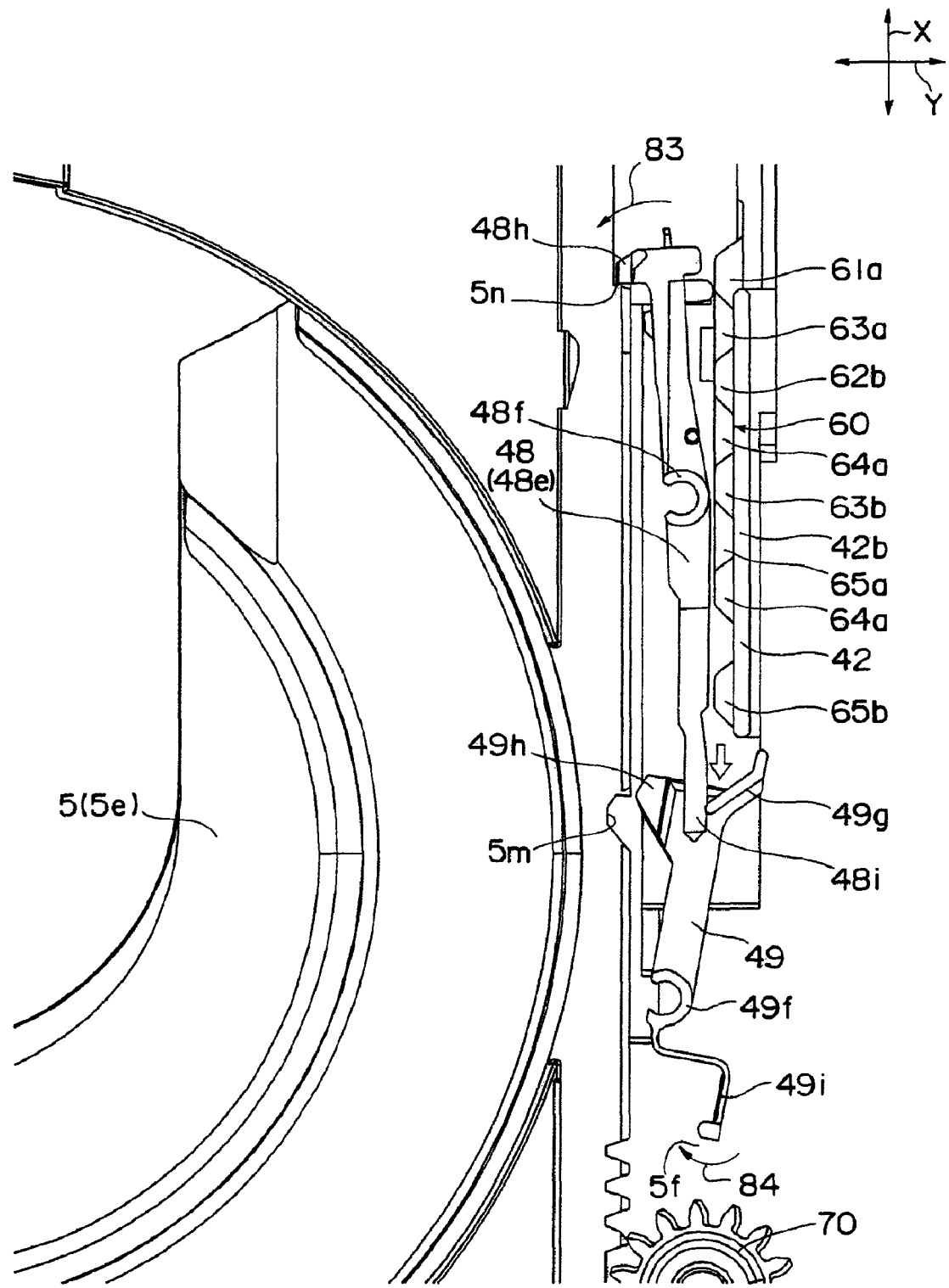
FIG. 40 is a plan view that shows a state in which the locked state between the tray lock lever on the fifth step and the tray on the fifth step has been released.

As shown in FIGS. 39 and 40, a protrusion-engaging claw 48g that is allowed to be engaged with either one of protruding portions 60 of the right-side slide elevation rack 42 and a tray extruding claw 48h that is allowed to be engaged with a step portion 5n formed on the side face of each of trays 5 are formed on the end portion of each trigger lever 48 on the tray driving gear unit 70 side in the device-depth direction X. Moreover, tray lock levers 49 (49a to 49e) that are examples of five tray lock portions are placed on the tray driving gear unit 70 side (lower side of FIG. 39) of each of the trigger levers 48 in the device-depth direction X. Each of the tray lock levers 49 has a bearing portion 49f having a "C"-letter shape in the center portion in its extending direction. With a shaft 2f (see FIG. 5) formed onto the device main body 2 so as to extend in the device-thickness direction Z being fitted to the bearing portion 49f, each of the tray lock levers 49 is attached to the device main body 2 so as to pivot thereon. The respective tray lock levers 49 are formed into the same shape and the same size, and only the installation positions thereof are different.

A tilt face 49g that tilts relative to the device-depth direction X and device-width direction Y and a tray locking claw 49h that can be engaged with a concave portion 5m formed on a side face of each of the trays 5 are formed on the end portion on the recording/reproducing section B1 side (upper side of FIG. 39) in the device-depth direction X of each of the tray lock levers 49. Here, the portion on the tray driving gear unit 70 side in the device-depth direction X of each of the tray lock levers 49 is formed into an elastic portion 49i bent into an L-letter shape. Each of the tray lock levers 49 is disposed so that the tip portion of the elastic portion 49i is made in contact with each of ribs (not shown) placed on device main body 2. Thus, each tray lock lever 49 is normally positioned in a state as shown in FIG. 39, and when each tray lock lever 49 is allowed to pivot in the direction of arrow 84, the elastic portion 49i of is elastically deformed so that each tray lock lever 49 is pressed so as to rotate in a direction reversed to arrow 84.

Figure 41:
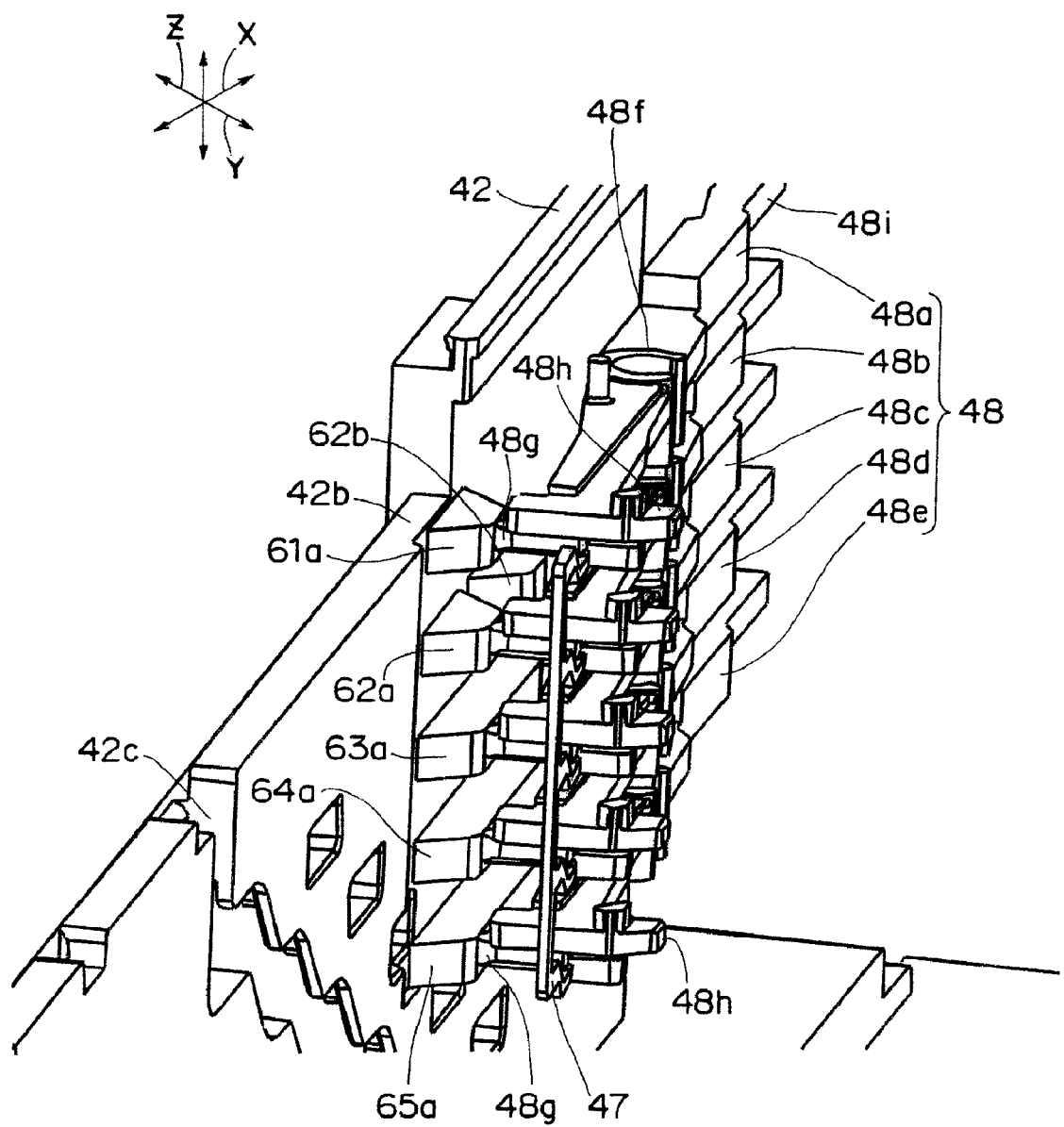
FIG. 41 is a perspective view that shows the state of FIG. 40, viewed diagonally from above.

Referring to FIGS. 37 to 41, the following description will discus operations by which the first-step tray 5a is transported to the exchange position A3 in the case where the elevation base 19 is positioned at a height suitable for the first-step tray 5a. FIG. 39 shows a state prior to operations in which the trigger lever 48c is moved to the tray driving gear unit 70 side in the device-depth direction X to pivot centered on the bearing portion 48f, and FIG. 40 shows a state after the pivotal movement. FIG. 41 is a perspective view showing the state of FIG. 40 viewed diagonally from above. Here, in FIGS. 39 and 40, the trigger lever 48e related to the fifth-step tray 5e is shown as the trigger lever 48, while the tray lock lever 49e related to the fifth-step tray 5e is shown as the tray lock lever 49.

In the case where the elevation base 19 is located at a height suitable for the first-step tray 5a, the right-side slide elevation rack 42 to be moved in the device-depth direction X in accordance with the height of the tray 5a as described earlier is located at a position shown in FIG. 39. Prior to the pivot of the fifth-step trigger lever 48e, the fifth-step trigger lever 48e is located on the recording/reproducing position A1 side (upper side of FIG. 39) of the protruding portion 65a. At this time, the first to fourth trigger levers 48a to 48d are also located on the recording/reproducing position A1 side (upper side of FIG. 39) of the protruding portions 61a to 64a.

Figure 43:
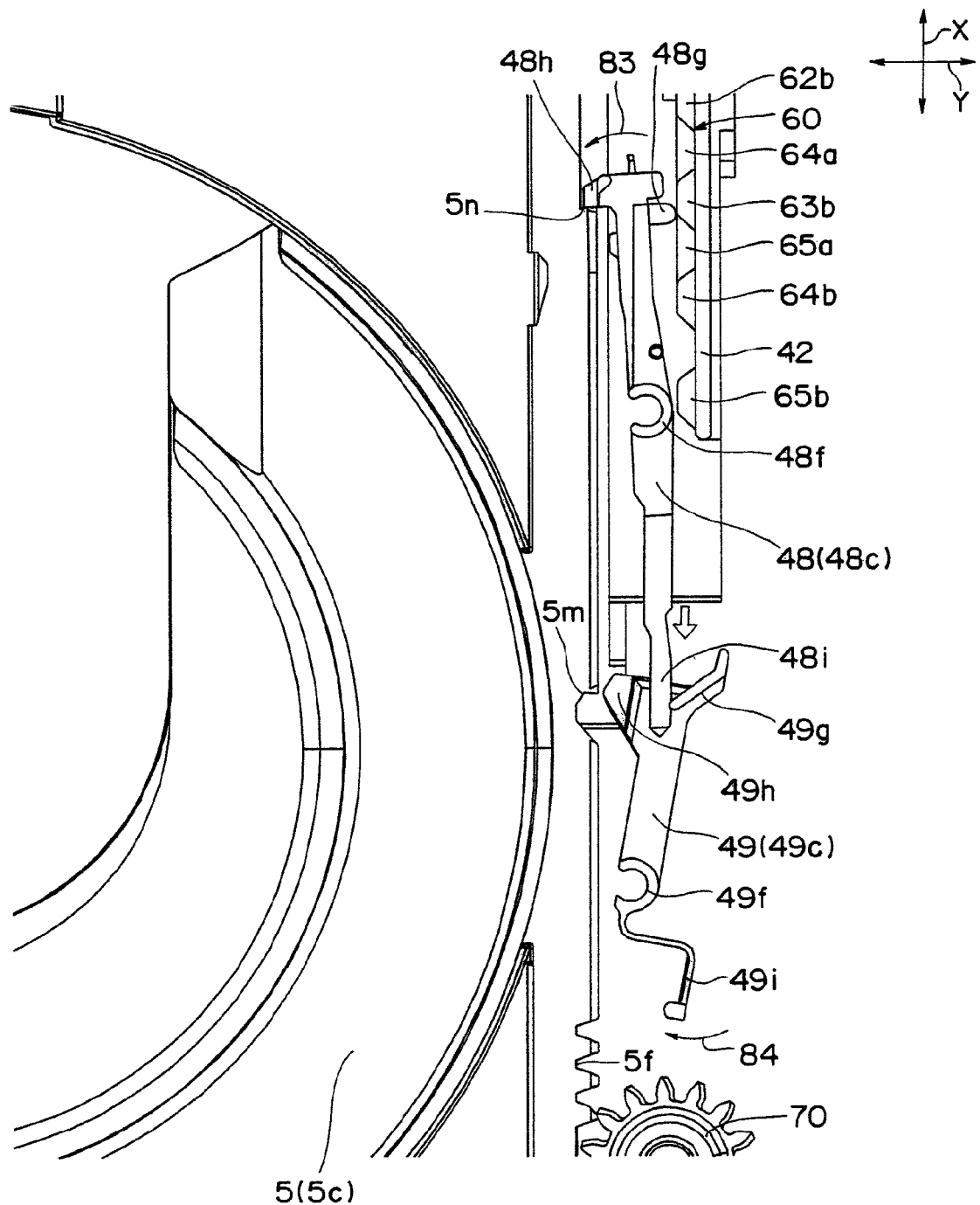
FIG. 43 is a plan view that shows a state in which the locked state between the tray lock lever on the third step and the tray on the third step has been released.
Figure 44:
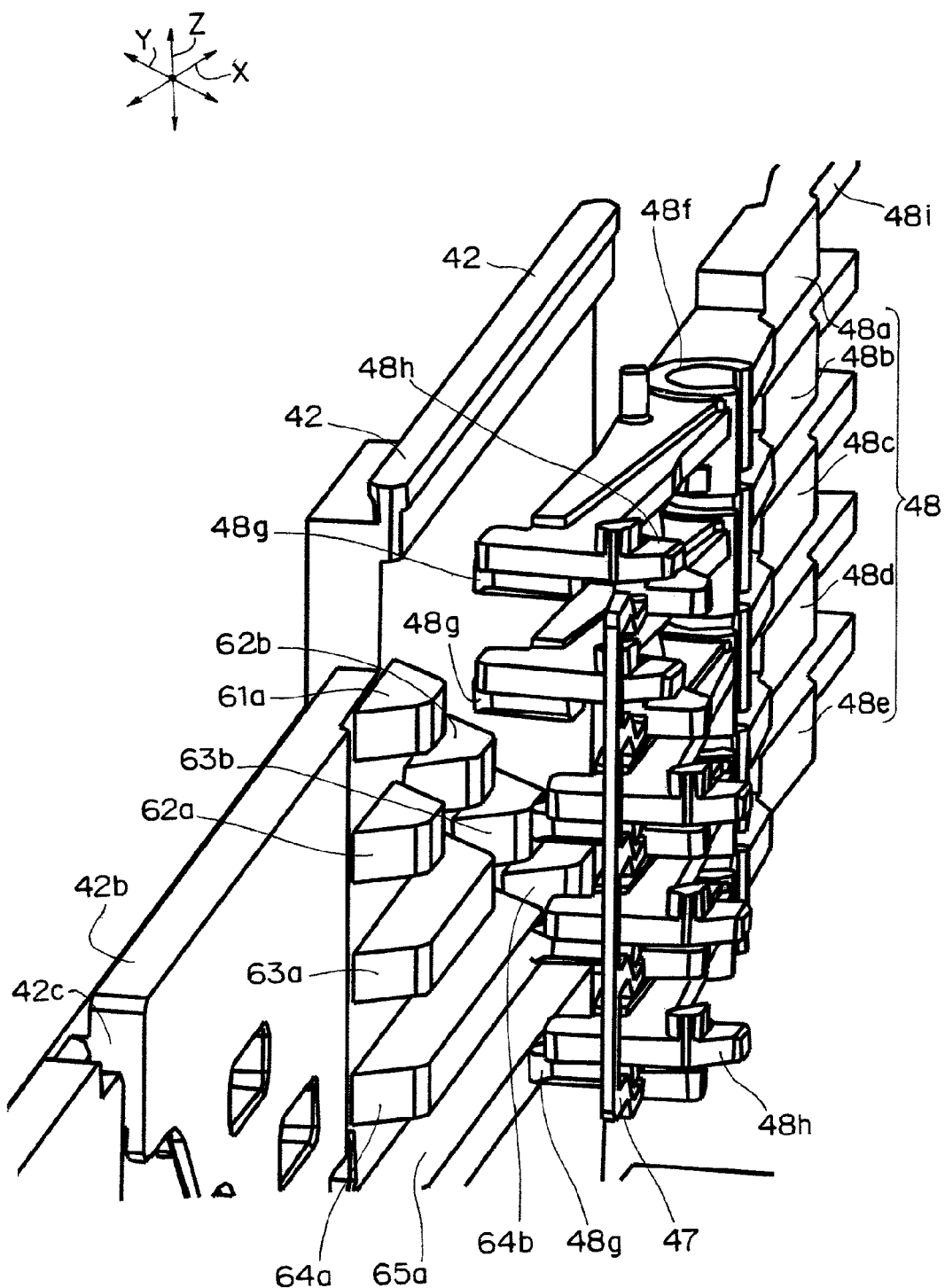
FIG. 44 is a perspective view that shows the state of FIG. 43, viewed diagonally from above.

In the case where the fifth-step trigger lever 48e is moved onto the tray driving gear unit 70 side in the device-depth direction X as described earlier from the state shown in FIG. 39, the protrusion-engaging claw 48g is pressed by the tilt face of the protruding portion 65a so that the fifth-step trigger lever 48e is allowed to pivot in the direction of arrow 83. Thus, as shown in FIGS. 43 and 44, the protrusion-engaging claw 48g of the fifth-step trigger lever 48e is allowed to ride onto a top face of the protruding portion 65a. At this time, the trigger levers 48a to 48d on the first to fourth steps are also allowed to ride onto the top faces of the protruding portions 61a to 64a. At this time, a tip portion 48i of the fifth-step trigger lever 48e pushes the tilt face 49g of the fifth-step tray lock lever 49e so that the fifth-step tray lock lever 49e is rotated in the direction of arrow 84 as shown in FIG. 40. Thus, the engagement between the tray locking claw 49h of the fifth-step tray lock lever 49e and the concave section 5m of the fifth-step tray 5e is released so that the fifth-step tray 5e is allowed to move to the exchange position A3. Moreover, at this time, in the same manner, the trigger levers 48a to 48d of the first to fourth steps also allow the tray lock levers 49a to 49d of first to fourth steps to rotate in the direction of arrow 84 so that the trays 5a to 5d of the first to fourth steps are also allowed to move to the exchange position A3.

When the fifth-step trigger lever 48e is further moved to the tray driving gear unit 70 side from the state shown in FIG. 40, the tray extruding claw 48h pushes the step portion 5n of the fifth-step tray 5e so that the fifth-step tray driving gear 73 of the tray driving gear unit 70 is meshed with the rack 5f of the fifth-step tray 5e. At this time, in the same manner, the tray driving gears 71 to 74 of the first to fourth steps of the tray driving gear unit 70 are meshed with the racks 5f of the trays 5a to 5d on the first to fourth steps. When tray driving gears 71 to 75 of first to fifth steps are driven to rotate in this state, trays 5a to 5e of first to fifth steps are moved to exchange position A3.

Figure 42:
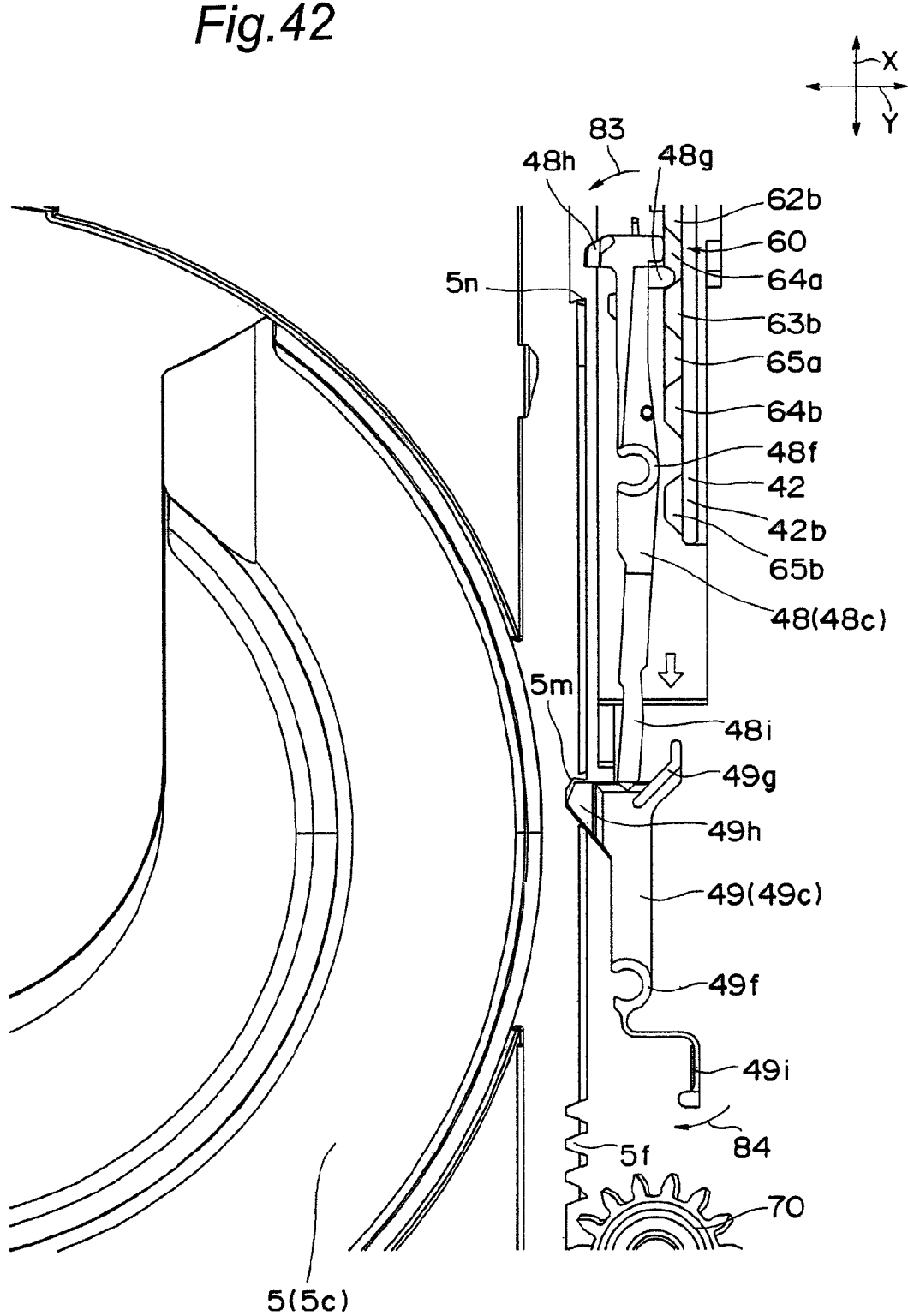
FIG. 42 is a plan view that shows a state in which a tray lock lever on the third step is locking the tray on the third step.
Figure 45:
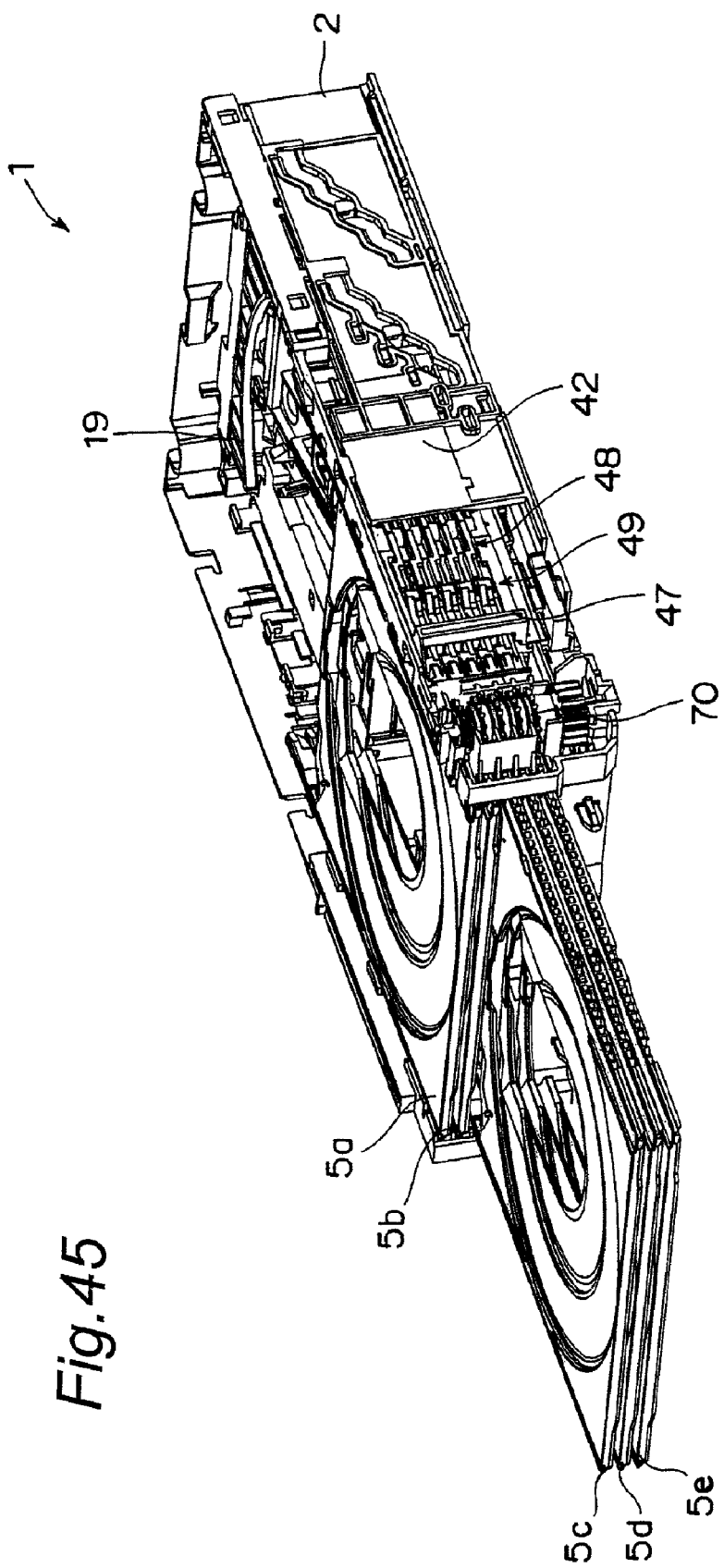
FIG. 45 is a perspective view that shows a state in which trays lower than the third step are transported to the exchange position.

Next, referring to FIGS. 42 to 45, the following description will discus operations by which the third-step tray 5c is transported to the exchange position A3 in the case where the elevation base 19 is positioned at a height suitable for the third-step tray 5c. FIG. 42 shows a state prior to operations in which third-step trigger lever 48c is moved to the tray driving gear unit 70 side in device-depth direction X to pivot centered on bearing portion 48f, and FIG. 43 shows a state after the pivotal operation. FIG. 44 is a perspective view showing the state of FIG. 42 viewed diagonally from above. FIG. 45 is a perspective view that shows a state in which the trays 5c to 5d on the third step and the steps below the third are moved to the exchange position A3.

In the case where the elevation base 19 is located at a height suitable for the third-step tray 5c, the right-side slide elevation rack 42 to be moved in the device-depth direction X in accordance with the height of the tray 5c as described earlier is located at a position shown in FIG. 42. Prior to the pivot of the third-step trigger lever 48c, the third-step trigger lever 48c is located between the protruding portion 63a and the protruding portion 63b. At this time, the first trigger lever 48a is located at a position that gets over the protruding portion 61a, while the second trigger lever 48b is located at a position that gets over the protruding portion 62b. The fourth-step trigger lever 48d is positioned on the protruding portion 64a, while the fifth-step trigger lever 48e is positioned on the protruding portion 65a.

When the third-step trigger lever 48c is moved to the tray driving gear unit 70 side in the device-depth direction X as described earlier from the state shown in FIG. 42, the protrusion-engaging claw 48g is pressed by the tilt face of the protruding portion 63b so that the third-step trigger lever 48c is allowed to pivot in the direction of arrow 83. Thus, as shown in FIGS. 43 and 44, the protrusion-engaging claw 48g of the third-step trigger lever 48c is allowed to get over the top face of the protruding portion 63b. At this time, the fourth-step trigger lever 48d slides on the top face of the protruding portion 64a, while the fifth-step trigger lever 48e slides on the top face of the protruding portion 65b. At this time, the tip portion 48i of the third-step trigger lever 48c pushes the tilt face 49g of the third-step tray lock lever 49c so that the third-step tray lock lever 49c is rotated in the direction of arrow 84 as shown in FIG. 43. Thus, the engagement between the tray locking claw 49h of the third-step tray lock lever 49c and the concave section 5m of the third-step tray 5c is released so that the third-step tray 5c is allowed to move to the exchange position A3. Moreover, at this time, in the same manner, the trigger levers 48d to 48e of the fourth and fifth steps also allow the tray lock levers 49d to 49e of the fourth and fifth steps to rotate in the direction of arrow 84 so that the trays 5d and 5e of the fourth and fifth steps are allowed to move to the exchange position A3. On the other hand, since the protrusion-engaging claw 48g is allowed to slide on the plate-shaped portion 42b, the trigger levers 48a and 48b of the first and second steps are not rotated in the direction of arrow 84. For this reason, the tray lock levers 49a and 49b of first and second steps are not rotated in the direction of arrow 84, with the result that the trays 5a and 5b of the first and second steps are not allowed to move to the exchange position A3.

When the third-step trigger lever 48c is further moved to the tray driving gear unit 70 side from the state shown in FIG. 43, the tray extruding claw 48h pushes the step portion 5n of the third-step tray 5c so that the third-step tray driving gear 73 of the tray driving gear unit 70 is meshed with the rack 5f of the third-step tray 5c. At this time, in the same manner, the tray driving gears 74 and 75 of the fourth and fifth steps of the tray driving gear unit 70 are meshed with the racks 5f of the trays 5d and 5e of the fourth and fifth steps. When the tray driving gears 73 to 75 of the third to fifth steps are driven to rotate in this state, the trays 5c to 5e of the third to fifth steps are moved to the exchange position A3 as shown in FIG. 45.

In accordance with the disc changer device 1 of the embodiment of the present invention, since the above-mentioned arrangement is provided, the trays located on upper levels (trays 5a and 5b of the first and second steps in the above-mentioned example) from a tray suitable for a height position of the elevation base 19 (third-step tray 5c in the above-mentioned example) are prevented from being discharged to the exchange position A3. Therefore, since it is not necessary to separately prepare a tray used for transporting the tray 5, it is possible to confirm a disc on the tray placed at recording/reproducing position A1 in a short period of time, without making the device bulky.

Moreover, in accordance with the disc changer device 1 of the embodiment of the present invention, simultaneously with the tray corresponding to the height position of elevation base 19, all the trays located on the lower levels from the corresponding tray are transported to the exchange position A3. With this arrangement, since the tray corresponding to the height position of the elevation base 19 can be supported by the trays located on the lower levels from the tray, it becomes possible to make the trays thinner. Therefore, it becomes possible to achieve a small-size and thinner device.

In the above-mentioned arrangement, simultaneously with the tray corresponding to the height position of the elevation base 19, all the trays located on the lower levels from the tray are transported to the exchange position A3; however, the present invention is not limited to this arrangement. Simultaneously with the tray corresponding to the height position of elevation base 19, the tray adjacent to the corresponding tray on the lower level may be transported to the exchange position A3, and this arrangement can also provide the same effect.

Moreover, in the above-mentioned arrangement, the protruding portion 63a on the third step is designed to have a length corresponding to a coupled length between the protruding portions 62a and 62b on the second step with the mutual interval being filled; however, the present invention is not limited to this arrangement. For example, in place of the protruding portion 63a on the third step, two protruding portions having the same shapes and the same layout interval as those of the protruding portions 62a and 62b on the second step may be placed. In the same manner, the protruding portions 64a, 64a on the fourth and fifth steps may be formed by using three or four protruding portions. That is, protruding portions, each having the same shape as that of the protruding portion 61a on the first step, may be aligned in the device-thickness direction Z in parallel with one another. Here, as shown in FIG. 30, another arrangement may be proposed in which each of the protruding portions 63a to 65a on the third to fifth steps is made to have a length in the device-depth direction X longer than that of the protruding portion 61a on the first step, and this arrangement is more advantageous than the above-mentioned arrangement because the number of times in which trigger levers 48c to 48e sliding on the corresponding protruding portions 63a to 65a are moved in the device-width direction Y (that is, moved between the mutually adjacent protruding portions) can be made smaller. Thus, it is possible to prevent damages and the like to the trigger levers 48c to 48e, and also to prevent vibration caused by the trigger levers 48c to 48e moving between the mutually adjacent protruding portions.

In the present embodiment, the second motor 31, the motor pulley 32, the belt 33, the pulley gear 34, the relay gear 35, the switching gear 36, the cam gear 43, the slider arm 46, the trigger slider 47, the trigger lever 48 and the protruding portion 60 are allowed to form an engagement releasing unit capable of releasing engagement between a selected tray and a tray lock lever related to the tray as well as engagement between a tray adjacent to the selected tray on the lower level and a tray lock lever related to the corresponding tray. Moreover, in the present embodiment, the second motor 31, the motor pulley 32, the belt 33, the pulley gear 34, the relay gear 35, the switching gear 36, the cam gear 43, the slider arm 46 and the trigger slider 47 are allowed to form a trigger moving unit capable of moving the trigger lever 48 in a tray transporting direction.

Moreover, as shown in FIG. 31, the disc changer device 1 in accordance with the present embodiment is provided with an all-trigger lever 50 near the tip portion 48i of the trigger lever 48. With a shaft 2g (see FIG. 6) that extends in the device-thickness direction Z and is formed on the device main body 2 being inserted to the bearing hole 50a, the all-trigger lever 50 is attached to the device main body 2 so as to pivot centered on the bearing hole 50a. The all-trigger lever 50 is provided with claws 50b that can be made in contact with the respective five trigger levers 48a to 48e. The all-trigger lever 50 is rotated centered on the bearing hole 50a so that the claws 50b push the tip portions 48i of the respective trigger levers 48a to 48e; thus, all the trigger levers 48a to 48e can be simultaneously rotated in the direction of arrow 83. That is, the all-trigger lever 50 can release all the locked states of the trays 5a to 5e by the tray lock levers 49a to 49e, independent of the positional relationship between the trigger levers 48a to 48e and the protruding portion 60.

As shown in FIG. 31, a protruding portion 50c that protrudes to the inside of device in the device-width direction Y is formed on the lower end portion of the all-trigger lever 50. An engaging pin 50d that protrudes upward in the device-thickness direction Z is attached to the tip portion of the protruding portion 50c. The engaging pin 50d is engaged with a cam groove 51a formed on one end of a trigger link lever 51 so as to slide therein. The trigger link lever 51 has a shaft portion 51b that is placed on a portion slightly closer to the center from the other end, and is attached to the device main body 2 by the shaft portion 51b so as to pivot thereon. The trigger link lever 51 is pressed in a rotation direction indicated by an arrow 85 by a torsion spring (not shown) attached to the shaft portion 51b. A claw 51c that is made in contact with one portion of the sub-slide plate 26 is attached to the other end of the trigger link lever 51, as shown in FIG. 46.

Figure 46:
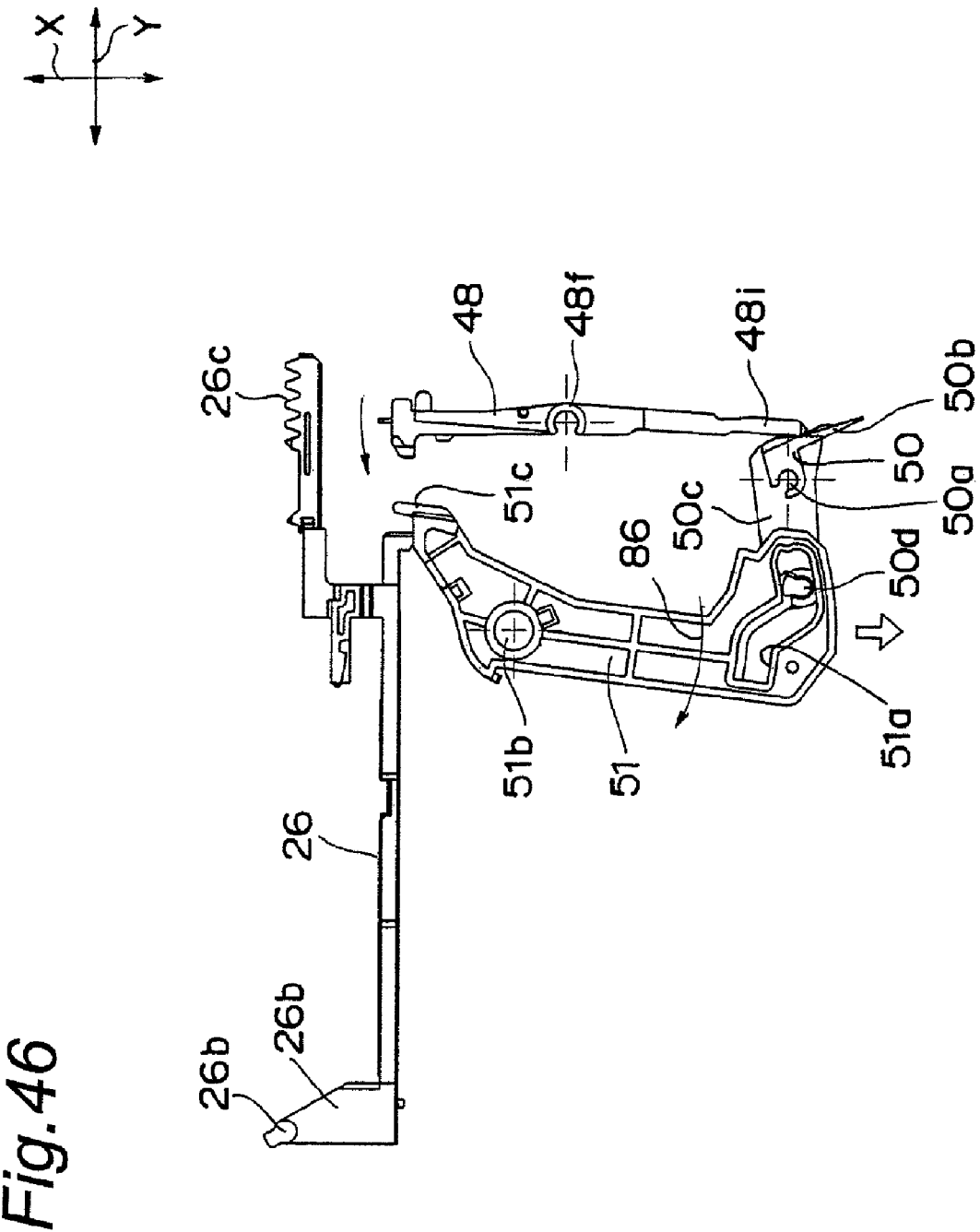
FIG. 46 is a plan view that shows a mechanism for rotating a trigger lever.
Figure 47:
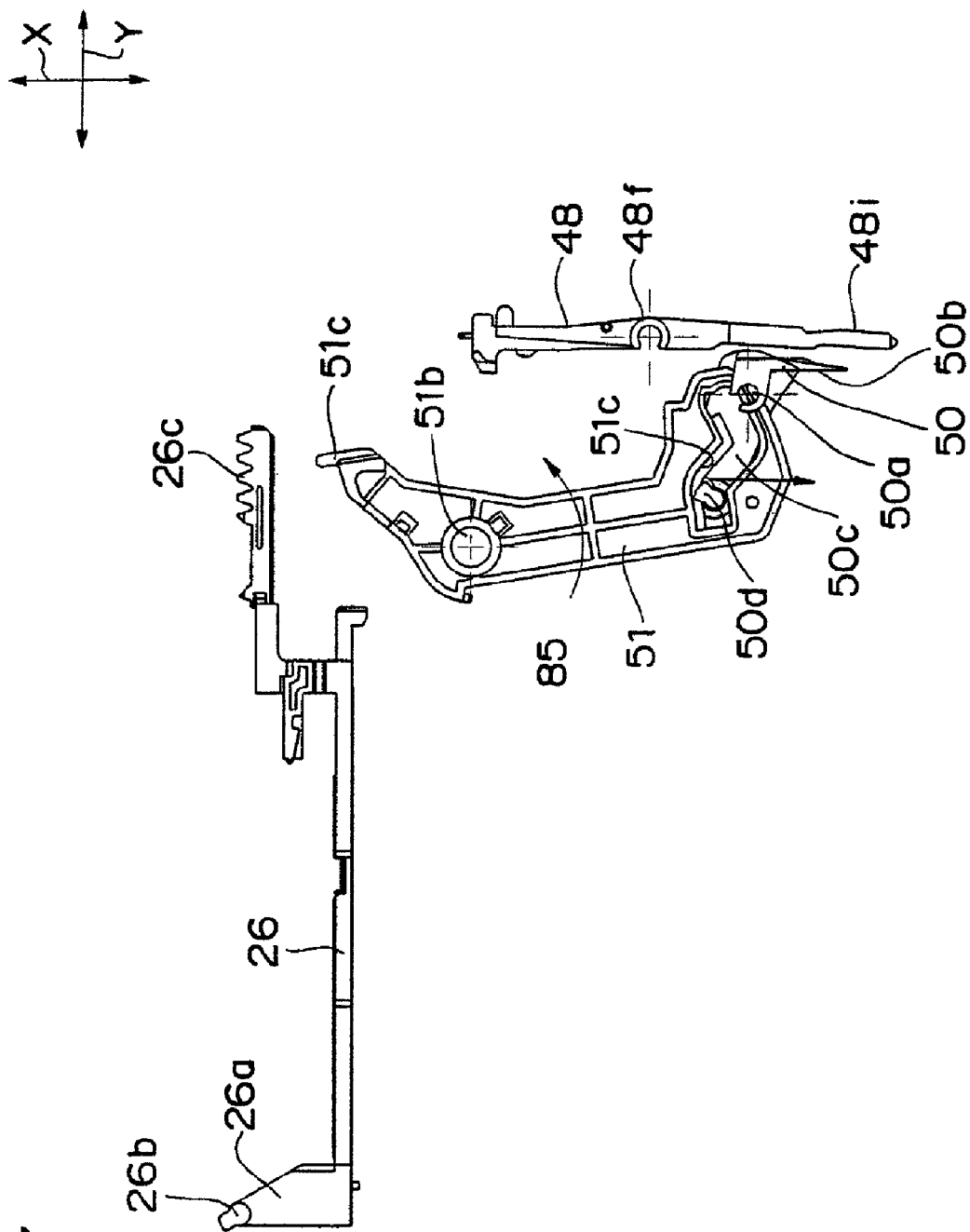
FIG. 47 is a plan view that shows a state in which the trigger lever has been rotated from the state shown in FIG. 46.

As shown in FIG. 47, in the case where one portion of the sub-slide blade 26 and the claw 51c of the trigger link lever 51 are not in contact with each other, by the urging force of the torsion spring in the direction of arrow 85, the engaging pin 50d of the all-trigger lever 50 is engaged with the trigger link lever 51 at an end portion of the cam groove 51a on the side departing from the all-trigger lever 50. In contrast, as shown in FIG. 46, in the case where one portion of the sub-slide blade 26 and the claw 51c of the trigger link lever 51 are in contact with each other so that the portion of the sub-slide plate 26 presses the claw 51c, the trigger link lever 51 is allowed to rotate in a direction indicated by an arrow 86 centered on the shaft portion 51b. Thus, the engaging pin 50d of the all-trigger lever 50 is allowed to slide in the cam groove 51a. At this time, since the engaging pin 50d passes over a step of the cam groove 51a, it is moved toward the exchange position A3 side (lower side of FIG. 46) in the device-depth direction X. Thus, the all-trigger lever 50 is allowed to rotate centered on the bearing hole 50a so that the claw 50b presses the tip portion 48i of the trigger lever 48. Consequently, the trigger lever 48 is allowed to rotate centered on the bearing portion 48f. Thereafter, as described earlier, by the rotation of the trigger lever 48, the tray lock lever 49 is rotated in the direction of arrow 84 as shown in FIG. 43 so that engagements between the tray locking claws 49h and the concave portions 5m of the respective trays 5a to 5e are released, and the respective trays 5a to 5e are allowed to move to the recording/reproducing position A1 or to the exchange position A3.

Here, it is when any one of the five trays 5 is located at the recording/reproducing position A1 that the sub-slide plate 26 is located at a position shown in FIG. 46. In this case, it is necessary to prevent the other trays from moving to the recording/reproducing position A1. For this reason, in the present embodiment, the trigger link lever 51, the all-trigger lever 50, the respective trigger levers 48 and the respective tray lock levers 49 are made to rotate respectively so that movements of the other trays are locked.

Figure 48:
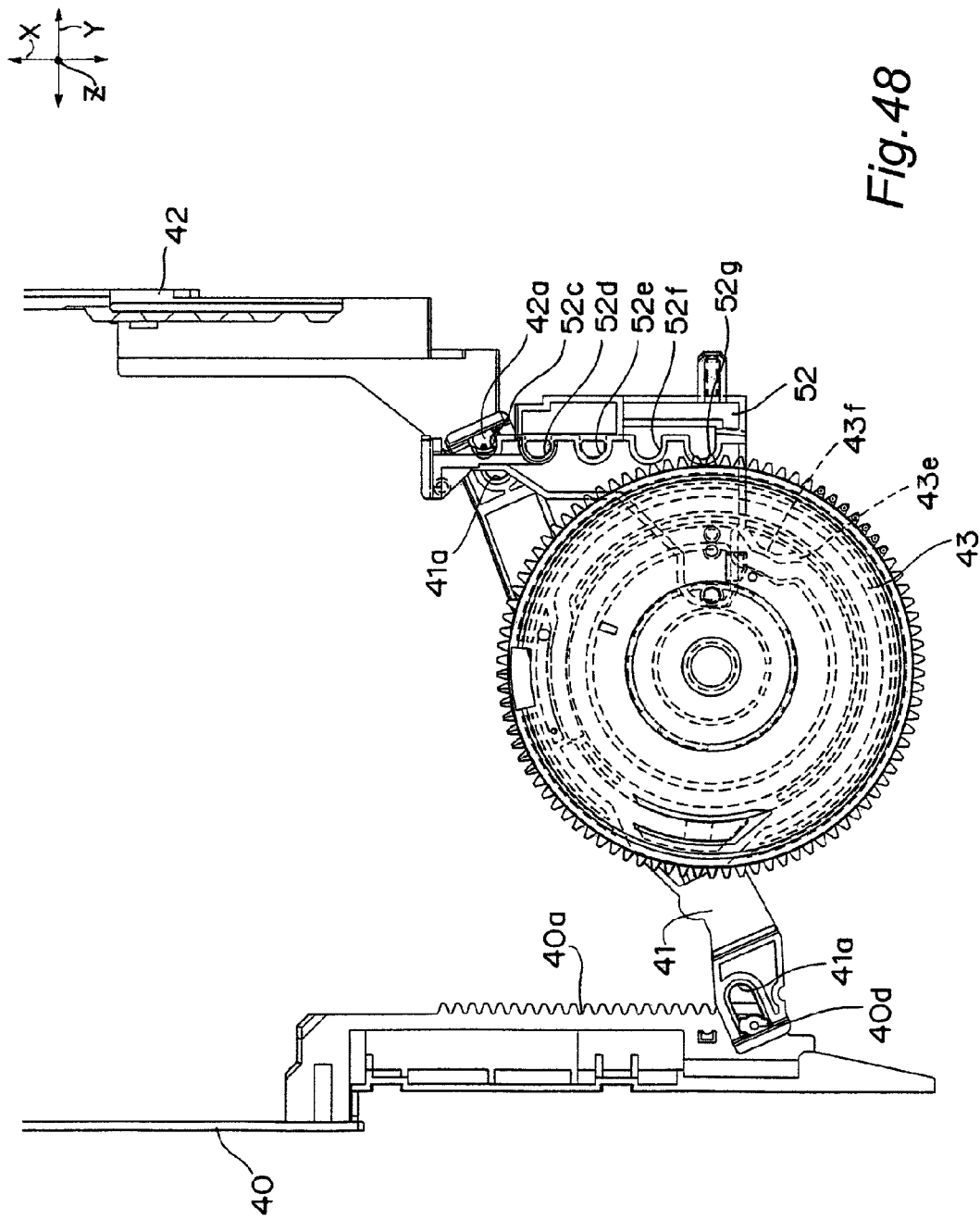
FIG. 48 is a plan view that shows a state in which an elevation cam lock and a right-side slide elevation rack are engaged with each other in the case where the elevation base is positioned at a height suitable for the tray on the first step.

Moreover, as shown in FIG. 5 and FIG. 48, the disc changer device 1 of the present embodiment is provided with an elevation cam lock 52 near the cam gear 43. The elevation cam lock 52 is provided with an engaging pin 52a that protrudes upward in the device-thickness direction Z so that, as shown in FIG. 48, the elevation cam lock 52 is engaged with a guide groove 43e of the cam gear 43 by the engaging pin 52a. Moreover, the elevation cam lock 52 is provided with a protruding member 52b that protrudes outward from the device in the device-width direction Y. With the protruding member 52b being inserted to an insertion hole (not shown) formed on the device main body 2, the elevation cam lock 52 is attached to the device main body 2 so as to move in the device-width direction Y, with its movement being regulated in the device-depth direction X as well as in the device-thickness direction Z.

Figure 49:
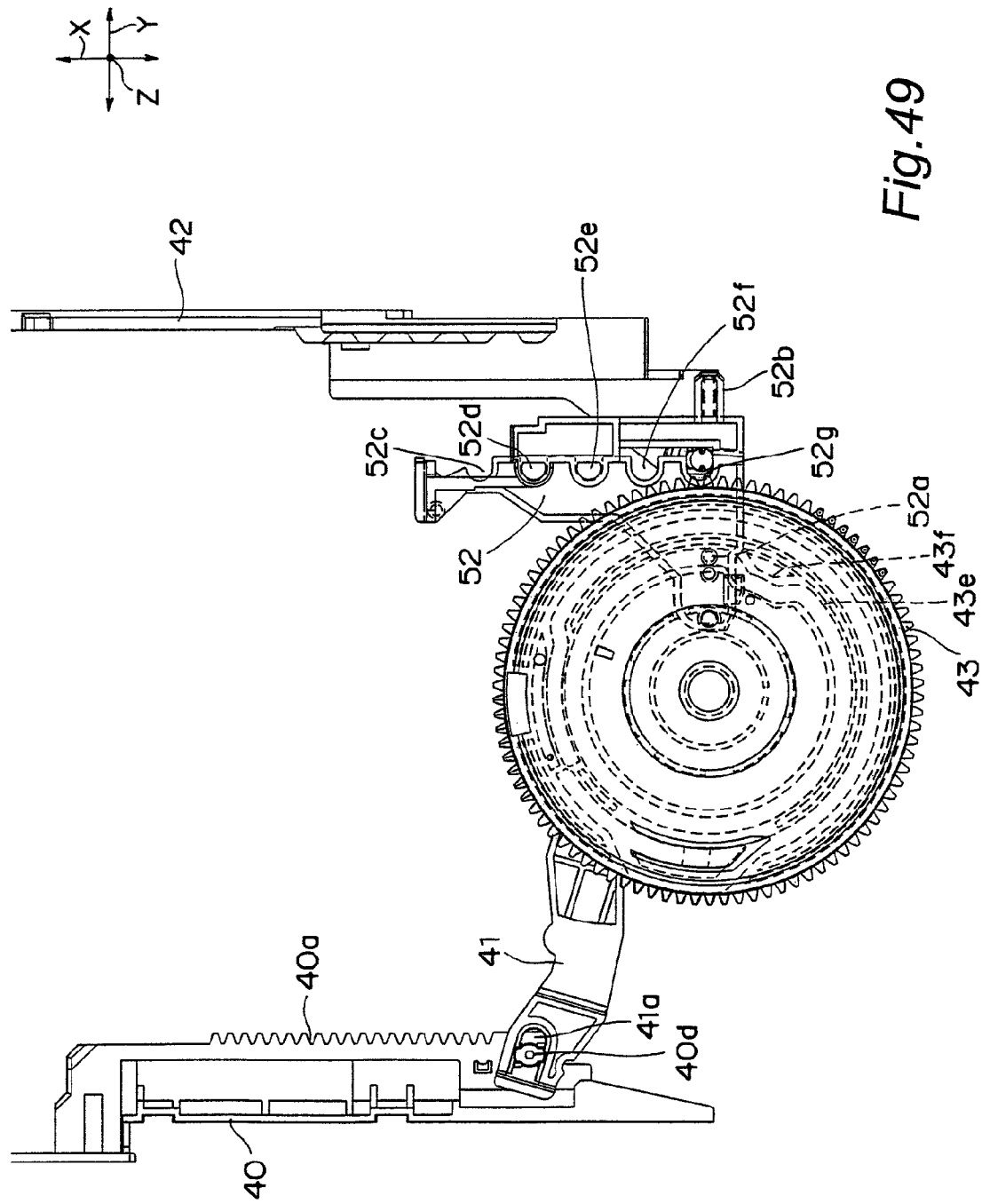
FIG. 49 is a plan view that shows a state in which the elevation cam lock and the right-side slide elevation rack are engaged with each other in the case where the elevation base is positioned at a height suitable for the tray on the second step.

Five concave sections 52c to 52g with which the engaging pin 42a of the right-side slide elevation rack 42 can be engaged are formed on the elevation cam lock 52. In the case where the elevation base 19 is located at a position having a height corresponding to the fifth-step tray 5e, the engaging pin 42a is engaged with the concave section 52c, as shown in FIG. 48. Moreover, in the case where the elevation base 19 is located at a position having a height corresponding to the first-step tray 5a, the engaging pin 42a is engaged with the concave section 52g, as shown in FIG. 49. Moreover, in the case where the elevation base 19 is located at any one of positions having heights corresponding to the second to fourth-step trays 5b to 5d, the engaging pin 42a is engaged with the corresponding one of concave sections 52d to 52f. By allowing the engaging pin 42a to engage with any one of the concave sections 52c to 52g, movements of the mechanism used for raising or lowering the elevation base 19 including the right-side slide elevation rack 42 are locked.

Figure 50:
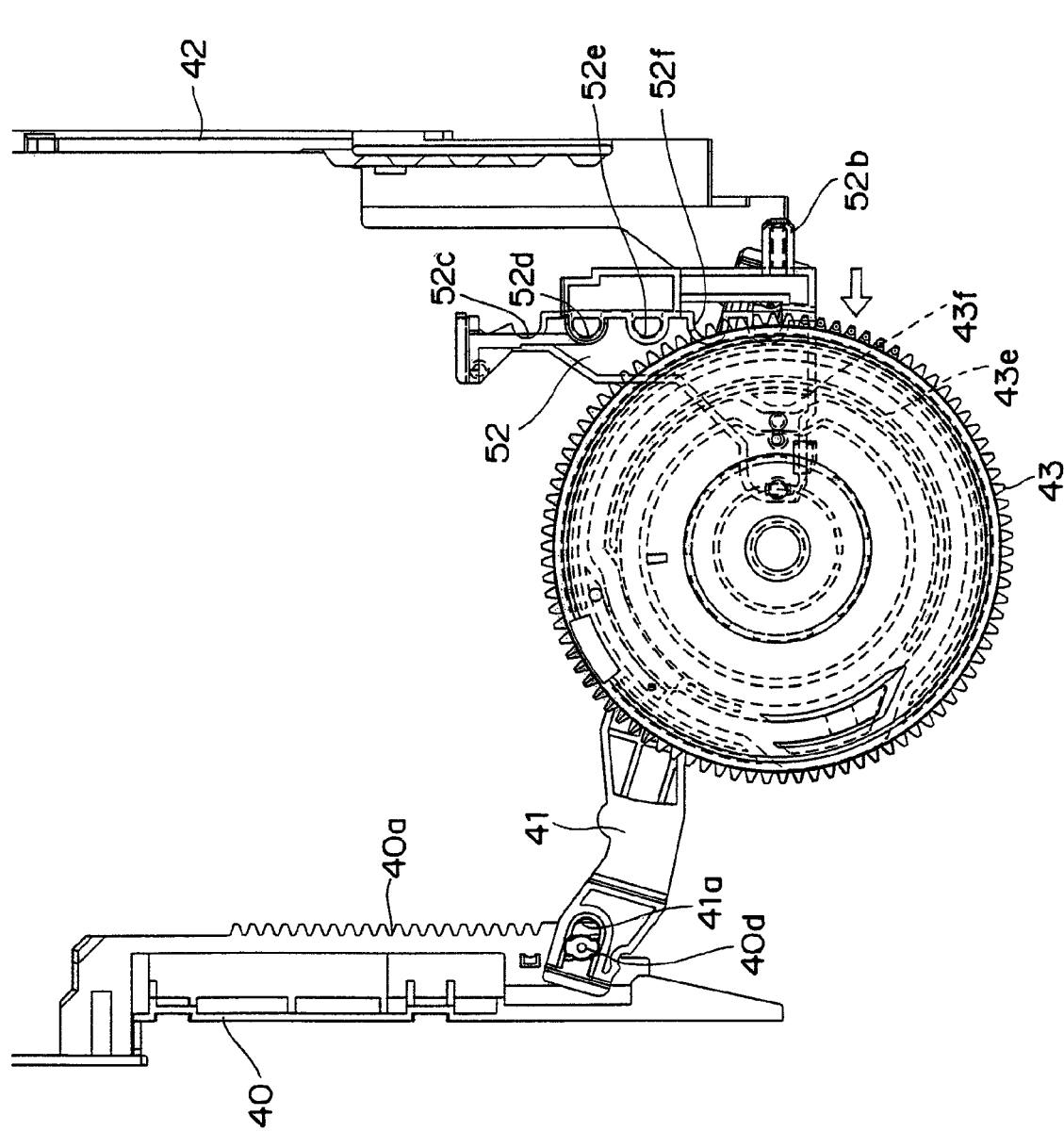
FIG. 50 is a plan view that shows a state in which the engaged state between the elevation cam lock and the right-side slide elevation rack has been released.

Here, while the right-side slide elevation rack 42 is slide-moved so that the height position of the elevation base 19 is changed, the engaging pin 52a of the elevation cam lock 52 is moved onto the step portion 43f formed on the guide groove 43e as shown in FIG. 50. Thus, the entire elevation cam lock 52 is moved in the device-width direction Y (left side of FIG. 50) so that engagement between the engaging pin 42a and any one of the concave sections 52c to 52g is released.

Moreover, as shown in FIG. 5, the disc changer device 1 of the present embodiment is further provided with an open switching lever 53 near the tray driving gear unit 70. This open switching lever 53 is provided with a contact claw 53a that can be made in contact with each of the trays 5a to 5e, when each of the trays 5a to 5e is moved from the exchange position A3 to the stand-by position A2. When the contact claw 53a is made in contact with any one of the trays 5a to 5e, the open switching lever 53 is rotated by being pressed by the corresponding one of the trays 5a to 5e. When a sensor 54a (see FIG. 5) of the mechanical substrate unit 54 attached to the device main body 2 detects the pivotal movement of this open switching lever 53, a control unit of the device (not shown) drives the second motor 31 so as to transport the trays 5a to 5e from the exchange position A3 to the stand-by position A2. With this arrangement, for example, when a user pushes the first-step tray 5a located at the exchange position A3 toward the stand-by position A2 side, the open switching lever 53 is pushed by the tray 5a so that the open switching lever 53 is pivoted, and the pivotal movement is detected by the sensor 54a so that the second motor 31 is driven. Therefore, even when the user pushes the tray 5a by hands in an attempt to return the tray 5a to the stand-by position A2, without using a close button (not shown) placed on the chassis 4, the first-step tray 5a is automatically transported to the stand-by position A2 after its position detection.

Figure 51:
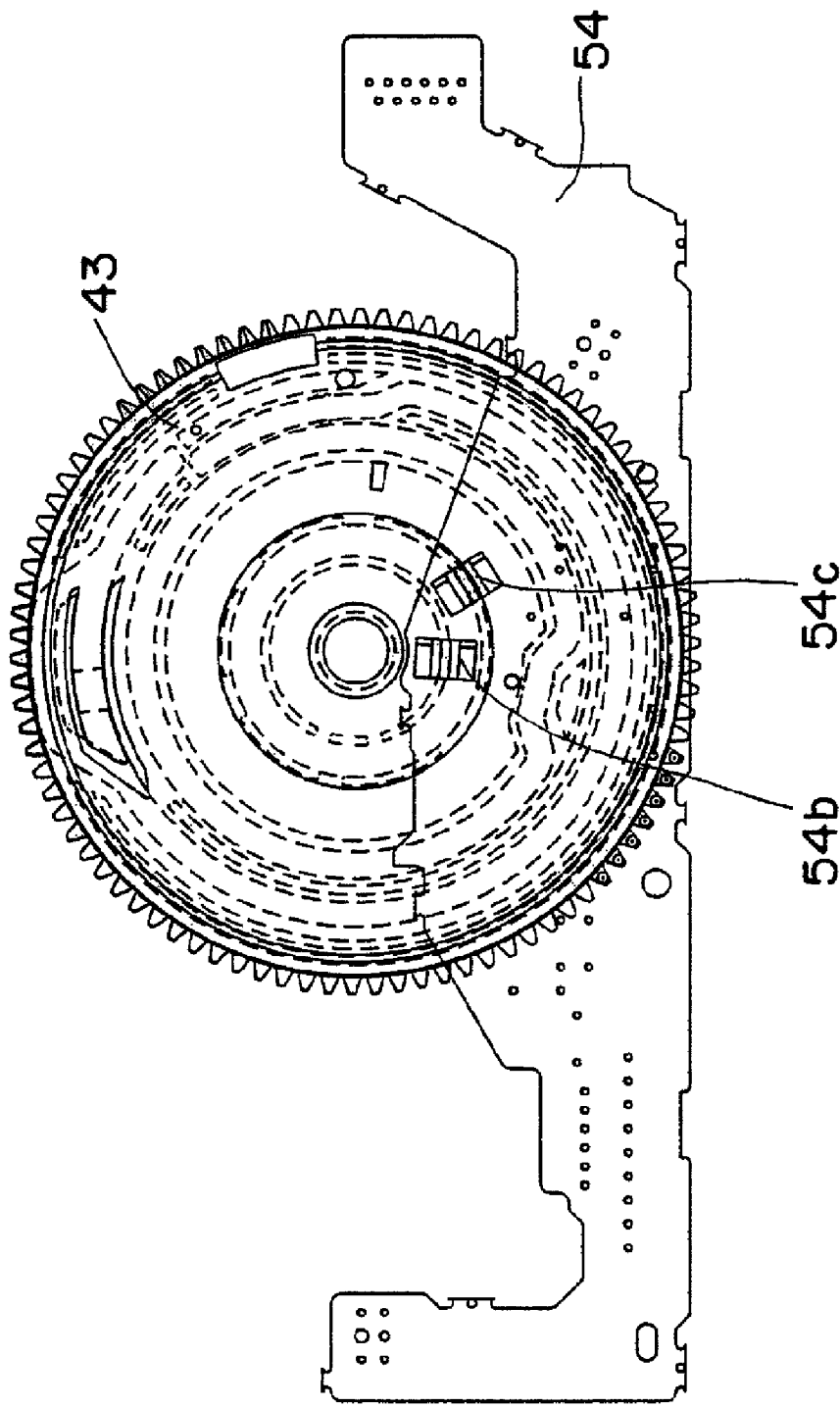
FIG. 51 is a plan view that shows a positional relationship between the cam gear and a mechanical substrate unit.
Figure 52:
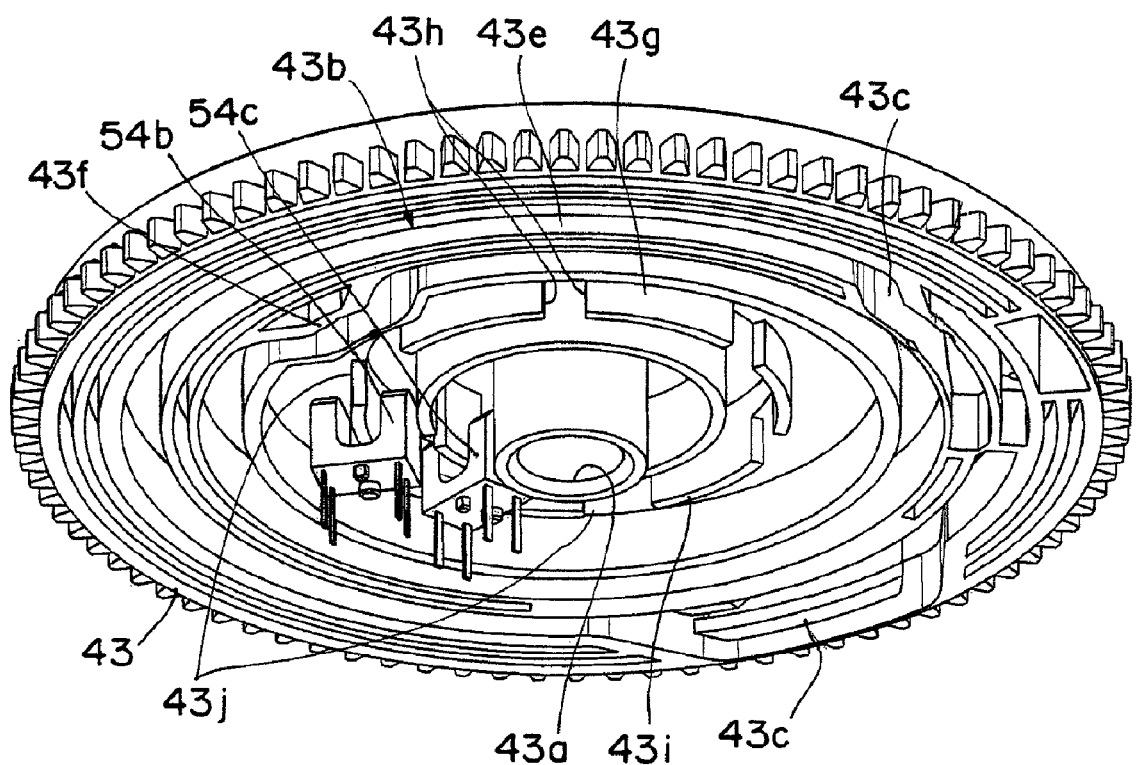
FIG. 52 is a perspective view that shows the cam gear viewed diagonally from below.

As shown in FIG. 51, the mechanical substrate unit 54 is provided with the first sensor 54b and the second sensor 54c formed thereon. As shown in FIGS. 51 and 52, the first sensor 54b is disposed below a rib 43h having a virtually cylinder shape that is formed concentrically with the center hole 43a, in the vicinity of the center hole 43a of the cam gear 43. As shown in FIG. 52, slits 43g, 43g are formed at two portions of the rib 43h. Here, the rotation of the tray lock lever 49 that brings the tray 5 into a locked state or an unlocked state depends on the amount of rotation of the cam gear 43 that transmits a driving force to the corresponding tray lock lever 49. In other words, by detecting the amount of rotation of the cam gear 43, it is possible to detect whether the tray 5 is in the locked state or in the unlocked state. For this reason, the first sensor 54b is designed so as to detect the amount of rotation of the cam gear 43 by detecting the slits 43g, 43g when the cam gear 43 is rotated.

As shown in FIGS. 51 and 52, the second sensor 54c is disposed below a rib 43i having a virtually cylinder shape that is formed concentrically with the center hole 43a outside of the rib 43h. As shown in FIG. 52, slits 43j, . . . , 43j are formed at five portions of the rib 43i. Here, the rotation of the tray driving gear 70 that transports each of the trays 5a to 5e to the exchange position A3 depends on the amount of rotation of the cam gear 43 that transmits a driving force to the tray driving gear unit 70. In other words, by detecting the amount of rotation of the cam gear 43, it is possible to detect which one of the trays 5 is located at the exchange position A3, and also to detect which one of the trays 5 is located at the stand-by position A2. For this reason, the second sensor 54c is designed so as to detect the amount of rotation of the cam gear 43 by detecting the slits 43j, . . . , 43j when the cam gear 43 is rotated.

Moreover, as shown in FIG. 2, the disc changer device 1 of the present embodiment is further provided with a pitch plate 55. This pitch plate 55 is attached to the device main body 2 in a manner so as to cover various parts, such as the cam gear 34, located below the trays 5.

Next, the following description will discuss driving timing between the first motor 10 of the trays 5 and the second motor 31 that are used upon transporting a selected tray located at the recording/reproducing position A1 to the exchange position A3 through the stand-by position A2. Here, for example, supposing that the selected tray corresponds to the tray 5a on the first step, a description will be given.

Figure 53A:
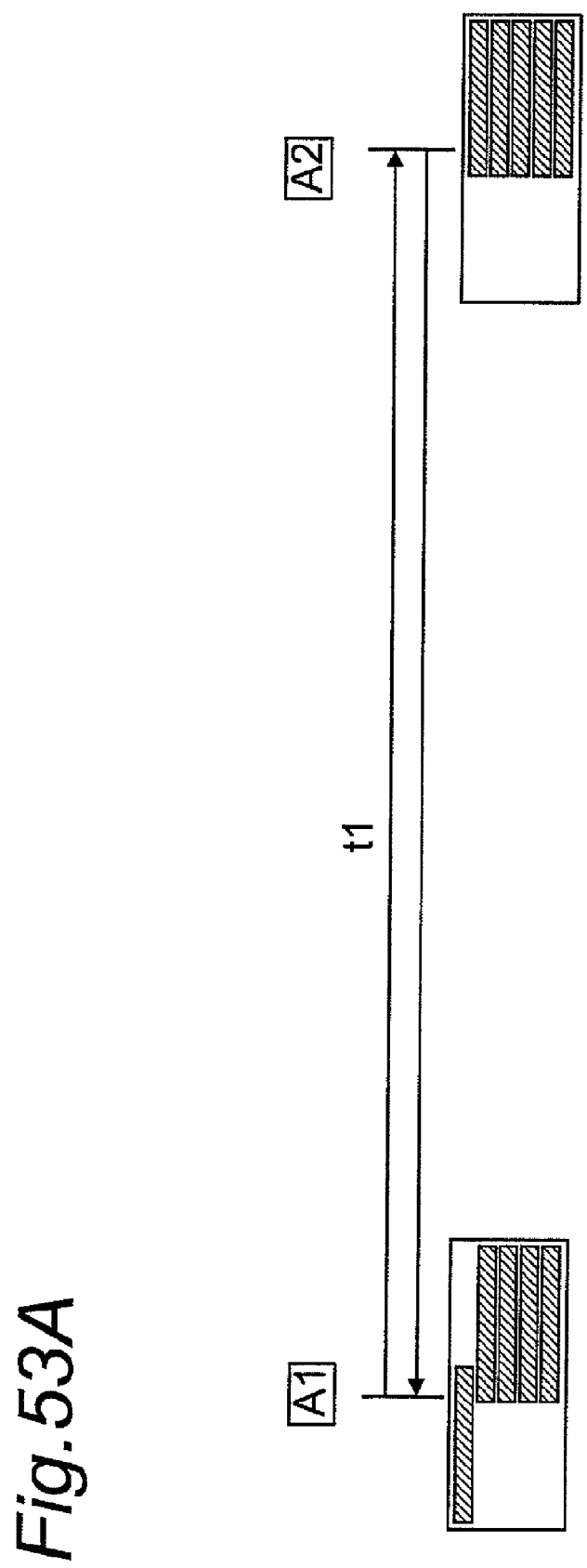
FIG. 53A is an explanatory view that schematically shows a state of each of trays when a selected tray is transported between the recording/reproducing position and the stand-by position.

FIG. 53A is an explanatory view that schematically shows a state of each of the trays 5a to 5e when the selected tray 5a is transported between the recording/reproducing position A1 and the stand-by position A2 by a driving process of the first motor 10. In this case, transporting time, required for the selected tray 5 to be transported between the recording/reproducing position A1 and the stand-by position A2, is defined as first tray transporting time t1.

Figure 53B:
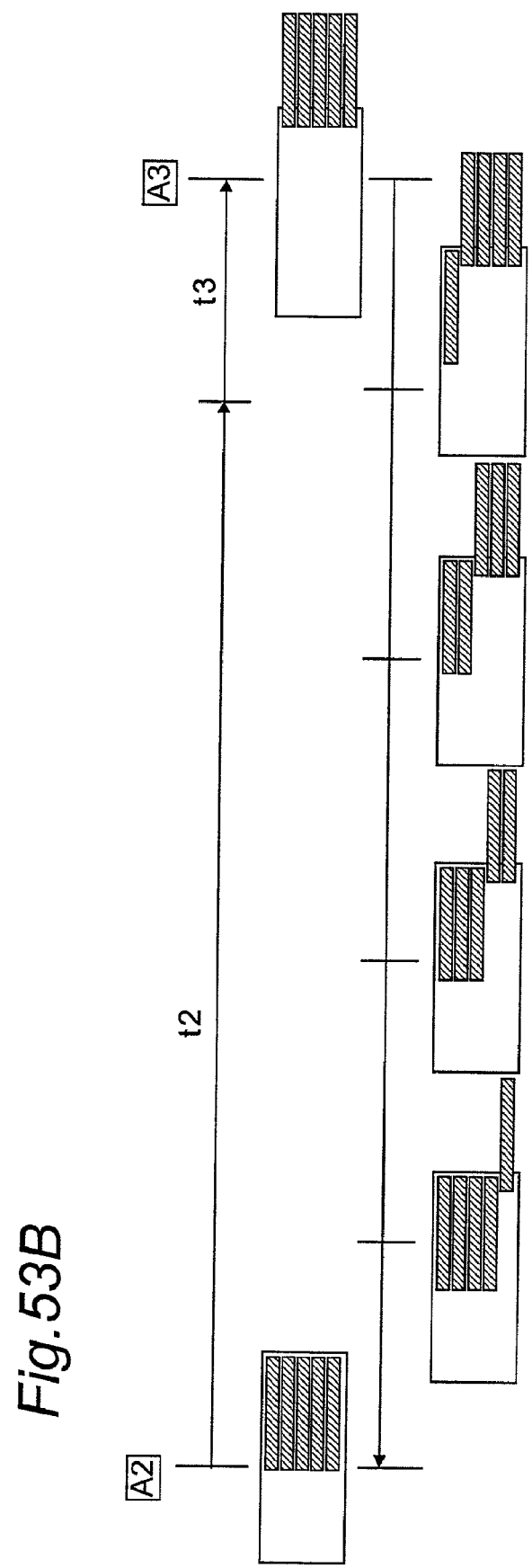
FIG. 53B is an explanatory view that schematically shows a state of each of trays when a selected tray and a tray located below the tray are transported between the stand-by position and the exchange position.

FIG. 53B is an explanatory view that schematically shows a state of each of trays 5a to 5e when a selected tray 5a and trays 5b to 5e located below the tray 5a are transported between stand-by position A2 and exchange position A3 by a driving process of the second motor 31. As shown in FIG. 53B, the transporting processes of the trays from the stand-by position A2 to the exchange position A3 are simultaneously carried out on all the trays 5a to 5b. However, in order to simultaneously transport all the trays 5a to 5b, it is necessary to rotate the tray driving gear unit 70 until the respective tray driving gears 71 to 75 of the tray driving gear unit 70 and stopper ribs of the respective plastic rings 77 and 78 have been made in contact with one another, as described earlier. Hereinafter, the above-mentioned state is referred to as a "state capable of simultaneously transporting trays", while a state other than the above-mentioned state is referred to as a "tray transportation preparing state". In this case, time required for the tray driving gear unit 70 to be brought into the state capable of simultaneously transporting the trays is defined as transportation preparing time t2. Moreover, time required for the tray driving gear unit 70 in its state capable of simultaneously transporting the trays to be further rotated so that all the trays 5a to 5d have been transported from the stand-by position A2 to the exchange position A3 is defined as second tray transporting time t3.

Figure 54A:
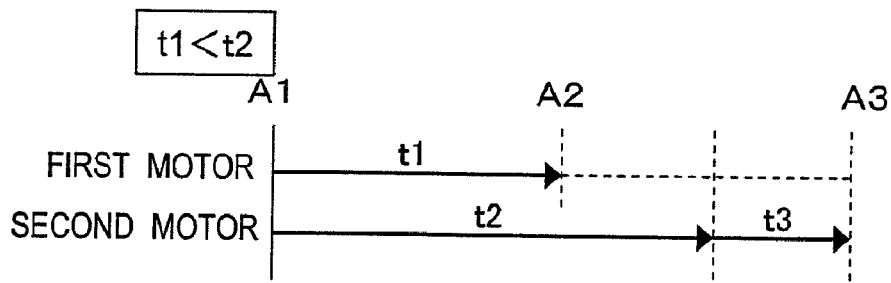
FIG. 54A is a time chart that shows operation states of the first and second motors in the disc changer device in accordance with the embodiment of the present invention.
Figure 54B:
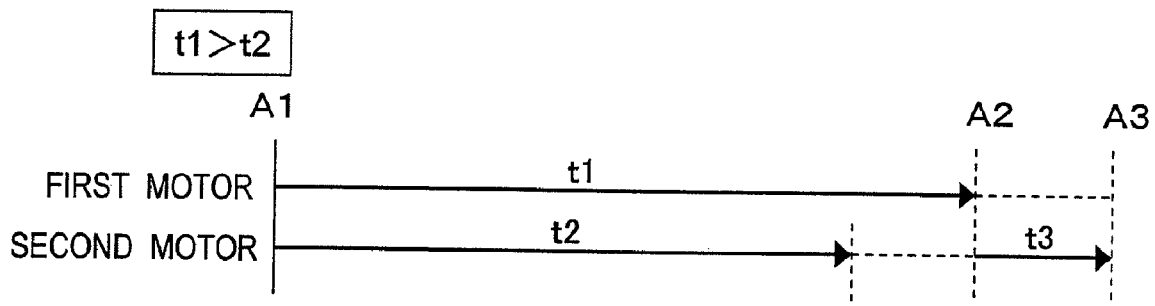
FIG. 54B is a time chart that shows operation states of the first and second motors that are different from those of FIG. 54A in the disc changer device in accordance with the embodiment of the present invention.
Figure 55:
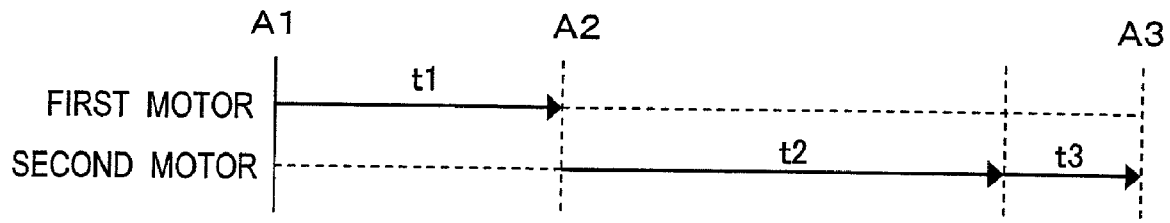
FIG. 55 is a time chart that shows operation states of the first and second motors serving as a comparative example.

FIGS. 54A and 54B are time charts that show operation states of the first and second motors 10 and 31 in the disc changer device 1 in accordance with the embodiment of the present invention. FIG. 55 is a time chart that shows operation states of the first and second motors 10 and 31 serving as a comparative example.

As shown in FIGS. 54A and 54B, in the present embodiment, when a selected tray 5a is located at the recording/reproducing position A1, driving operations of the first and second motors 10 and 31 are simultaneously started. As shown in FIG. 54A, when the transportation preparing time t2 is longer than the first tray transporting time t1, the second motor 31 is continuously driven without stopping the driving operation. In this case, the total carry-out time from the recording/reproducing position A1 to the exchange position A3 corresponds to a period of time obtained by totaling the transportation preparing time t2 and the second tray transporting time t3. In contrast, in the comparative example shown in FIG. 55, after stopping the driving operation of the first motor 10, the second motor 31 is driven. For this reason, the total carry-out time from the recording/reproducing position A1 to the exchange position A3 corresponds to a period of time obtained by totaling the first tray transporting time t1, the transportation preparing time t2 and the second tray transporting time t3. Therefore, in the disc changer device 1 in accordance with the present embodiment, by simultaneously starting the driving operations of the first and second motors 10 and 31, it is possible to shorten the total carry-out time by the time corresponding to the first tray transporting time t1, in comparison with that of the comparative example.

As shown in FIG. 54B, in the present embodiment, in the case where the transportation preparing time t2 is shorter than the first tray transporting time t1, the driving operation of the second motor 31 is stopped at the time when the tray driving gear unit 70 has been brought into the state capable of simultaneously transporting the trays. Thereafter, after a lapse of the first tray transporting time t1, the driving operation of the second motor 31 is resumed. In this case, the total carry-out time from the recording/reproducing position A1 to the exchange position A3 corresponds to a period of time obtained by totaling the transportation preparing time t2 and the second tray transporting time t3. Therefore, in the disc changer device 1 relating to the present embodiment, by simultaneously starting the driving operations of the first and second motors 10 and 31, it becomes possible to shorten the total carry-out time by the time corresponding to transportation preparing time t2 in comparison with that of the comparative example.

It is when, for example, the transportation of the tray 5 is intervened by a meshed foreign matter, or when the sensor and switch cause erroneous detections due to big vibrations applied from the outside during the driving process of the device 1, that the transportation preparing time t2 becomes shorter than the first tray transporting time t1. Even in presumable specific cases, determining processes for these problems are required, in order to return the device 1 to normal operations without causing a failure to the device 1.

Here, in the case where the transportation preparing time t2 is shorter than the first tray transporting time t1, provision may be made so as to bring the tray driving gear unit 70 to the state capable of simultaneously transporting trays within the first tray transporting time t1. That is, without the necessity of simultaneously starting the driving operations of the first and second motors 10 and 31, the total carry-out time can be shortened in comparison with the comparative example. However, to simultaneously start the driving operations of the first and second motors 10 and 31 is more advantageous because the number of detections for various operation conditions, required for controlling timings in which the driving operation for the second motor is started and stopped, can be made smaller, and because complicated controlling operations are not required.

Figure 56:
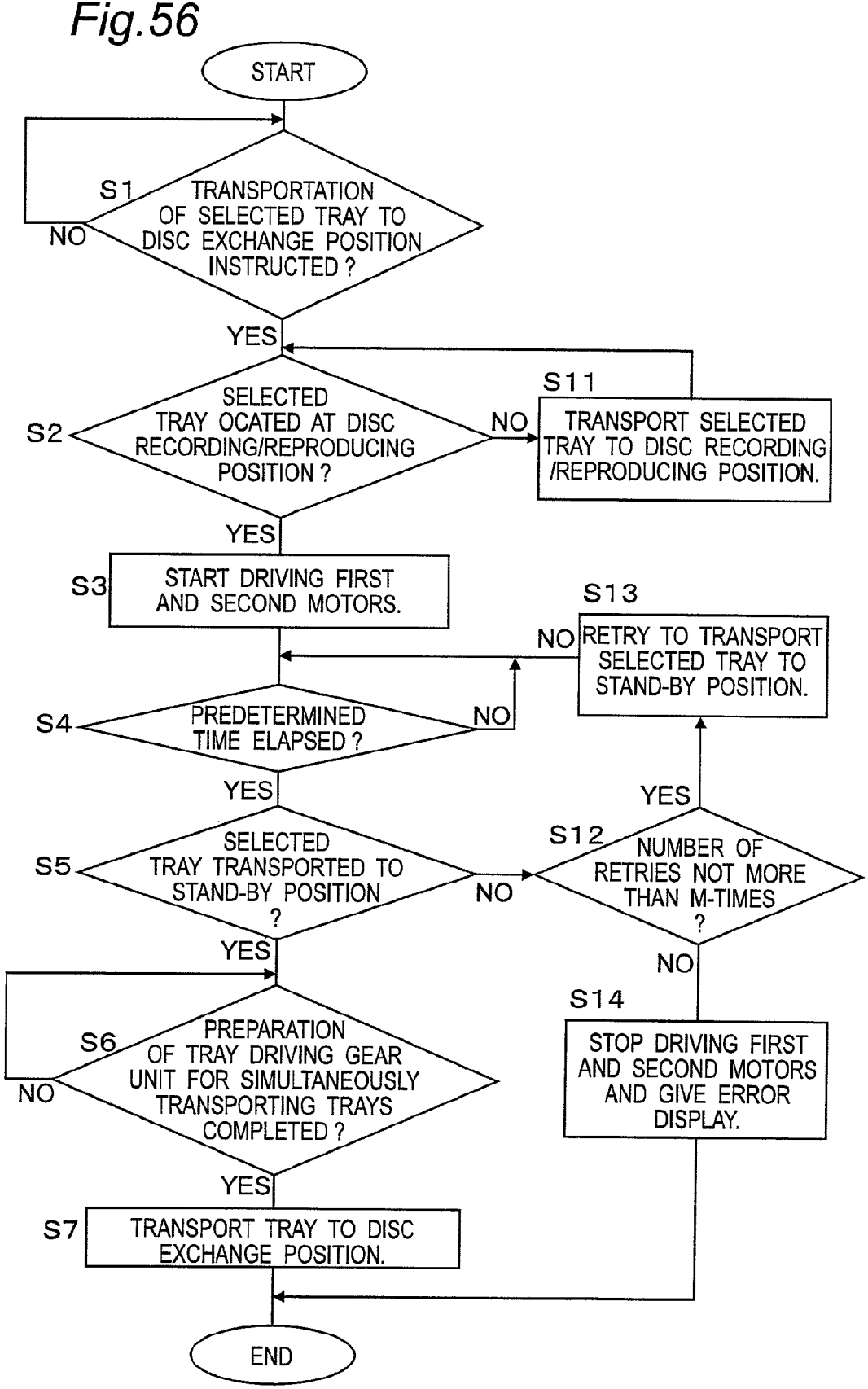
FIG. 56 is a flow chart that shows operations to be carried out when a tray is transported from the disc recording/reproducing position to the disc exchange position in the disc changer device in accordance with the embodiment of the present invention.

Next, referring to FIG. 56, the following description will discuss a flow of operations to be used upon transporting the selected tray 5a from the recording/reproducing position A1 to the exchange position A3. Here, the following operations are respectively carried out by the control unit (not shown) installed in the device, based upon detection signals obtained by the first and second sensors 54b and 54c and the like.

First, in step S1, it is detected whether or not an instruction for transporting a tray 5a, for example, selected by pressing an eject button (not shown) attached to the device, etc., to the exchange position A3 has been given. When such an instruction has been detected, the process proceeds to step S2.

In step S2, it is detected whether or not the selected tray 5a is located at the recording/reproducing position A1. In the case where the state of the device 1 is deviated from the position where it should be originally located, due to vibrations applied from outside, this step is used for returning the deviated position to the normal position. If the selected tray 5a is not located at the recording/reproducing position A1, then the process proceeds to step S11, and if the selected tray 5a is located at the recording/reproducing position A1, then the process proceeds to step S3.

In step S11, the first motor 10 is driven so as to transport the selected tray 5a to the recording/reproducing position A1. Thus, the process returns to step S2.

In step S3, driving operations of the first and second motors 10 and 31 are simultaneously started. Thus, the selected tray 5a is transported to the stand-by position A2, while the tray driving gear unit 70 is also driven to rotate.

In step S4, it is detected whether or not a predetermined period of time has been elapsed after the start of driving operations of the first and second motors 10 and 31. If the predetermined time has been elapsed, then the process proceeds to step S5.

In step S5, it is detected whether or not the transportation of the selected tray 5a to the stand-by position A2 has been completed. If the transportation to the stand-by position A2 has not been completed, then the process proceeds to step S12, and if the transportation to the stand-by position A2 has been completed, then the process proceeds to step S6. In the case where the transportation to the stand-by position A2 has not been completed, it is presumed that the selected tray 5a might be caught by something, or subjected to a certain problem. For this reason, after the selected tray 5a has been once returned to the recording/reproducing position A1, a retry operation for again transporting it to the stand-by position A2 is carried out.

In step S12, it is detected whether or not the number of retry operations is not more than M-number (for example, three times). If the number of retry operations is not more than M-number, then the process proceeds to step S13, and if the number of retry operations is more than M-number, then the process proceeds to step S14.

In step S13, the retry operation is carried out on the selected tray 5a. Thus, the process returns to step S4.

In step S14, since it is presumed that a failure that cannot be solved by the retry operations might occur, the driving operations of the first and second motors 10 and 31 are stopped, and an error state of the device is displayed, for example, on a display unit (not shown) attached to the device. Thus, the transporting operation of the tray 5a from the recording/reproducing position A1 to the exchange position A3 is completed.

In step S6, on the other hand, it is determined whether or not the tray driving gear unit 70 is in the state capable of simultaneously transporting trays. When the tray driving gear unit 70 has been brought into the state capable of simultaneously transporting trays, the process proceeds to step S7.

In step S7, the tray 5a is transported to the exchange position A3. Here, as described above, at this time, trays 5b to 5c adjacent to the tray 5a on lower levels are also simultaneously transported to the exchange position A3. Thus, the transporting operations of the tray 5a from the recording reproducing position A1 to the exchange position A3 are completed.

The present invention is not limited to the above-mentioned embodiments, and various other modifications may be made therein.

The tray carry-out method for the disc changer device of the present invention makes it possible to shorten the tray carry-out time required to carry out trays from a recording/reproducing position to an exchange position, and the method is effectively used for a disc changer device in which shortened operation time is required.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The disclosure of Japanese Patent Publication No. 2008-047383 filed on Feb. 28, 2008 including specification, drawing and claims are incorporated herein by reference in its entirety.

The invention claimed is:

1. A tray carry-out method for a disc changer device, wherein the disc changer device have a first motor and a second motor, the first motor generating a driving force for transporting a tray between a stand-by position where a plurality of trays are housed and a disc recording/reproducing position where a recording/reproducing operation is carried out on a disc on the tray selected from the plurality of trays, and the second motor generating a driving force for bringing a tray driving gear unit capable of individually transporting the respective trays into a tray simultaneously transportable state, as well as for transporting the tray between the stand-by position and a disc exchange position where the disc on the tray is exchanged, the method comprising;

while transporting the tray from the disc recording/reproducing position to the stand-by position by driving the first motor, starting to drive the second motor for bringing the tray driving gear unit into the tray simultaneously transportable state; and upon completion of the transport of the tray to the stand-by position, with the tray driving gear unit being set to the tray simultaneously transportable state, starting to drive the second motor to carry out the tray from the stand-by position to the disc exchange position.

2. The tray carry-out method for a disc changer device according to claim 1, wherein the second motor is started to be driven simultaneously with the first motor.

3. The tray carry-out method for a disc changer device according to claim 2, further comprising:

in a case where the tray driving gear unit is set to the tray simultaneously transportable state by the driving operation of the second motor, during a transporting process of the tray from the disc recording/reproducing position to the stand-by state by driving the first motor, stopping the driving operation of the second motor.

4. The tray carry-out method for a disc changer device according to claim 3, comprising:

detecting whether or not the tray driving gear unit has been brought into the tray simultaneously transportable state based upon an amount of rotation of a gear, with the disc changer device having the gear for transmitting a driving force of the second motor to the tray driving gear unit.

5. The tray carry-out method for a disc changer device according to claim 4, comprising:

detecting the amount of rotation of the gear by detecting a slit formed on a rib, with the gear having a rib having a virtually cylinder shape that sticks out from a surface of a gear concentrically with the rotation center of the gear.

6. The tray carry-out method for a disc changer device according to claim 2, comprising:

detecting whether or not the tray driving gear unit has been brought into the tray simultaneously transportable state based upon an amount of rotation of a gear, with the disc changer device having the gear for transmitting a driving force of the second motor to the tray driving gear unit.

7. The tray carry-out method for a disc changer device according to claim 6, comprising:

detecting the amount of rotation of the gear by detecting a slit formed on a rib, with the gear having a rib having a virtually cylinder shape that sticks out from a surface of a gear concentrically with the rotation center of the gear.

8. The tray carry-out method for a disc changer device according to claim 1, comprising:

in a case where the tray driving gear unit is set to the tray simultaneously transportable state by the driving operation of the second motor, during a transporting process of the tray from the disc recording/reproducing position to the stand-by state by driving the first motor, stopping the driving operation of the second motor.

9. The tray carry-out method for a disc changer device according to claim 8, comprising:
detecting whether or not the tray driving gear unit has been brought into the tray simultaneously transportable state based upon an amount of rotation of a gear, with the disc changer device having the gear for transmitting a driving force of the second motor to the tray driving gear unit.

10. The tray carry-out method for a disc changer device according to claim 9, comprising:
detecting the amount of rotation of the gear by detecting a slit formed on a rib, with the gear having a rib having a virtually cylinder shape that sticks out from a surface of a gear concentrically with the rotation center of the gear.

11. The tray carry-out method for a disc changer device according to claim 1, comprising:
detecting whether or not the tray driving gear unit has been brought into the tray simultaneously transportable state based upon an amount of rotation of a gear, with the disc changer device having the gear for transmitting a driving force of the second motor to the tray driving gear unit.

12. The tray carry-out method for a disc changer device according to claim 11, comprising:
detecting the amount of rotation of the gear by detecting a slit formed on a rib, with the gear having a rib having a virtually cylinder shape that sticks out from a surface of a gear concentrically with the rotation center of the gear.

* * * * *